(12) United States Patent
Gordon et al.

(10) Patent No.: US 11,636,436 B2
(45) Date of Patent: *Apr. 25, 2023

(54) SYSTEMS AND METHODS FOR REPURPOSING PAID TIME OFF

(71) Applicant: PTO Genius, LLC, Miami, FL (US)

(72) Inventors: Adam P. Gordon, Miami, FL (US); Ulises I. Orozco, Miami, FL (US)

(73) Assignee: PTO GENIUS, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,208

(22) Filed: May 6, 2022

(65) Prior Publication Data

US 2022/0270053 A1  Aug. 25, 2022

Related U.S. Application Data

(63) Continuation of application No. 17/348,062, filed on Jun. 15, 2021, which is a continuation of application No. 17/085,036, filed on Oct. 30, 2020, now Pat. No. 11,068,849.

(60) Provisional application No. 62/928,205, filed on Oct. 30, 2019.

(51) Int. Cl.
| | | |
|---|---|---|
| *G06Q 10/00* | (2012.01) | |
| *G06Q 10/1057* | (2023.01) | |
| *G06Q 40/12* | (2023.01) | |
| *G06Q 50/14* | (2012.01) | |

(52) U.S. Cl.
CPC ....... *G06Q 10/1057* (2013.01); *G06Q 40/125* (2013.12); *G06Q 50/14* (2013.01)

(58) Field of Classification Search
CPC ... G06Q 10/1057; G06Q 40/125; G06Q 50/14
See application file for complete search history.

(56) References Cited

U.S. PATENT DOCUMENTS

| | | | |
|---|---|---|---|
| 10,108,933 B1* | 10/2018 | Hatch | G06Q 10/1057 |
| 2002/0184148 A1 | 12/2002 | Kahn et al. | |
| 2008/0215502 A1 | 9/2008 | Sabbia | |
| 2011/0320231 A1 | 12/2011 | Podgumy et al. | |
| 2014/0279610 A1 | 9/2014 | Hendrix | |
| 2016/0078408 A1* | 3/2016 | Vo | G06Q 10/1057 |
| | | | 705/322 |
| 2019/0108489 A1 | 4/2019 | Hollis | |
| 2019/0114574 A1 | 4/2019 | Greenwalt | |
| 2019/0325400 A1* | 10/2019 | Nitta | G06N 3/084 |

OTHER PUBLICATIONS

Graves, Patricia ("Ask an HR Expert: Can We Allow Employees to Donate PTO to Co-Workers Who Have Had Family Emergencies?" SHRM. Oct. 27, 2017) (Year: 2017).*

Marzullo, Dan, "What Does Paid Time Off Cost the Employer?", Workest, Feb. 20, 2019.

(Continued)

*Primary Examiner* — Gabrielle A McCormick
(74) *Attorney, Agent, or Firm* — Polsinelli LLP

(57) ABSTRACT

The present disclosure relates generally to utilizing paid time off. In one example, the systems and methods described herein may provide an infrastructure to repurpose paid time off into other uses, such as cash, travel, bill payments, and the like.

21 Claims, 35 Drawing Sheets

(56) References Cited

OTHER PUBLICATIONS

Graves, Patricia, "Ask an HR Expert: Can We Allow Employees to Donate PTO to Co-workers Who Have Had Family Emergencies?", SHRM, Oct. 27, 2017.
SHRM, "Paid Time Off: What is a vacation or PTO buy/sell plan through a cafeteria plan and why offer it?", SHRM, Feb. 17, 2016.
Office Action dated Dec. 11, 2020 in U.S. Appl. No. 17/085,036.
USPTO Letter Restarting Period for Response dated Dec. 30, 2020 in U.S. Appl. No. 17/085,036.
Pre-interview First Office Action dated Dec. 30, 2020 in U.S. Appl. No. 17/085,036.
Pre-interview First Office Action dated Feb. 2, 2021 in U.S. Appl. No. 17/085,036.
Notice of Allowance dated Mar. 17, 2021 in U.S. Appl. No. 17/085,036.
International Search Report dated Feb. 11, 2021 in International Application PCT/US2020/058377.
International Preliminary Report on Patentability dated May 12, 2022 in International Application PCT/US2020/058377.
Office Action dated Aug. 15, 2022 in U.S. Appl. No. 17/738,193.
Office Action dated Nov. 2, 2022 in U.S. Appl. No. 17/348,062.
Notice of Allowance dated Dec. 8, 2022 in U.S. Appl. No. 17/738,193.

\* cited by examiner

Settings

General | Billing | Reports | Alerts & Notifications | Manage Conversion | Manage Travel

Company Admins
Manage employee access to the company admin section

| | | |
|---|---|---|
| 👥 Anthony Stark | Owner ∨ | |
| 👥 Bruce Banner | Admin ∨ | ✕ |
| 👥 Miles Morales | Admin ∨ | ✕ |

+ Add a new member

🔍 | Select Role ∨ | Add Member

1102

Employee Contact Preferences
Manage PTO Conversion Service employee outreach ● Allow PTO Conversion Service to e-mail my employees directly
● When PTO has not been taken for more than 3 months ∨
● When PTO balance reaches 40 hours ∨
● When PTO liability reaches $5,000 ∨
● When there are opportunities for employee to take PTO without affecting work
● When vacation option(s) or wish list location(s) go on sale

Settings

General | Billing | Reports | Alerts & Notifications | Manage Conversion | Manage Travel

Payment History — 1106
Download copies of your invoices

| Date | Invoice | Amount | Status | Payment Method | Notes | |
|---|---|---|---|---|---|---|
| June 1, 2020 | PEP-1006 | $15,000 | Not Paid | BECU-1234 | | |
| May 1, 2020 | PEP-1005 | $15,000 | Scheduled | BECU-1234 | | |
| April 1, 2020 | PEP-1004 | $15,000 | Paid | BECU-1234 | 15% Discount | Invoice |
| March 1, 2020 | PEP-1003 | $25,000 | Paid | BECU-1234 | | Invoice |
| February 1, 2020 | PEP-1002 | $25,000 | Paid | BECU-1234 | 10% Discount | Invoice |
| January 1, 2020 | PEP-1001 | $35,000 | Paid | BECU-1234 | | Invoice |

View More

Payment Method — 1108
Manage your PTO Conversion Service payment method(s)

BECU
\*\*\* \*\*\* \*\*\*\* 1234       Primary

Fulano Bank
\*\*\* \*\*\* \*\*\*\* 5678       Make Primary

+ Add new payment method

Settings

General | Billing | Reports | Alerts & Notifications | Manage Conversion | Manage Travel

Alert & Notification Preferences
Manage how the PTO Conversion Service alerts you of key activities

Allow the PTO Conversion Service to email me when

☒ PTO Liability reaches $10,000,000
☒ PTO Liability drops below $1,000,000

Allow the PTO Conversion Service to text messages to me when

☒ PTO Liability reaches $10,000,000
☒ PTO Liability drops below $1,000,000

Allow the PTO Conversion Service to send me push notifications when

Settings

General | Billing | Reports | Alerts & Notifications | Manage Conversion | Manage Travel

Eligible Policies — 1114
Manage what policies can be cashed out

- Vacation Policy
- Sick Leave Policy [X]
- + Add Another Policy

[Select a policy ▾]  Add Policy

PTO Conversion Limits — 1116
Manage how much PTO employees can convert

● Set general employee limits for your Vacation Policy
- [X] Employees can convert up to 30% ▾ of their max PTO
- [X] Employees can request fast cash up to 10 times per year ▾
- [X] Employees can convert up to $10,000 per request ▾

● Set custom employee limits for your Vacation Policy
[Executives] [X]
- [X] Executives can convert up to 60% ▾ of their max PTO
- [ ] Executives can request fast cash up to 10 times per year ▾
- [ ] Executives can convert up to $10,000 per request ▾

FIG. 11E

Settings

General | Billing | Reports | Alerts & Notifications | Manage Conversion | Manage Travel

1100

1118

● Set Company Limits
  ☒ Set maximum company-wide conversions to $10,000,000 per year v
  ☒ Do not allow conversions between:
  [Jan 5th] - [Feb 12th]
  [    ] - [    ] ☒
  Set Blackout Date

1120

Destinations
Manage how employees can use their extra PTO

● Charity
  Allow employees to donate extra PTO to public charities and foundations
● College Savings
  Allow employees to use PTO for contributions to 529 College Savings plans
● Credit Cards
  Allow employees to use PTO to pay down high interest credit cards
● Fast Cash
  Allow employees to cash out PTO in case of financial emergencies
● Retirement
  Allow employees to use PTO for contributions to IRAs and 401k plans
● Student Loans
  Allow employees to use PTO to pay down student loan debt
● Vacation – Travel
  Allow employees to use PTO to pay for flights, hotels, and car rentals

SYSTEMS AND METHODS FOR REPURPOSING PAID TIME OFF

CROSS-REFERENCE TO RELATED APPLICATIONS

The present application is a continuation of U.S. patent application Ser. No. 17/348,062 filed Jun. 15, 2021, which is a continuation of U.S. patent application Ser. No. 17/085,036 filed Oct. 30, 2020, now U.S. Pat. 11,068,849, which claims the priority benefit of U.S. provisional patent application No. 62/928,205 filed Oct. 30, 2019, and is related to PCT Patent Application No. PCT/US2020/058377 filed Oct. 30, 2020, which are incorporated herein by reference in their entireties.

FIELD

The present disclosure relates generally to utilizing paid time off In one example, the systems and methods described herein may provide an infrastructure to repurpose paid time off into other uses, such as cash, retirement, college savings, travel, bill payments, and the like.

SUMMARY

52% (about 67.2 million) of full-time employees in the United States do not use all of their vacation time. As a result, $300 billion of vacation liability is sitting on the balance sheets of American corporations. In addition, 78% (about 147.2 million) of full-time employees in the United States live paycheck to paycheck. Thus, there is a need in the art for methods of reducing paid time off liability on the balance sheets of corporations while enabling employees to maximize their usage of paid time off. The systems and methods described herein address this need and others by providing a web-based platform that helps companies easily lower their vacation liability, while also helping employees self-direct how they use their paid time off (PTO) benefits.

According to some embodiments, a computer-implemented method is provided. The method comprises receiving a paid time off benefit from an endpoint, such as an employer. The paid time off benefit is received in the form of hours or days off of work, or in some circumstances, credit that the employee can use to purchase time off in the future. The method further comprises converting the paid time off benefit into cash value. The cash value may be an hourly rate for work multiplied by a number of hours off of work. The method further comprises using the payment at a new endpoint, such as on a retirement account, a savings plan, a 401(k), etc.

According to some embodiments, a computer-program product is provided. The computer-program product is tangibly embodied in a non-transitory machine-readable storage medium, including instructions that, when executed by one or more processors, cause the one or more processors to perform the steps of the above method.

According to some embodiments, a system is provided. The system comprises of one or more processors, and one or more non-transitory machine-readable storage media containing instructions that, when executed on the one or more processors, cause the one or more processors to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIGS. 11A-11G show an illustrative example of an interface through which an employer can configure various settings related to employee use of paid time off according to some embodiments.

FIG. 12 shows an illustrative example of an interface through which an employer can review previously received requests to utilize paid time off and workforce demand over various periods of time according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The systems and methods described herein provide a web-based platform that helps companies easily lower their vacation liability and helps employees self-direct how they use their paid time off (PTO) benefits. The systems and methods described herein facilitate the ability for employees to unlock and receive their paid time off dollars as cash, giving them instant access to emergency funds. Further, the systems and methods described herein may allow employees to utilize their accrued PTO, as well as any future PTO balances (e.g., PTO known to be obtained in the future) to convert their PTO for different purposes.

Figure 1:
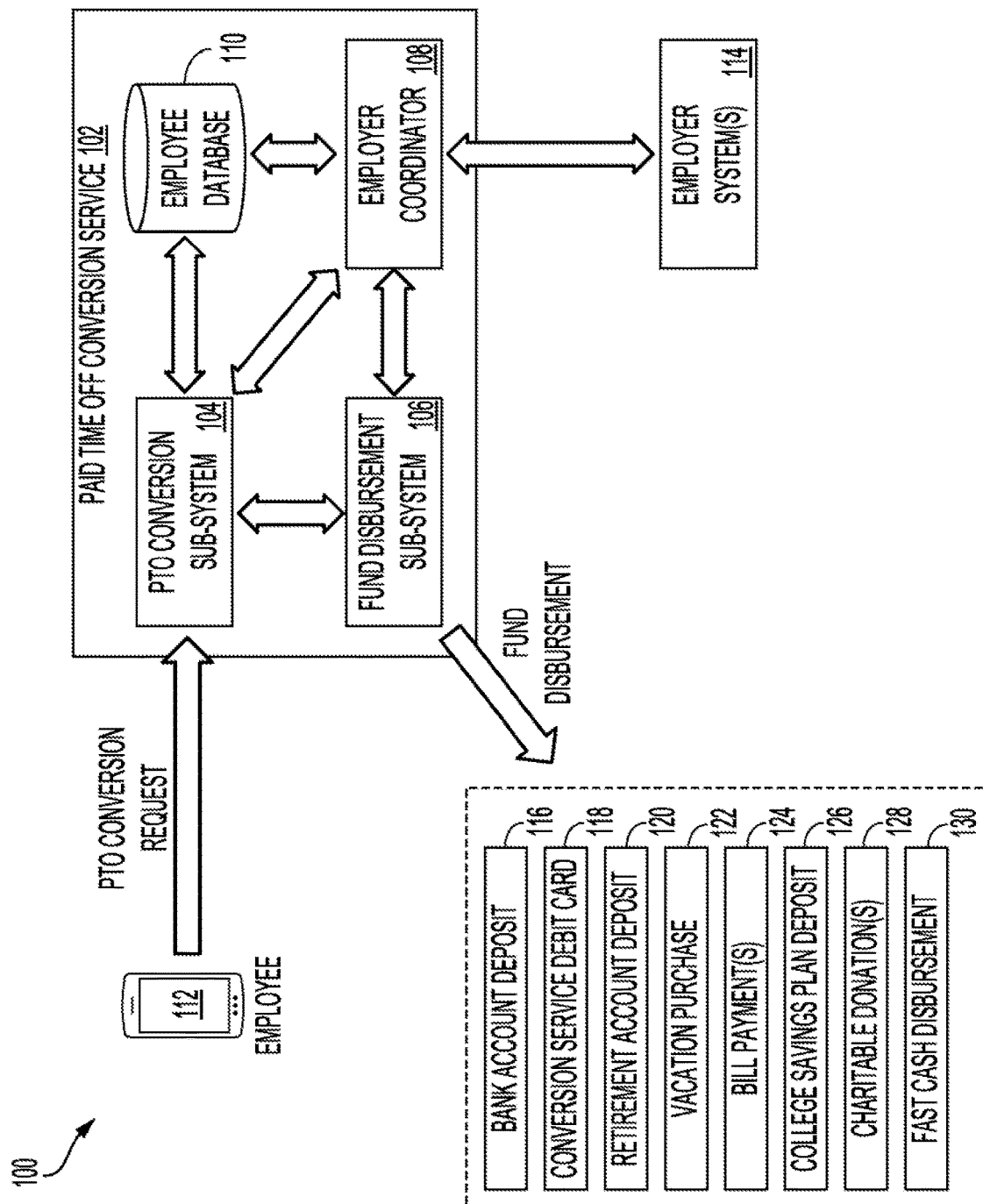
FIG. 1 shows an illustrative example of an environment in which various embodiments can be implemented.

FIG. 1 shows an illustrative example of an environment 100 in which various embodiments can be implemented. In the environment 100, an employee 112 of an employer may transmit a PTO conversion request to a PTO conversion service 102. For instance, via a platform supplied by the PTO conversion service 102 to employees of a particular employer, the employee 112 may select one or more options for converting available PTO to obtain funds, make purchases, donate to other employees, and the like. The PTO conversion service 102 may provide a platform for companies (e.g., employers) to manage their PTO liability for their employees, while providing various options to employees of these companies for using or converting their PTO. The platform provided by the PTO conversion service 102 may be implemented via an application installed on a computing device (e.g., computer system, smartphone, smartwatch, etc.) or via a website, which may be accessed via a browser application.

In an embodiment, when an employee 112 accesses the platform provided by the PTO conversion service 102, a PTO conversion sub-system 104 of the PTO conversion service 102 accesses an employee database 110 to determine what, if any, PTO is available to the employee 112 for use or conversion. The PTO conversion sub-system 104 may be implemented on a computing system or other system (e.g., server, virtual machine instance, etc.) of the PTO conversion service 102. The employee database 110 may include various key-value entries, each corresponding to a particular employee based on a unique identifier of the employee. This unique identifier may include an employee identifier associated with its employer (e.g., employee ID number, employee username as used with employer systems, etc.). In some instances, the employee identifier associated with an employee's employer may be associated with an employer identifier that, in combination, serve as the unique identifier for the employee 112. In some instances, the employee 112 may access the PTO conversion service 102 using credentials (e.g., authentication token, etc.) that are utilized to access one or more employer system 114, such as through single sign-on (SSO) authentication, federation, and the like. For example, an employee 112 may access the PTO conversion service 102 via one or more employer systems 114, whereby the employee 112 may be authenticated by these one or more employer systems 114. Alternatively, the employee 112, if accessing the PTO conversion service 102 using its own computing device, may provide an authentication token that the PTO conversion service 102 may use, in conjunction with the employer systems 114, to authenticate the employee 112.

In an embodiment, an entry within the employee database 110 specifies the PTO balances for a corresponding employee 112. For instance, an entry within the employee database 110 may specify the amount of time an employee 112 has available for PTO. Additionally, an entry within the employee database 110 may specify other employee information that may be used to determine the monetary value of the employee's available amount of time for PTO. This information may include the employee's hourly wage, the value of each PTO increment (e.g., hour, day, etc.) for the employee 112, and the like. An entry within the employee database 110 may also specify account information associated with other employee accounts, such as bank account information, retirement account information, college savings plan information, and the like.

In an embodiment, the employee database 110 is updated using an employer coordinator system 108 of the PTO conversion service 102. The employer coordinator system 108 may be implemented on a computing system or other system (e.g., server, virtual machine instance, etc.) of the PTO conversion service 102. The employer coordinator system 108 may periodically, or in response to a triggering event (e.g., new employee onboarding, employee termination, etc.), obtain employee information from one or more employer systems 114 of an employer. This employee information may include any of the aforementioned information (e.g., employee identifiers, employee wage information, employee PTO balances, etc.). The employer coordinator system 108 may update the employee database 110 using the provided employee information. In some instances, the employee database 110 may be updated by an employee 112. For instance, an employee 112 may provide, to the PTO conversion service 102, account information associated with the employee's bank accounts, retirement accounts, college savings plan accounts, and the like.

In an embodiment, when an employee 112 accesses the PTO conversion service 102, the PTO conversion sub-system 104 accesses the employee database 110 to determine the employee's current PTO balance and any available options for conversion of the employee's current PTO balance. As illustrated in FIG. 1, these available conversion options may include a bank account deposit 116, conversion to a PTO conversion service debit card 118, a retirement account deposit 120 (e.g., individual retirement accounts (IRAs), Roth IRAs, 401(k)s, and/or 457s for federal employees, etc.), a vacation or other purchase 122 (e.g., merchandise, etc.), one or more bill payments 124 (e.g., student loan pay down, credit card pay down, general bill pay, etc.), a college savings plan deposit 126 (e.g., a 529 plan, etc.), one or more charitable donations 128, fast cash disbursement 130, and the like. In some instances, the PTO conversion service 102 may provide an employee 112 with an option to convert any available PTO balance for use in any combination of the aforementioned disbursement options. As an illustrative and non-limiting example, the PTO conversion service 102 may allow an employee 112 to allocate, for a PTO conversion, a percentage of the resulting funds for deposit into a bank account and another percentage of the resulting funds for deposit into a retirement account. As another illustrative and non-limiting example, the PTO conversion service 102 may allow an employee 112 to specify a particular monetary amount from the resulting funds for each of the available conversion options. The disbursement of funds may be performed by a fund disbursement sub-system 106 of the PTO conversion service 102. The fund disbursement sub-system 106 may be implemented on a computing system or other system (e.g., server, virtual machine instance, etc.) of the PTO conversion service 102.

In an embodiment, once the employee 112 has determined the amount of available PTO that is to be converted according to one or more disbursement options, the PTO conversion sub-system 104 may transmit the conversion request to the employer coordinator 108. The employer coordinator system 108 may determine what information is to be provided to the employer systems 114 in the request for conversion of the employee's PTO. For instance, the employer coordinator system 108 may omit, from the conversion request, any information associated with the options selected by the employee 112 for disbursement of converted funds via a fund disbursement sub-system 106. This omission may be performed in order to protect the employee's privacy.

In some instances, the employer coordinator system 108 may determine whether employer approval is required for conversion of available PTO. For instance, as part of an employer onboarding process with the PTO conversion service 102, the employer may provide one or more policies that define any approval requirements for conversion of available PTO for its employees. For example, an employer may indicate that PTO conversions for certain purposes do not require authorization from the employer. Additionally, or alternatively, an employer may indicate that PTO conversions over a certain amount (e.g., that exceed a particular number of hours, days, etc.) require employer authorization. In some instances, an employer may define approval requirements per employee, whereby PTO conversions for certain individual employees may require employer approval while PTO conversions for other employees may not be required.

In an embodiment, if the employer coordinator system 108 determines that employer authorization is not required for the requested PTO conversion, the employer coordinator system 108 transmits a notification to the PTO conversion sub-system 104 to indicate that the request is approved. Alternatively, if the employer coordinator system 108 determines that employer authorization is required for the requested PTO conversion, the employer coordinator system 108 may transmit the request (absent any omitted information, as described above) to the employer systems 114 for approval. The employer may review the PTO conversion request and determine whether to approve the request. If the employer determines that the PTO conversion request is to be rejected, the employer, via the employer systems 114, may transmit a notification to the employer coordinator system 108 indicating this rejection of the PTO conversion request. In response to this notification, the employer coordinator system 108 may transmit a notification to the PTO conversion sub-system 104 to indicate that the PTO conversion request has been rejected by the employer. This may cause the PTO conversion sub-system 104 to notify the employee 112 of the employer's rejection of the PTO conversion request.

If the employer approves the PTO conversion request, the employer, via the employer systems 114, may authorize a transfer of funds equal to the value of the PTO balance that is to be converted. The employer systems 114, for instance, may obtain these funds from an employer account (e.g., corporate account, bank account, etc.) and transfer these funds to an account associated with the PTO conversion service 102. Further, the employer systems 114 may transmit a notification to the employer coordinator system 108 to indicate that the request has been approved by the employer. The notification may specify information corresponding to the transfer of funds from an employer account to a PTO conversion service account (e.g., a fund transfer confirmation from the employer's financial institution, fund receipt confirmation from the PTO conversion service's financial institution, etc.). The employer coordinator system 108 may verify that the transfer of funds has been completed and make the funds available for use according to the options selected by the employee 112.

In some instances, the transfer of funds from the employer to the PTO conversion service 102 may occur during employer pay cycles. In an embodiment, if the employer has authorized a transfer of funds equal to the value of the PTO balance that is to be converted, the PTO conversion service 102 can make the funds available from an account associated with the PTO conversion service 102 immediately for use by the employee 112 subject to the one or more selected options. The PTO conversion sub-system 104 may update the employee database 110 to indicate that these funds are to be recovered from the employer during the next employer pay cycle. Thus, during the next employer pay cycle, the PTO conversion service 102 may obtain the funds used subject to the one or more selected options. In some instances, the employer coordinator system 108 may transmit a request to the employer systems 114 during each employer pay cycle to obtain these funds as authorized by the employer. This may enable employees to convert PTO without having to wait for a next employer pay cycle.

In an embodiment, the PTO conversion service 102 provides employees with an option to donate PTO to a particular co-worker or to a pool of PTO that may be available to employees of a particular employer. If the employee 112 determines that it wishes to donate PTO to a particular co-worker, the PTO conversion sub-system 104 may access the employee database 110 to identify other employees of the employer to which the employee 112 may donate its PTO. For instance, the PTO conversion sub-system 104 may access the employee database 110 to identify the employees associated with the employer of the employee 112. The PTO conversion sub-system 104 may present identifiers (e.g., names, usernames, employee ID numbers, etc.) of these employees to the employee 112. The employee 112 may select an employee from these identifiers to indicate who the employee 112 wishes to donate its PTO to. In some instances, the employer may designate which employees are eligible to receive PTO donations from other employees. Thus, the PTO conversion sub-system 104 may present, to the employee 112, identifiers corresponding to these designated employees.

Once the employee 112 has identified another employee to whom its PTO is to be donated, the PTO conversion sub-system 104 may transmit the donation request to the employer coordinator system 108. The employer coordinator system 108 may, in turn, transmit the donation request to the employer systems 114 to determine whether the donation request is approved by the employer. In some instances, prior to providing the donation request to the employer systems 114, the employer coordinator system 108 may access the employee database 110 to determine whether the recipient employee (e.g., the employee that is to receive the donated PTO) is able to receive the donated PTO. For instance, if the employer has imposed a PTO limit per employee and the donated PTO would result in the recipient employee exceeding its PTO limit, the employer coordinator system 108 may automatically update the donation request to indicate an amount of PTO that may be donated to the recipient employee subject to its PTO limit. This amount of PTO may be lower than that originally designated by the employee 112. In some instances, the employer coordinator system 108 may transmit a notification to the PTO conversion sub-system 104 to indicate that the designated donation of PTO would result in the limit for the recipient employee being exceeded. The PTO conversion sub-system 104 may prompt the employee 112 to revise its donation request, approve any changes to its donation request (e.g., approve any reduction made by the employer coordinator system 108, etc.), or terminate the donation request.

If the employer coordinator system 108 determines that the donation request may be provided to the employer for approval, the employer coordinator system 108 may transmit the donation request to the employer systems 114. An employer may review the donation request and determine whether the PTO may be donated from the employee 112 to the designated recipient employee. For instance, the employer may verify that the recipient employee is eligible to receive PTO donations from other employees and/or has sufficient PTO capacity for the PTO donation (e.g., the PTO donation does not result in the recipient employee exceeding its PTO limit, etc.). If the employer determines that the recipient employee may receive the PTO donation from the employee 112, the employer, via the employer systems 114, may transmit a response to the employer coordinator system 108 to indicate that the donation request is approved. This may cause the employer coordinator system 108 to update the employee database 110 to indicate the new PTO balances for the employee 112 and the recipient employee.

In an embodiment, if the employer determines that the recipient employee is not eligible for the PTO donation from the employee 112, the employer can determine whether the donation request is to be denied outright or the PTO donation is to be allocated to a pool of available PTO for employees of the employer. If the employer determines that the request is denied, the employer, via the employer systems 114, may transmit a response to the employer coordinator system 108 to indicate that the PTO donation request is denied. The employer coordinator system 108 may provide this notification to the PTO conversion sub-system 104 for presentation to the employee 112. In an embodiment, if the PTO donation request is denied, the PTO conversion sub-system 104 can prompt the employee 112 to determine whether the employee 112 would prefer to donate its PTO to a pool of available PTO for employees of the employer. If the employee 112 indicates that it would prefer to donate its PTO to this pool, the PTO conversion sub-system 104 may generate a new request to donate employee PTO to the pool. The PTO conversion sub-system 104 may transmit the request to the employer coordinator system 108, which may verify that the employee 112 has available the PTO that is to be donated to the pool and transmit the request to the employer systems 114 for employer approval.

If the employer approves the PTO donation request for the pool of available PTO for its employees, the employer may transmit a response, via the employer systems 114, to the employer coordinator system 108 to indicate that the PTO donation may be allocated to the pool. The employer coordinator system 108 may update the employee database 110 to indicate the new PTO balance for the employee 112. Further, the employer coordinator system 108 may update the employee database 110 to indicate the current balance of the pool of available PTO for employees of the employer.

In an embodiment, the pool of available PTO is tracked using a monetary value rather than a metric based on time (e.g., hours, days, etc.). This may facilitate employee purchases of PTO from the pool, whereby an employee may designate a monetary amount to be used for purchasing PTO from the pool. It should be noted that the pool of available PTO may be tracked using other metrics. For instance, the pool of available PTO may be tracked using a time-based metric (e.g., hours, days, etc.) as described above. Alternatively, the pool of available PTO may be tracked using any other non-fiat proxy for monetary value, such as rewards points and the like. For instance, if an employee wishes to purchase PTO from the pool using rewards points, the employee may be presented with the current amount of PTO available in the pool using rewards points.

In response to a request to purchase PTO from the pool, the PTO conversion sub-system 104 may access the employee database 110 to determine the employee's hourly wage and calculate the amount of PTO that can be purchased with monetary amount specified by the employee. In some instances, the employee may specify, using a time-based metric (e.g., hours, days, etc.), how much PTO it wishes to purchase from the pool. The PTO conversion sub-system 104 may access the employee database 110 to determine the employee's hourly wage and calculate the total cost of the PTO that is to be purchased from the pool. This total cost may be presented to the employee, who may determine whether to move forward with its request or revise the request. Further, the PTO conversion sub-system 104 may determine whether the pool has sufficient PTO available (e.g., the total cost does not exceed the funds allocated in the pool) to accommodate the PTO purchase request. If so, the PTO conversion sub-system 104 may transmit the PTO purchase request to the employer coordinator system 108 which, in turn, may transmit the request to the employer systems 114 for employer approval, if required.

If the employer approves the PTO purchase request, the employer coordinator system 108 may update the pool to reflect the amount of PTO available. Further, the employer coordinator system 108 may update the employee database 110 to indicate the new PTO balance for the employee that purchased the PTO from the pool. These updates may be provided to the employer systems 114 to allow for employer tracking of employee PTO balances and of the pool balance. The PTO purchase amount may be obtained via a payroll deduction equal to the amount of PTO being purchased or through other methods (e.g., credit card payment, bank transfer, money order, etc.).

In an embodiment, the PTO conversion service 102 provides the employee 112 with an option to buy back previously converted and/or donated PTO. For instance, when an employee 112 accesses the PTO conversion service 102, the PTO conversion sub-system 104 may access the employee database 110 to determine what amount of PTO the employee 112 has converted and/or donated over a period of time prior to the employee's accessing the PTO conversion service 102. This period of time may be determined by the employer. For instance, the employer may allow an employee 112 to buy back PTO converted and/or donated during a pre-determined period of time (e.g., over the past fiscal year, over an enrollment period, etc.). The PTO conversion sub-system 104 may further determine the employee's available capacity for buying back PTO (e.g., the employee's current PTO limit minus the employee's current PTO balance). Based on employee's available capacity and prior PTO conversions and/or donations, the PTO conversion sub-system 104 may present the employee 112 with an option to buy back a certain amount of PTO.

In an embodiment, the PTO conversion sub-system 104 can present the employee 112 with an option to schedule buy back of any converted and/or donated PTO when the employee 112 submits a request to convert and/or donate PTO. The employee 112 may specify a future date at which the PTO conversion sub-system 104 may present the employee 112 with an option to buy back any previously converted and/or donated PTO. The PTO conversion sub-system 104 may update the employee database 110 to indicate this future date. In an embodiment, on the designated date, the PTO conversion sub-system 104 transmits a notification (e.g., e-mail, Short Message Service (SMS) message, etc.) to the employee 112 to indicate that the employee 112 may be eligible to buy back PTO from the PTO conversion service 102. Alternatively, in an embodiment, if the employee 112 accesses the PTO conversion service 102 and the PTO conversion sub-system 104 determines that the designated date has passed, the PTO conversion sub-system 104 may present the employee 112 with an option to buy back any previously converted and/or donated PTO.

If the employee 112 submits a request to buy back a certain amount of PTO from the PTO conversion service 102, the PTO conversion sub-system 104 may calculate the cost of the PTO to be purchased. For instance, the PTO conversion sub-system 104 may access the employee database 110 to determine the employee's hourly wage. Using the employee's hourly wage, and the amount of PTO that is to be purchased, the PTO conversion sub-system 104 may determine the employee's cost for buying back the PTO and present this cost to the employee 112 for its approval. If the employee 112 indicates that it wishes to proceed with the buy back request, the PTO conversion sub-system 104 may transmit the buy back request to the employer coordinator system 108 for delivery to the employer systems 114 for employer approval.

If the employer approves the PTO buy back request, the employer may transmit, via the employer systems 114, a notification to the employer coordinator system 108 to indicate that the request has been approved. The notification may indicate whether the monetary amount corresponding to the PTO being bought back is to be deducted from the employee's payroll during the employer's next pay cycle or to be collected by the PTO conversion service 102 from the employee 112 upon notifying the employee 112 of the employer's approval. If the monetary amount for the PTO is to be obtained from the employee 112, the employer coordinator system 108 may transmit a notification to the PTO conversion sub-system 104 to indicate that the PTO buy back request has been approved and that payment is due for the PTO. The PTO conversion sub-system 104 may collect payment from the employee 112 and provide this payment to the employer via a designated deposit location (e.g., bank account, corporate account, etc.).

Figure 2:
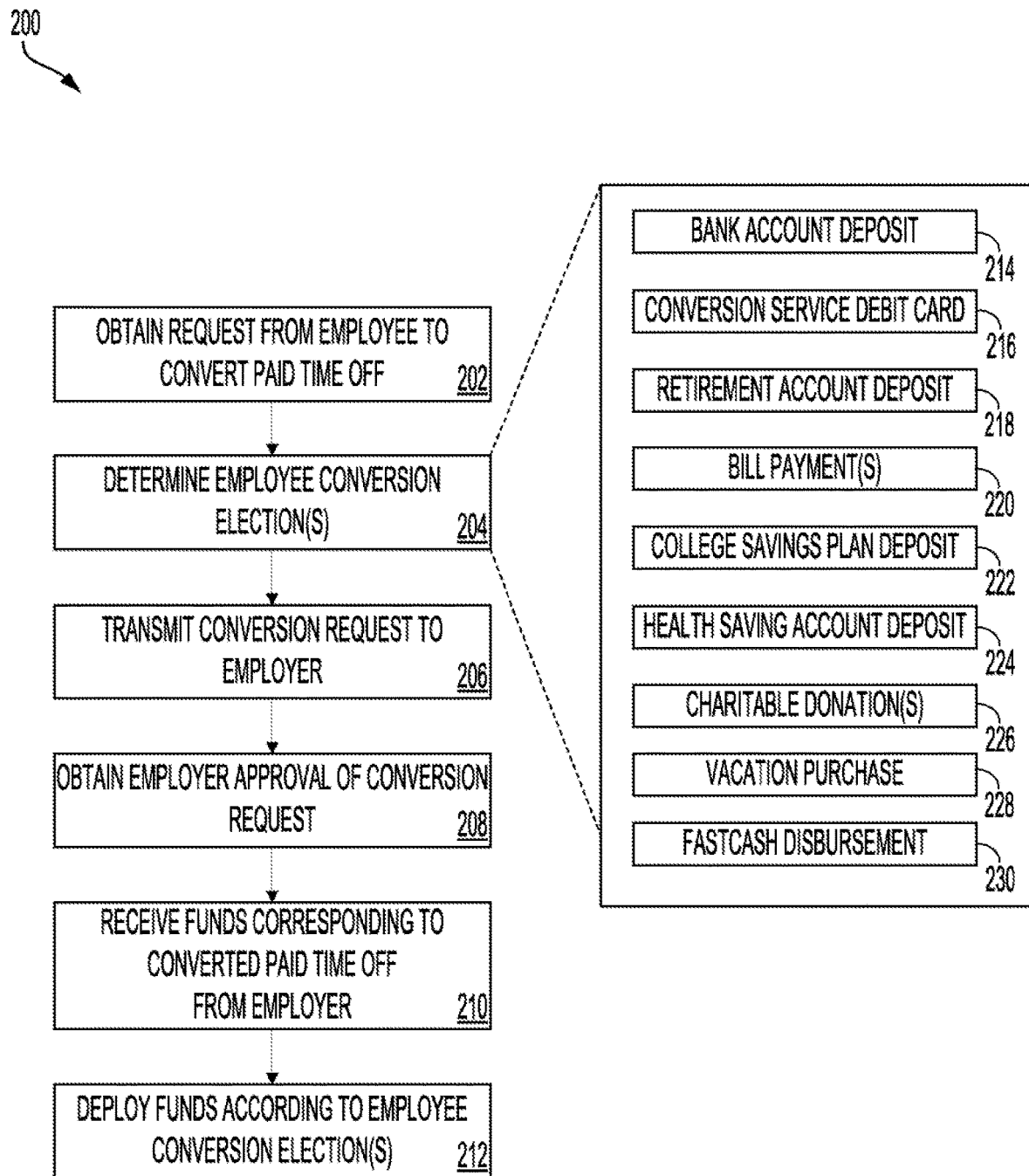
FIG. 2 shows an illustrative example of a flow diagram for a method for repurposing paid time off in accordance with one or more options selected by an employee according to some embodiments.

FIG. 2 shows an illustrative example of a flow diagram for a method 200 for repurposing paid time off in accordance with one or more options selected by an employee according to some embodiments. The method 200 may be performed by the PTO conversion service, which may process incoming employee requests to repurpose PTO according to one or more options selected by employees in their requests.

At step 202, an employee may request to convert a particular amount of PTO according to one or more conversion elections of options selected by the employee via an interface of the PTO conversion service (e.g., via an application implemented on a computing device, via a website maintained by the PTO conversion service, etc.). Although described herein throughout as an application or website, it is contemplated that an employee may request to convert his paid time off using any suitable technology and any suitable communication platform, as well as combinations thereof. For example, an employee may request conversion of his paid time off via a watch connected to a mobile device using Bluetooth, while the mobile device may connect to the platform using WiFi or cellular technology. In another example, short message service implemented by a chat bot may be used.

At step 204, the PTO conversion service evaluates the PTO conversion request to determine the conversion elections made by the employee. For instance, an employee may elect to send the cash value of his paid time off conversion directly to his bank account 214, a debit card 216, or to deploy the funds in any of a number of other ways and to a number of other endpoints and combinations thereof. For example, suitable endpoints may include retirement accounts 218 (e.g., individual retirement accounts (IRAs), Roth IRAs, 401(k)s, and/or 457s for federal employees), bill pay 220 (e.g., student loan pay down, credit card pay down, and/or general bill pay), 529 college savings plans 222, health savings accounts (HSAs) 224, charities 226, vacations purchases (e.g., purchase vacation packages, cruises, purchase flights, pay for hotel rental, and/or pay for car rental) 228, and/or the like. Additionally, the employee can elect to convert his paid time off to fast cash 230 which gives the employee instant access to his paid time off cash value.

At step 206, the PTO conversion service may transmit a PTO conversion request to the employer. The company for which the employee works may receive the conversion request via an e-mail alert, text message or a push notification via the platform. Although described as being sent via e-mail or a push notification, it is contemplated that any suitable notification can be used to inform the company of the conversion request. In addition, the use of the funds may not be disclosed to protect the employee's privacy. In some embodiments, a company may elect not to be notified, and approval may be optional. In some embodiments, use of the funds may be reported anonymously in the aggregate.

At step 208, the PTO conversion service may obtain employer approval of the conversion request. As noted above, the company may approve the employee request which effectively authorizes a transfer of funds from the company account to an account associated with the PTO conversion service. The transfer of funds to the account associated with the PTO conversion service may be performed during the company's next pay cycle or at an alternative time agreed upon between the company and the PTO conversion service (e.g., immediately, within a particular amount of time, etc.). In some embodiments, approval is optional. If approval is not required for the PTO conversion, the PTO conversion service may submit a request to the employer to obtain the funds corresponding to the PTO being converted from the company.

At step 210, the PTO conversion service receives the funds transferred from the company to the platform account and corresponding to the converted PTO. Through utilization of a ledger system, the platform may segregate the amounts for each employee to ensure that all money is accounted for and allocated correctly. The ledger system may be any suitable ledger, including but not limited to a blockchain ledger. At step 212, the PTO conversion service may deploy the obtained funds to various endpoints as determined by the employee in its PTO conversion request.

It should be noted that the method 200 may be executed using additional and/or alternative steps than those illustrated in FIG. 2 and described above. For example, in an embodiment, rather than transmitting a conversion request to an employer and obtaining employer approval of the conversion request, the PTO conversion service allows an employer to define various policies and rules that can be used by the PTO conversion service to automatically determine whether to approve a PTO conversion request from an employee. For example, as described in greater detail herein, an employer may define one or more rules or policies that set limits on how an employee may convert their PTO for various purposes (e.g., limits on the amount of PTO that can be converted, travel restrictions, timing restrictions, etc.). The PTO conversion service may utilize these various policies and rules defined by the employer to automatically approve or reject a request from an employee to convert PTO. Further, the PTO conversion service may utilize these various policies and rules to limit the options for PTO conversion that are presented to the employee.

Figure 3:
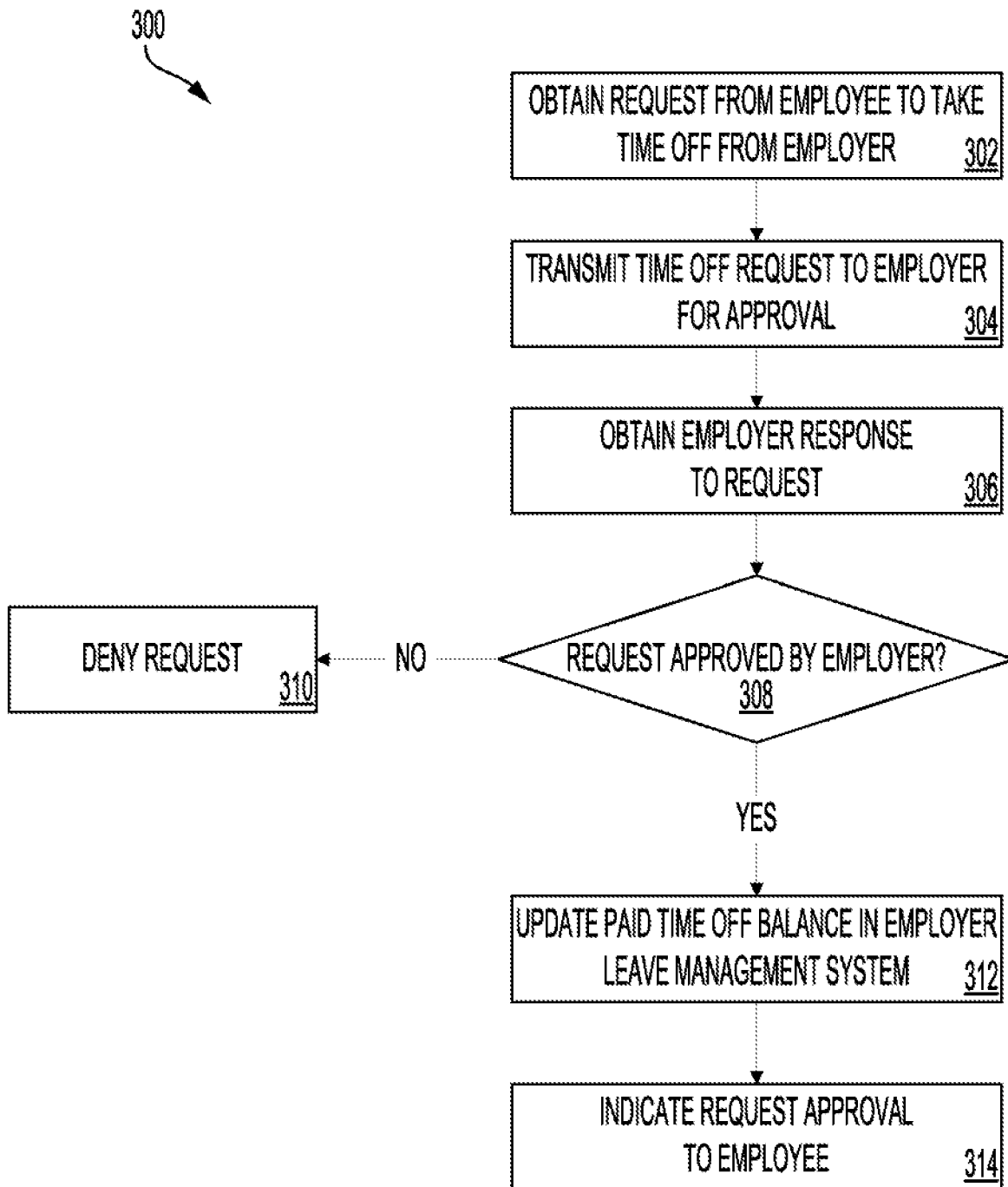
FIG. 3 shows an illustrative example of a flow diagram for a method for requesting paid time off subject to employer approval according to some embodiments.

FIG. 3 shows an illustrative example of a flow diagram for a method 300 for requesting paid time off subject to employer approval according to some embodiments. The process 300 may be performed by the PTO conversion service, which may process incoming employee requests to leverage their available PTO balances, subject to employer approval, to take time off from the employer.

At step 302, the PTO conversion service obtains a request from an employee to take a particular amount of PTO from its employer. The request may specify the amount of PTO that the employee wishes to take from its employer, as well as any other information that may be useful to the employer in determining whether to approve the request (e.g., reason for taking PTO, dates during which PTO is to be taken, etc.). In an embodiment, the PTO conversion service can present the employee with its available PTO balance, as provided by the employer. As noted above, the PTO conversion service may maintain an employee database, which may include an entry for each employee authorized to access the PTO conversion service. The entry may specify any available PTO balances, an employee's hourly wage, any identifying information of the employee, any applicable policies or rules implemented by the employer for the employee (e.g., limits on PTO conversions, limits on PTO that may be taken over a period of time, etc.).

At step 304, the PTO conversion service transmits the PTO request to the employer for employer approval. In an embodiment, prior to transmitting the PTO request, the PTO conversion service determines whether the request requires employer approval. For instance, if the PTO conversion service determines, based on one or more applicable policies or rules, that the employee is not authorized to use its PTO, the PTO conversion service may automatically deny the PTO request without seeking employer approval. Similarly, if the PTO conversion service determines that the employee does not have sufficient PTO available, the PTO conversion service may automatically deny the request. In some instances, employer approval may not be required for PTO requests. If so, the PTO conversion service may automatically approve the request and indicate that the employee may use the requested PTO. The PTO conversion service may transmit a notification to the employer to indicate that the employee is using its PTO and any corresponding PTO dates (as indicated by the employee).

At step 306, the PTO conversion service obtains a response from the employer with regard to the PTO request from the employee. The response may specify whether the request has been approved by the employer. In some instances, the response may specify a variance to the PTO amount specified in the request. For instance, an employer may determine that the employee cannot take the entire PTO amount specified in the request but can rather take a reduced PTO amount. The employer may specify this new, proposed PTO amount in its response to the PTO conversion service.

At step 308, the PTO conversion service may evaluate the response from the employer to determine whether the PTO request has been approved by the employer. If the PTO conversion service determines that the request has been denied by the employer, the PTO conversion service, at step 310, may deny the request. The PTO conversion service may transmit a notification to the employee to indicate that the employer has denied its PTO request and provide any rationale provided by the employer in its response to the request.

If the PTO conversion service determines that the PTO request has been approved, or the employer has indicated a different amount of PTO that may be taken by the employee, the PTO conversion service, at step 312, may update the employee's PTO balance in an employer leave management system. For instance, the PTO conversion service may access the employer leave management system of the employer and update an entry corresponding to the employee to deduct the amount of PTO requested or otherwise approved by the employer. Further, the PTO conversion service may update its employee database to update the employee's PTO balance, thus maintaining synchronization between the PTO conversion service and the employer leave management system. Further, at step 314, the PTO conversion service may transmit a notification to the employee to indicate that the PTO request has been approved by the employer.

Figure 4:
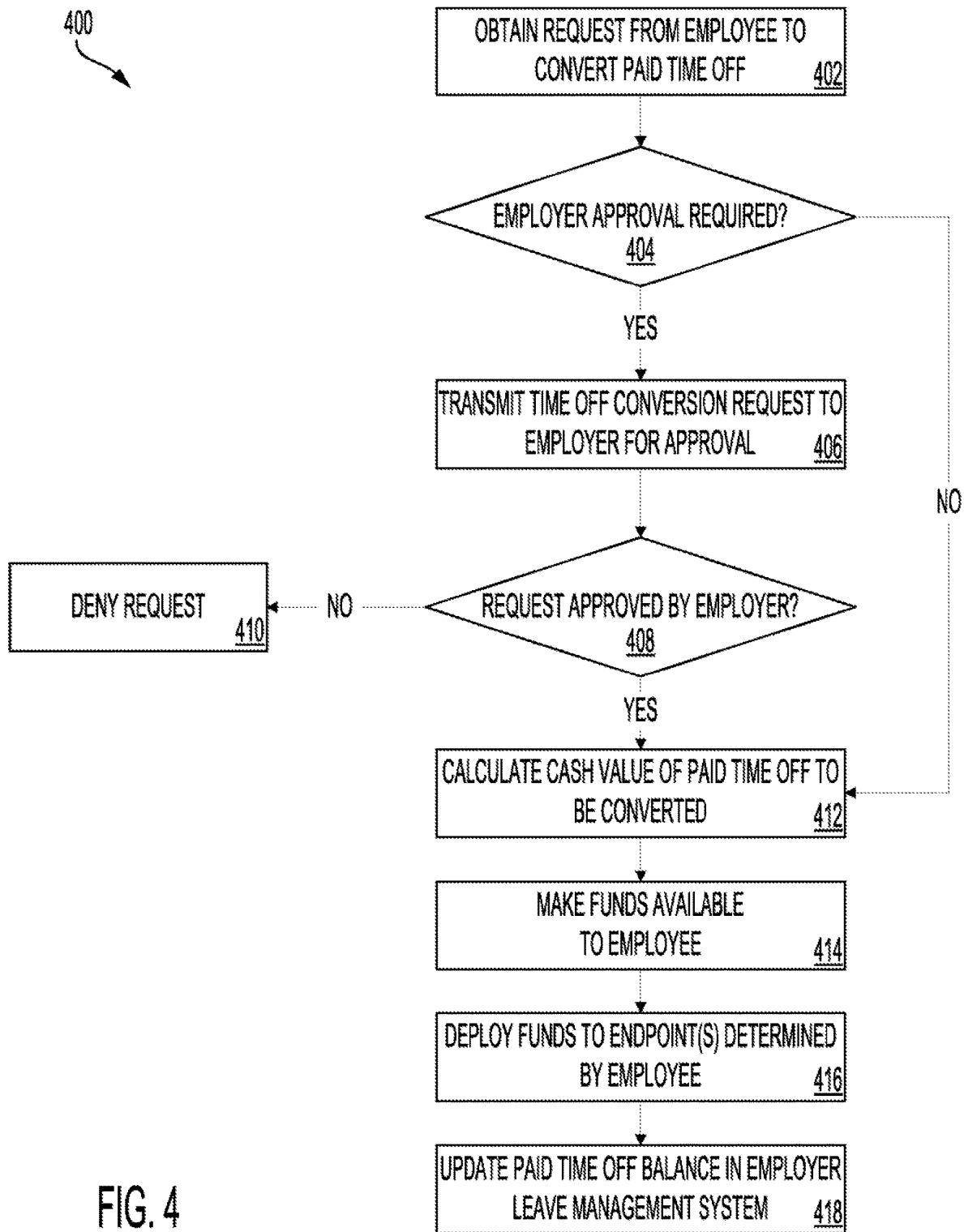
FIG. 4 shows an illustrative example of a flow diagram for a method for repurposing paid time off for disbursement to one or more endpoints according to some embodiments.

FIG. 4 shows an illustrative example of a flow diagram for a method 400 for repurposing paid time off for disbursement to one or more endpoints according to some embodiments. The process 400 may be performed by the PTO conversion service, which may process incoming employee requests to repurpose PTO according to one or more options selected by employees in their requests. Further, the PTO conversion service may interact with an employer, via one or more employer systems, to obtain approval for received employee requests to repurpose PTO according to the one or more options selected by employees in their requests.

In this embodiment, the method may start at step 402, where the PTO conversion service obtains a request from an employer to convert its PTO according to one or more options. As noted above, an employee may do a number of things with paid time off, such as converting its PTO to cash, converting its PTO for financial wellness (e.g., retirement accounts, college savings plans, mutual funds, bill payment, etc.), vacation planning, and the like. As such, the employee may request to convert his paid time off into cash ("cash conversion"), request to contribute paid time off cash value into financial instruments ("financial wellness"), and/or elect to use paid time off cash value to purchase travel products ("vacation planning").

At step 404, the PTO conversion service may determine whether the request requires approval from the employee's employer. For instance, the PTO conversion service may access an entry corresponding to the employee that submitted the request in an employee database to identify any policies or rules implemented by the employer for the particular employee. These policies or rules may define limitations on the requests that can be submitted by the employee. For example, a policy or rule may indicate that requests to convert PTO for particular purposes require employer approval while other types of requests may be automatically approved by the PTO conversion service and processed accordingly. Thus, if an employee entry within the employee database includes one or more policies or rules applicable to PTO conversion requests from the employee, the PTO conversion service may evaluate these one or more policies or rules to determine whether employer approval is required for fulfillment of the PTO conversion request.

If the PTO conversion request requires approval, the PTO conversion service may transmit the request to the employer to obtain employer approval at step 406. The transmission to the employer may include the PTO conversion request, as submitted by the employee to the PTO conversion service, as well as any additional information that may be useful to the employer in determining whether to approve the request or not. For instance, the PTO conversion service may provide, in the transmission, the employee's current PTO balance, the amount of PTO previously taken by the employee or previously converted for another purpose over a period of time, any explanation or rationale submitted by the employee for its PTO conversion request, and the like.

The PTO conversion service may monitor the communication channel with one or more employer systems utilized by the employer to obtain responses from the employer regarding the submitted PTO conversion request. If a response from the employer is received, the PTO conversion service may determine, at step 408, whether the PTO conversion request is approved by the employer. In an embodiment, if a response to the PTO conversion request is not received within a predetermined period of time (e.g., prior to an expiration time, etc.), the PTO conversion service may determine that the request is not approved by the employer and, at step 410, deny the PTO conversion request. Similarly, if the request is not approved, the PTO conversion service, at step 410, may deny the PTO conversion request and the process ends without further action.

If the request is approved, or the request does not require approval, the PTO conversion service may calculate the paid time off cash value of the PTO that is to be converted at step 412. For instance, the PTO conversion service may access the employee database to determine an hourly salary rate of the employee, as submitted by the employer. Using this hourly salary rate and the amount of PTO that is to be converted, the PTO conversion service may calculate the cash value of the PTO that is to be converted. It should be noted that, in some instances, the value of a unit of PTO (e.g., hour, day, etc.) may differ from an employee's actual salary. Thus, an entry within the employee database corresponding to the employee may specify two different values: a value corresponding to units of PTO for the employee and a value corresponding to units of employee salary for the employee. The PTO conversion service may, thus, utilize the value corresponding to units of PTO to determine the cash value of the PTO that is to be converted for the employee.

At step 414, the PTO conversion service may make the funds resulting from the conversion of the PTO available to the employee via the PTO conversion service or via the employer. For instance, the PTO conversion service may update the employee's account maintained by the PTO conversion service to indicate that the converted funds are available for use subject to the employee's conversion option selections. Alternatively, if the employee has indicated that the funds are to be made available via its employer, such as through an employer system, the PTO conversion service may transmit a notification to the employer to make the funds available to the employee through the employer system.

At step 416, the PTO conversion service may facilitate deployment of funds to one or more endpoints determined by the employee. For instance, the PTO conversion service may obtain the converted funds from the employer, as noted above, and identify the appropriate endpoints for these funds based on the employee's conversion option selections. For example, if the employee has indicated that the converted funds are to be deposited in the employee's bank account, the PTO conversion service may transmit a request to the employee's banking institution to deposit the converted funds into the employee's bank account. In an embodiment, if the employee has specified that a particular percentage of the converted funds are to be deployed to a first endpoint and the remaining percentage of the converted funds are to be deployed to a second endpoint, the PTO conversion service divides the funds according to the employee's percentage allocations and deploy the funds to these endpoints accordingly. As another example, the employee may specify a particular monetary amount that is to be deployed to a particular endpoint and indicate that the remaining amount is to be deployed equally amongst a number of other endpoints. The PTO conversion service may deploy the particular monetary amount to the particular endpoint, calculate the remaining monetary amount, divide this remaining monetary amount based on the number of other endpoints specified by the employee, and deploy the divided remaining monetary amount to these other endpoints. Thus, the PTO conversion service may allow an employee to designate various endpoints and tailor disbursement of funds among these various endpoints. At step 418, the PTO conversion service may update the balance of available paid time off in the employer leave management system to synchronize the PTO conversion service and the employer leave management system.

PTO Conversion for Cash Disbursements

Cash conversion may give employees access to cash from paid time off quicker than waiting for the employer to process and pay out the conversion request during normal pay cycles. The employee may get access to his paid time off cash value within a short period of time as opposed to waiting until the next pay cycle to obtain this cash value from the employer. Through the PTO conversion service, an employee can also self-direct funds via conversion of PTO to any number of endpoints including but not limited to 401(k), IRA, 529 college savings plans, student loan pay down, credit card pay down, debit card, deposit the money into his personal bank account, into a digital wallet, onto a debit card, or use the money to reimburse vacations, flights, cruises, or hotels directly purchased with the paid time off. In some embodiments, the PTO conversion service may make the purchase on behalf of the employee and may itself be reimbursed, instead of the employee fronting the cash and being reimbursed later.

For example, an employee's washing machine may break and payday is not for another 2 weeks. The employee may decide to convert 5 or her 10 paid time off days to cash faster than waiting for payroll to run to pay for the repair. In another example, an employee may have to pay for a bill at the end of the week and does not get paid for another 2 weeks. The employee may decide to convert 2 out of her 14 paid time off days to pay the bill.

Cash conversion may be self-funded by the PTO conversion service described herein, funded by the employer, funded by a pre-designated banking partner, or funded by a selected banking partner. According to some embodiments, an employee may want to convert paid time off to cash. The employee may request conversion of paid time off to cash directly from the employer or through the PTO conversion service. If requested through the employer via a custom human resources system, the employer may notify the PTO conversion service of the paid time off conversion request via a flat file, i.e., a spreadsheet, or e-mail that is sent to the system on a predetermined basis. If requested through the employer via a human resources systems provider, the employer's human resources software may automatically send a notification to the PTO conversion service via an application programming interface (API), WebHook, or flat file that paid time off conversion has been requested. If requested through the PTO conversion service, the PTO conversion service may send a notification to the employer that conversion has been requested.

In some embodiments, if required by the employer paid time off policy, the employer may approve or deny the conversion request. Fees and taxes may be calculated and the employee may be presented with the option to get paid time off cash value in his next paycheck, within a few business days, or via fast cash as described further herein. In this example, the employee may select within a few business days. A request may be sent to an operating account to release funds to advance the paid time off cash value minus fees and taxes. As described herein, the operating account may be operated by the system, by the employer, or by a banking partner. Within a few business days, the funds may be distributed to the employee's desired endpoint.

As described above, a fast cash option may be available by the PTO conversion service to give the employee instant access to his paid time off funds. The employee may get access to his paid time off cash value quickly. Once the employee has access to his cash, the employee can then self-direct the funds to any number of financial products including but not limited to 401(k), IRA, 529 college savings plans, student loan pay down, credit card pay down, credit card, or simply to deposit the money into his personal bank account. In some instances, the funds can be deployed to any number of financial products automatically by the PTO conversion service based on the conversion options selected by the employee in its request to convert its PTO.

In one example, an employee's washing machine may break and pay day is not for another two weeks. Even then, she cannot afford the repair as money is very tight at the moment so she decides to convert 5 out of her 10 paid time off days to cash instantly via fast cash to pay for the repair. In a second example, an employee's son may chip a tooth and money is already tight as is. She may decide to convert 3 out of her 5 paid time off days to cash instantly via fast cash to pay for her son's dental work.

Figure 5A:
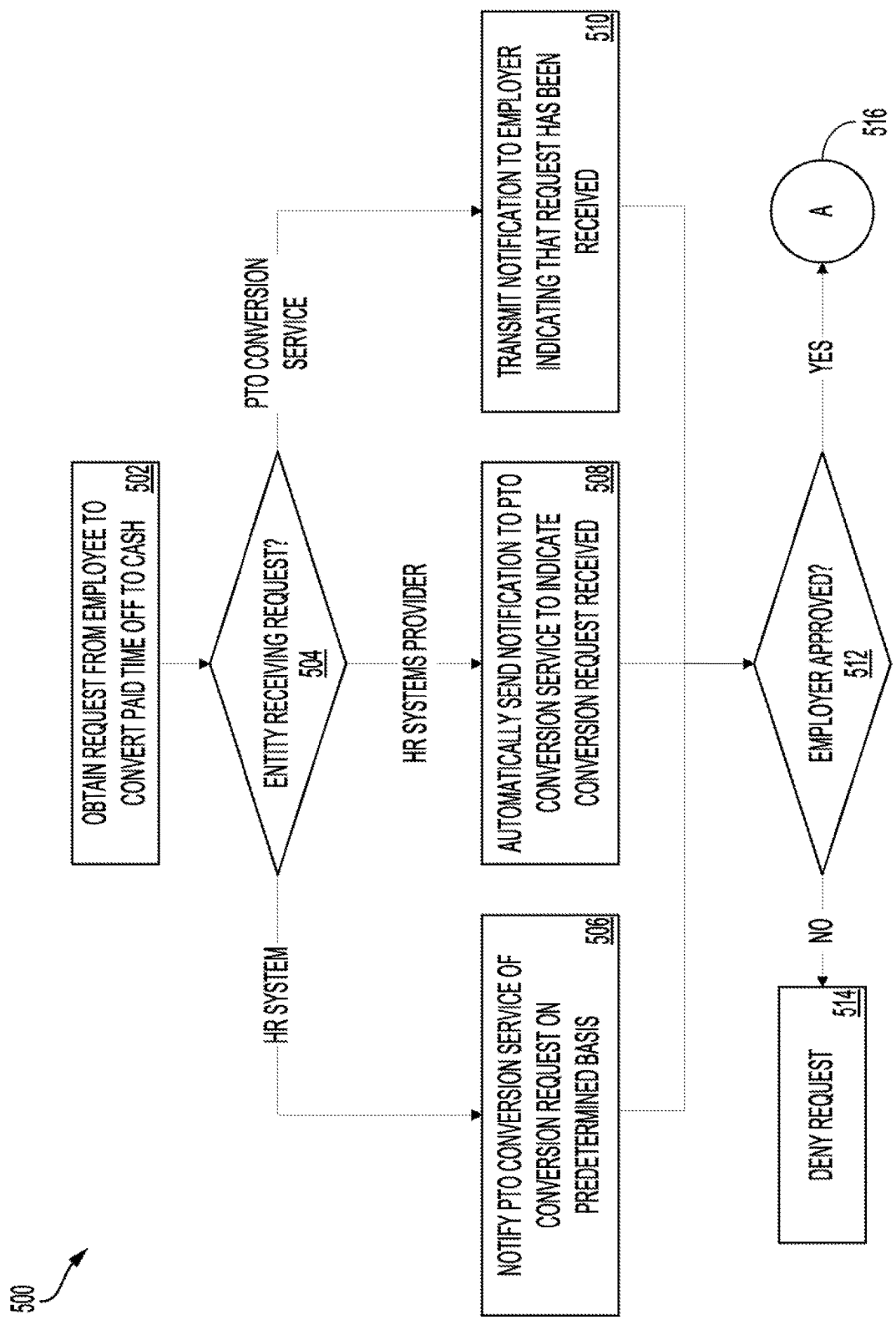
FIGS. 5A-5B show an illustrative example of a flow diagram for a method for obtaining fast cash by repurposing paid time off and scheduling buy back of paid time off at a later date according to some embodiments.
Figure 5B:
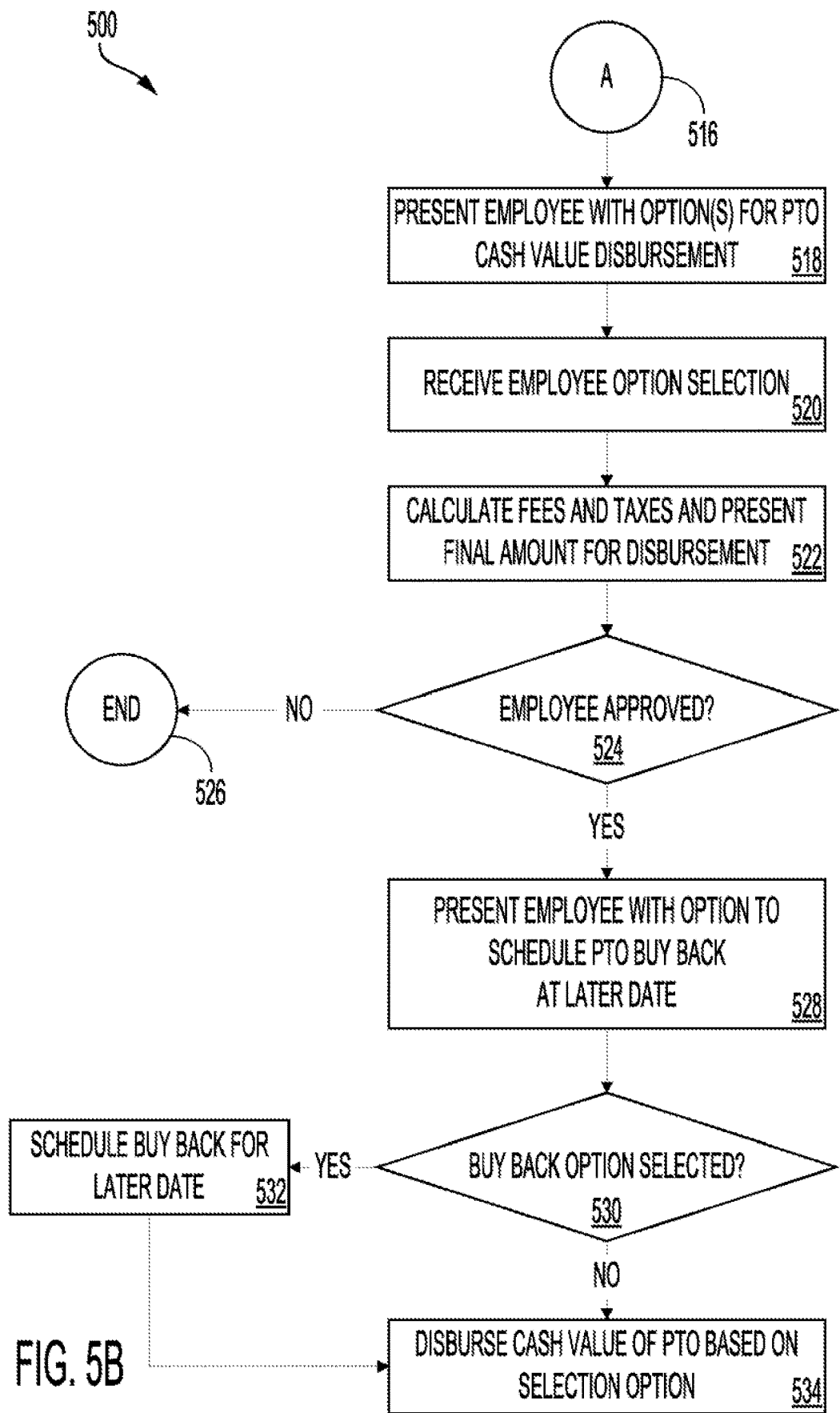

FIGS. 5A-5B show an illustrative example of a flow diagram for a method 500 for obtaining fast cash by repurposing paid time off and scheduling buy back of paid time off at a later date according to some embodiments. The process 500 may be performed by the PTO conversion service in conjunction with a human resources system or a human resources system provider utilized by an employer, depending on whether a PTO conversion request is received at the PTO conversion service or via an employer system. For instance, an employee may request conversion of paid time off from the employer, via a human resources system or a human resources system provider, or through the PTO conversion service. As discussed previously, however, any suitable connected software and/or device may be used by the employee to request conversion of paid time off, and conversion is not limited to a website or mobile application implemented by the PTO conversion service. In addition, a combination of several software and/or device components may be used to facilitate a single conversion request or multiple conversion requests.

At step 502, a request from an employee is obtained to convert an amount of the employee's PTO into cash. As noted above, the employee may submit a PTO conversion request via the PTO conversion service or through its employer. The request may specify an amount of PTO that is to be converted to cash. For instance, the employee may indicate, in its PTO conversion request, an amount of hours, days, or other time metric that the employee wishes to convert to cash.

At step 504, it is determined which entity has received the PTO conversion request from the employee. For instance, if the employee requests conversion of paid time off through the employer via a custom human resources (HR) system, the employer, via the HR system, may notify the PTO conversion service of a paid time off conversion request on a pre-determined basis at step 506. For instance, the HR system may transmit, to the PTO conversion system, a flat file (e.g., a spreadsheet) on a predetermined basis. The flat file may include various PTO conversion requests obtained by the HR system over a period of time, such that the PTO conversion service may perform a batch process to perform PTO conversions for one or more employees, as specified in the flat file.

If the employee requests conversion of paid time off through the employer via an HR systems provider, the employer's HR software, at step 508, may automatically send a notification to the PTO conversion service via an application programming interface (API) or WebHook that paid time off conversion has been requested by a particular employee. The notification may specify the amount of PTO that is to be converted, as well as the one or more conversion options selected by the employee. Further, the notification may specify the amount of time (e.g., hours) from the employee's paid time off balance that is to be converted to cash. In some instances, the notification may include additional information that may be used by the PTO conversion service for processing the request. For instance, the notification may specify any PTO balances of the employee, the employee's hourly wage or other salary information, any policies or rules that may be applicable for processing PTO conversions requests from the employee, and the like.

If the employee requests conversion through a website or mobile application of the PTO conversion service, the PTO conversion service may send a notification to the employer that conversion has been requested at step 510. The notification may include the PTO conversion request, as submitted by the employee to the PTO conversion service, as well as any additional information that may be useful to the employer in determining whether to approve the request or not. For instance, the PTO conversion service may provide, in the transmission, the employee's current PTO balance, the amount of PTO previously taken by the employee or previously converted for another purpose over a period of time, any explanation or rationale submitted by the employee for its PTO conversion request, and the like.

The employer may approve or deny the PTO conversion request at step 512. If the employer does not approve the PTO conversion request, the PTO conversion request may be denied at step 514. For instance, if the PTO conversion request was received at the PTO conversion service, the employer may transmit a notification to the PTO conversion service to indicate that the PTO conversion request is to be denied. This may cause the PTO conversion service to notify the employee of the employer's rejection of the PTO conversion request. If the PTO conversion request was received via the employer's HR system or an HR systems provider, the employer may directly inform (such as through the employer's HR system or HR systems provider) the employee that the request has been denied.

If the request is approved, method may continue to step 516 and the employee may be presented, at step 518, with the one or more options for disbursement of their paid time off cash value. The options that may be presented to the employee may include a bank account deposit, a conversion to a PTO conversion service debit card, a retirement account deposit, a vacation or other purchase, one or more bill payments, a college savings plan deposit (e.g., a 529 plan, etc.), one or more charitable donations, fast cash disbursement, and the like.

In some embodiments, one or more of these options may be presented to the employee based on machine learning and/or artificial intelligence techniques applied to similarly situated employees. For example, the PTO conversion service may use a machine learning algorithm, trained using supervised learning techniques, to generate or otherwise identify one or more options that may be presented to an employee for disbursement of their PTO cash value. A dataset of options presented to employees for conversion of PTO, of employee option selections from these options, and information corresponding to these employees (e.g., PTO balances, PTO amount being converted, employee wage information, employee position with employer, etc.) may be used to generate a set of sample employee profiles that may indicate an employee's individual option preferences. Based on a sample employee profile, the PTO conversion service may provide an employee with one or more conversion options based on a sample employee profile generated for the employee. Based on the employee's selection of an option from the one or more conversion options provided by the PTO conversion service or of a different option, the PTO conversion service may update one or more model coefficients of the machine learning algorithm to either reinforce the algorithm (e.g., if the employee selects an option from those presented by the PTO conversion service) or to revise the algorithm to provide more tailored options (e.g., if the employee selects an option that was not originally presented by the PTO conversion service or otherwise rejects the options presented by the PTO conversion service). Through this iterative process, the machine learning algorithm may be trained to provide tailored conversion options that are likely to be selected by an employee seeking to convert its PTO.

At step 520, the employee's selection of one or more options from the set of options presented to the employee may be received. For instance, the employee may select an option to disburse funds resulting from conversion of the PTO to the employee via fast cash. Alternatively, the employee may select an option to disburse these funds via a PTO conversion service debit card, which may be provided to the employee within a number of business days. In some instances, the employee may select more than one option for disbursement of these funds. For instance, the employee may specify that a particular amount of the funds are to be disbursed in the form of fast cash, while the remaining amount is to be disbursed to the employee in the form of a PTO conversion service debit card. It should be noted that disbursement of funds may be performed subject to any combination of options and allocations as specified by the employee in response to presentation of the various options for PTO cash value disbursement.

If the employee selects a fast cash or one or more other cash disbursement options, the PTO conversion service, at step 522, may calculate fees and taxes, then present the employee with the final amount to be disbursed. The PTO conversion service may determine, at step 524, whether the employee accepts the final amount for disbursement. For instance, the PTO conversion service may present the employee with options to accept the final amount for disbursement, reject the final amount for disbursement, or adjust the amount of PTO to be converted. For instance, if the resulting amount for disbursement is insufficient to satisfy the employee's needs, the employee may request conversion of additional PTO. If the employee does not approve of the final amount for disbursement and chooses to reject this final amount, the method may end at step 526 without disbursement of the final amount, thereby maintaining the employee's current PTO balance.

If the employee accepts the final amount for disbursement according to the one or more options selected by the employee, the PTO conversion service may present the employee with an option to schedule buy back of the converted PTO at a later date at step 528. The employee may specify a future date at which the PTO conversion service may present the employee with an option to buy back any previously converted PTO. At step 530, the PTO conversion service may determine whether the employee has opted to schedule future buy back of any converted PTO. If the employee has selected the buy back option and has specified a particular date for the buy back of converted PTO, the PTO conversion service, at step 532, may update the employee database to indicate this future date and schedule presentation of a buy back option on this date. In an embodiment, on the designated date, the PTO conversion service transmits a notification (e.g., e-mail, SMS message, etc.) to the employee to indicate that the employee may be eligible to buy back PTO from the PTO conversion service. Alternatively, in an embodiment, if the employee accesses the PTO conversion service and the PTO conversion service determines that the designated date has passed, the PTO conversion service may present the employee with an option to buy back any previously converted PTO.

In an embodiment, the PTO conversion service can use a machine learning algorithm, trained using supervised learning techniques, to provide the employee with a proposed later date or range of later dates for buy back of the converted PTO. For instance, a dataset of employee conversions made by employees, of historical PTO usage by employees, of historical PTO buy back requests submitted by employees, and information corresponding to these employees (e.g., PTO balances, PTO amount being converted, employee wage information, employee position with employer, etc.) may be used to generate a set of sample employee buy back profiles that may indicate possible dates for scheduling buy back of PTO. Based on a sample employee buy back profile, the PTO conversion service may propose one or more future dates for PTO buy back. For instance, if the PTO conversion service determines, based on the sample employee buy back profile, that the employee usually goes on vacation at the beginning of June for seven days and the employee is unlikely going to have sufficient PTO available next June, the PTO conversion service may propose one or more dates before the beginning of June to schedule buy back of PTO so that the employee can go on vacation.

Based on the employee response to proposed one or more future dates for scheduling PTO buy back, the PTO conversion service may update one or more model coefficients of the machine learning algorithm to either reinforce the algorithm (e.g., the employee selects one of the proposed dates and schedules PTO buy back) or to revise the algorithm to provide better scheduling recommendations (e.g., the employee opts to not schedule buy back of PTO, the employee selects a future date other than those provided by the PTO conversion service, etc.). Through this iterative process, the machine learning algorithm may be trained to propose an option to schedule buy back of PTO and provide one or more possible future dates for buy back of PTO.

If the employee rejects the option to schedule future buy back of the converted PTO, or the PTO conversion service has scheduled future buy back of the converted PTO based on the employee's selection of the buy back option, the PTO conversion service may, at step 534, disburse the cash value of the PTO based on the one or more disbursement options selected by the employee. For instance, the PTO conversion service may automatically electronically transfer the cash value of the converted PTO to the employee's selected account (e.g., bank account, 401(k), 529 college savings plans, student loan pay down, travel partner, credit card pay down, etc.), transfer the cash value onto a debit card, use the cash value for a purchase as designated by the employee, and the like. The transaction may be recorded in a distributed ledger (e.g., a blockchain, operating on a special purpose computing device, etc.). The funds may be released from the PTO conversion service, from the employer, from a designated banking partner, or from one banking partner of a plurality of banking partners. In some embodiments, a banking partner may be selected based on a lowest fee and/or available funds. In some embodiments, a digital wallet may be used to maintain the funds. The digital wallet may accept the money after the banking partner approves the funds and may disburse the funds shortly thereafter.

In some embodiments, paid time off may be converted into points instead of cash. The points may then be used to make purchases, investments, pay off credit cards, shop from a catalog of points-based products, etc.

PTO Donations and Purchases

In an embodiment, the PTO conversion system provides employees with options for donating PTO to a particular co-worker and/or to an employer PTO pool, from which employees may purchase PTO from the employer. Paid time off giving creates the ability for employees to donate their paid time off to anyone at their respective company or to a charity. Recipients of the paid time off may petition the plan administrator at their company to take time off from these pools. Optionally, an employee who would like to donate paid time off can specify an employee for whom they would like the hours to be donated or considered. The request may be treated as a suggestion for the company administrator who acts as an arbitrator and makes the final decision on how to allocate the donation. Therefore, any designation on the PTO conversion service is purely advisory.

For example, if an employee has fallen seriously ill and has fully exhausted her paid time off, the employee's co-workers can decide to each donate, via the PTO conversion service, two paid time off days to the employee so she can spend more time recovering. In another example, an employee has used 10 out of her 10 paid time off days for the year. Her best friend decides to get engaged and married in a matter of weeks. The employee may decide to purchase, via the PTO conversion service, an additional 3 paid time off days from the paid time off pool.

In an embodiment, the PTO conversion service provides employees with an option to request or otherwise solicit PTO donations from other employees associated with an employer. For instance, if an employee has fully exhausted her PTO and the employee requires PTO to address a serious illness or other circumstance, the employee may submit a request to the PTO conversion service to solicit PTO donations from other employees associated with the employee's employer. In response to the request, the PTO conversion service may transmit the request to the employer for approval. If the request is approved, the PTO conversion service may transmit a notification to one or more other employees to indicate that the employee is requesting PTO for a particular purpose (e.g., addressing an emergency, addressing an illness to the employee or relative of the employee, etc.). The notification may be anonymized, such that no identifying information of the employee that submitted the request is provided to these other employees. In an embodiment, the other employees solicited for PTO donations are selected based on PTO balances of these other employees. For instance, the PTO conversion service may identify which employees have sufficient PTO available to accommodate the request or are otherwise known to have previously donated PTO to other employees or to the employer PTO pool. In an embodiment, the PTO conversion service provides employees with one or more incentives to donate PTO to another employee in response to a request from the other employee. These incentives may include points that may be used towards the purchase of merchandise, discounts, cash back or rebates, and the like.

In an embodiment, rather than transmitting a notification to employees to solicit PTO donations for an employee requesting PTO for a particular purpose, the PTO conversion service presents the employee request for PTO donations to another employee when the other employee accesses the PTO conversion service to donate PTO to a co-worker or to the employer PTO pool. For instance, if an employee selects an option to donate PTO to a particular co-worker or to the employer PTO pool, the PTO conversion service may identify any pending requests for PTO donations submitted by other employees. These pending requests may be anonymized and presented to the employee making a donation of PTO to a particular co-worker or to the employer PTO pool. The employee may review these requests and determine whether to donate PTO to one or more employees associated with these requests.

Figure 6:
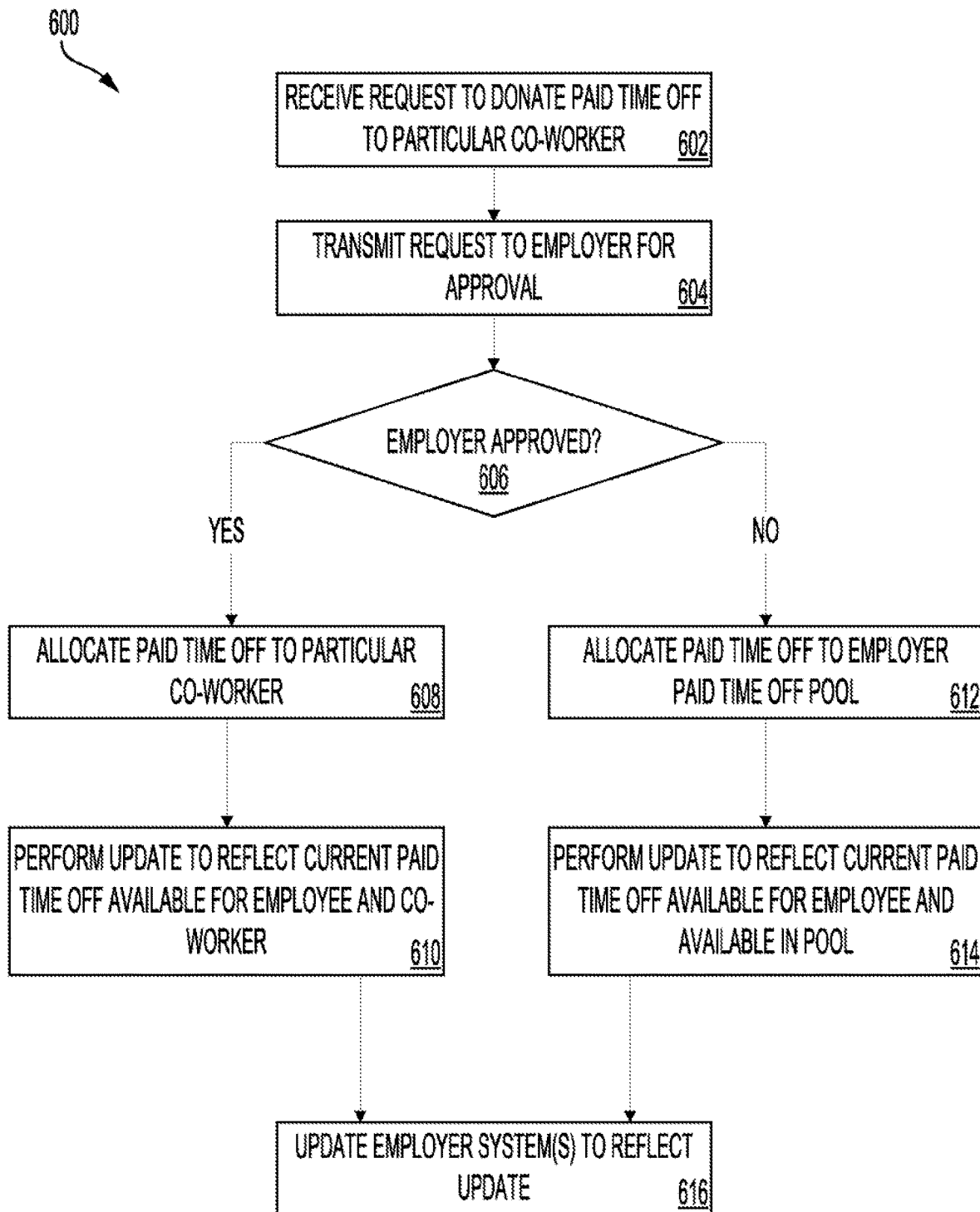
FIG. 6 shows an illustrative example of a flow diagram for a method for sharing paid time off with a particular co-worker according to some embodiments.

FIG. 6 shows an illustrative example of a flow diagram for a method 600 for sharing paid time off with a particular co-worker according to some embodiments. According to FIG. 6, an employee may want to donate paid time off to a coworker. For instance, an employee may request who to have their paid time off given to, but the final decision may rest with the company. Optionally, the employee may request to donate his paid time off to a specific coworker before submitting the donation. In its request, the employee may provide identifying information of the co-worker to which the employee wishes to donate PTO. This identifying information may include a name, username, employee identification number, or other information that may be used by the PTO conversion service and the employer to identify the co-worker that is to receive the PTO donation from the employee.

At step 602, the PTO conversion service may receive a request from the employee to donate PTO to a particular co-worker. As noted above, the request may specify identifying information of the co-worker to which the employee wishes to donate PTO. Further, the request may specify the amount of PTO that is to be donated to the particular co-worker. In an embodiment, the PTO conversion service can determine whether the particular co-worker is eligible to receive a PTO donation and, if so, whether the particular co-worker can receive the amount of PTO designated by the employee. As noted above, an employee entry in the employee database may specify a set of policies or rules, defined by the employer, with regard to use of its PTO. Similarly, this set of policies or rules may be used to define parameters for receiving PTO donations. For instance, the employer may create a policy whereby an employee is not authorized to receive PTO donations if the employee's PTO balance is above a particular threshold. As another example, the employer may create a policy whereby an employee may only receive a particular amount of donated PTO, whether within a particular time period or in totality. An employer may also define a policy defining the amount of PTO an employee may donate over a period of time or in totality. Based on any applicable policies, the PTO conversion service may determine whether the request to donate PTO to a particular co-worker may be processed and provided to an employer for approval.

At step 604, the PTO conversion service may transmit the PTO donation request to the employer for approval. The PTO conversion service may include additional information that may be used by the employer to determine whether to approve or reject the request. For instance, the PTO conversion service may provide any available PTO balances for the employee and the recipient co-worker, any information regarding previous PTO donations received by the recipient co-worker, any information regarding previous PTO donations submitted by the employee, any rationale submitted by the employee for donating PTO to the particular co-worker, and the like. The employer may receive the donation request and determine whether to approve or deny the PTO donation request. The employer may transmit its request determination to the PTO conversion service, which may determine, at step 606, whether the PTO donation request has been approved by the employer.

If the employer has approved the employee request to donate PTO to a particular co-worker, the PTO conversion service may allocate the PTO to the particular co-worker at step 608. For instance, the PTO conversion service may transmit a notification to the employee to indicate that the PTO donation request has been approved by the employer. Further, the PTO conversion service may transmit a notification to the co-worker receiving the donated PTO to indicate that the employee has donated PTO to the co-worker. At step 610, the PTO conversion service may perform an update to the employee database to reflect the current PTO balances available for the employee and for the co-worker. This may allow the employee and co-worker to access the PTO conversion service and review their new PTO balances post-donation.

In an embodiment, denied requests for paid time off transfers are allocated to the general employer PTO pool at step 612. For example, if the employee request was to donate a particular amount of PTO to a particular co-worker, and the request is denied by the employer, the PTO conversion service may determine an equivalent amount of funds that may be added into the pool. The amount of funds may be based on the employee's respective pay rate (e.g., hourly wage, etc.). In other words, PTO hours may be added into the pool as a monetary value (e.g., dollars, etc.) and hours may be purchased from the pool according to the purchaser's pay rate. In an embodiment, the pool is maintained according to the number of PTO hours added to the pool as opposed to a monetary value. For instance, the pool may be represented according to a number of hours, days, etc. available for purchase. When an employee submits a request to purchase PTO from the pool, the PTO conversion service may use the employee's pay rate to determine the cost of the requested PTO and present this cost to the employee. Alternatively, the employee may submit a request with a maximum price the employee is willing to pay for PTO from the pool. Based on the employee's pay rate and the maximum price indicated, the PTO conversion service may determine how much PTO the employee can obtain from the pool. In an embodiment, rather than allocating PTO to the pool if the donation request is denied, the PTO conversion service can notify the employee that the request was denied and maintain the employee's current PTO balance.

Once the employee's donated PTO amount has been allocated to the employer PTO pool, the PTO conversion service, at step 614, may perform an update to reflect the current PTO available for the employee and the amount of PTO available in the employer PTO pool. At step 616, the PTO conversion service may update one or more employer systems to reflect the updates performed based on the employer's approval or rejection of the employee's PTO donation request. For instance, the PTO conversion service may access the employer leave management system of the employer and update an entry corresponding to the employee to deduct the amount of PTO donated to a particular co-worker or PTO pool. Further, the PTO conversion service may update an entry corresponding to the co-worker receiving the donated PTO to provide an updated amount of PTO available to the co-worker. Alternatively, if the donated PTO was allocated to an employer PTO pool, the PTO conversion service may update an entry in the employer leave management system to indicate the amount of available PTO in the employer PTO pool. These updates may ensure synchronization between the PTO conversion service and the employer's systems.

If an employee requests to receive paid time off from the pool, the employer may give it to the person that requests it based on his pay rate. The pool may then be updated to reflect the number of hours available. The PTO conversion service may update the employer PTO pool to reflect the number of hours given away or taken by the appropriate employees. The PTO conversion service may update the company's records to reflect those updates. Updates made to the employer PTO pool and/or to any employee entries may be made in any suitable log or ledger, such as in a blockchain system.

Figure 7:
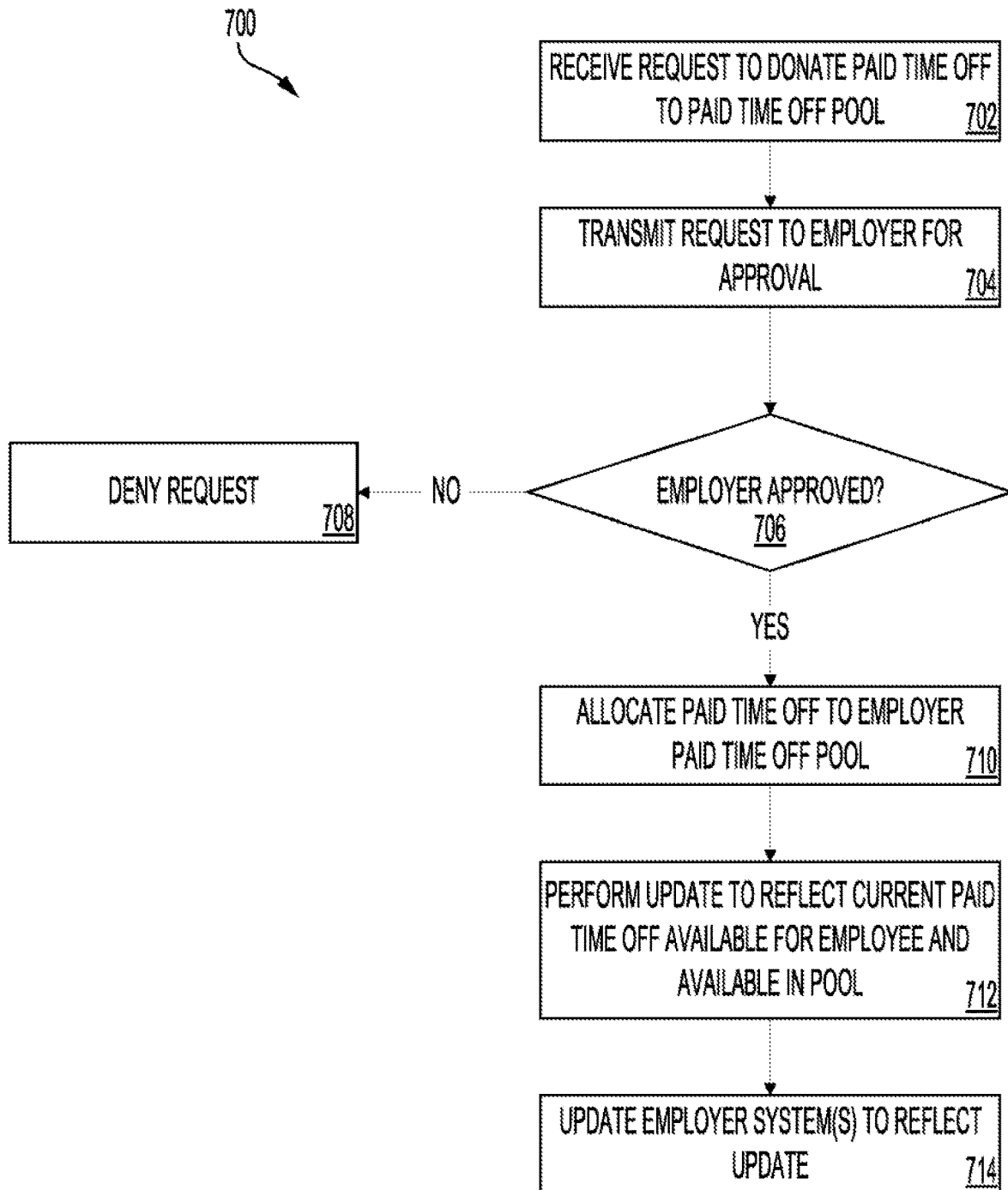
FIG. 7 shows an illustrative example of a flow diagram for a method for donating paid time off to a paid time off pool usable by other employees according to some embodiments.

In an embodiment, the PTO conversion service can process requests from employees to donate PTO directly into an employer PTO pool to make the donated PTO available to other employees. Accordingly, FIG. 7 shows an illustrative example of a flow diagram for a method 700 for donating paid time off to a paid time off pool usable by other employees according to some embodiments. The method 700 may be performed by the PTO conversion service, which may be in communication with one or more employer systems to process PTO donation requests from employees and to manage the employer PTO pool on behalf of the employer.

At step 702, the PTO conversion service may receive a request from an employee to donate PTO to the employer PTO pool. The request may specify the amount of PTO that the employee wishes to donate to the employer PTO pool. In an embodiment, the donation request can be defined using a monetary value, whereby the employee may define a monetary value that is to be added to the employer PTO pool. The PTO conversion service may access the employee database and determine the employee's pay rate (e.g., hourly wage, daily wage, etc.) as indicated by the employer. Using this pay rate and the monetary value specified by the employee, the PTO conversion service may calculate a corresponding amount of PTO that is to be deducted from the employee's balance. The PTO conversion service may indicate, to the employee, the amount of PTO that is to be deducted from the employee's PTO balance and allow the employee to determine whether to proceed with the donation request. In some instances, if the employer PTO pool is maintained using a monetary value rather than a temporal value (e.g., hours, days, etc.), and the employee indicates a temporal amount (e.g., hours, days, etc.) of PTO that is to be added to the employer PTO pool, the PTO conversion service may use the employee's pay rate to determine the equivalent monetary value of the PTO that the employee wishes to donate. This monetary value may be presented to the employee, which may determine whether to proceed with the donation request.

As noted above, an employee entry in the employee database may specify a set of policies or rules, defined by the employer, with regard to use of its PTO. Similarly, this set of policies or rules may be used to define parameters for making PTO donations to the employer PTO pool. For instance, the employer may define a policy defining the amount of PTO an employee may donate over a period of time or in totality. As another example, the employer may define a policy defining any thresholds for the employer PTO pool. For instance, an employer PTO pool policy may define a maximum amount or threshold of PTO that may be available in the pool at any given time. In an embodiment, the PTO conversion service may evaluate the PTO donation request in conjunction with any applicable policies to determine whether the request can be submitted to the employer for final approval or can be automatically denied based on the applicable policies.

At step 704, the PTO conversion service may transmit the PTO donation request from the employee to its employer for approval. Similar to the method 600 described above in connection with FIG. 6, the PTO conversion service may include additional information that may be used by the employer to determine whether to approve or reject the request. For instance, the PTO conversion service may provide the available PTO balance for the employee, any information regarding previous PTO donations submitted by the employee, any rationale submitted by the employee for donating PTO to the employer PTO pool, and the like. The employer may receive the donation request and determine whether to approve or deny the PTO donation request. The employer may transmit its request determination to the PTO conversion service, which may determine, at step 706, whether the PTO donation request has been approved by the employer. If the employer has rejected the PTO donation request, the PTO conversion service, at step 708, may deny the PTO donation request. The PTO conversion service may notify the employee that the request was denied and maintain the employee's current PTO balance.

If the employer has approved the employee request to donate PTO to the employer PTO pool, the PTO conversion service may allocate the PTO to the employer PTO pool at step 710. For instance, the PTO conversion service may transmit a notification to the employee to indicate that the PTO donation request has been approved by the employer. At step 712, the PTO conversion service may perform an update to the employee database to reflect the current PTO balances available for the employee and within the employer PTO pool. This may allow the employee to access the PTO conversion service and review their new PTO balance post-donation.

If the employee request was to donate a particular amount of PTO to the employer PTO pool, the PTO conversion service may determine an equivalent amount of funds that may be added into the pool. The amount of funds may be based on the employee's respective pay rate (e.g., hourly wage, etc.). In other words, PTO hours may be added into the pool as a monetary value (e.g., dollars, etc.) and hours may be purchased from the pool according to the purchaser's pay rate. In an embodiment, the pool is maintained according to the number of PTO hours added to the pool as opposed to a monetary value.

At step 714, the PTO conversion service may update one or more employer systems to reflect the updates performed based on the PTO donation request. For instance, the PTO conversion service may access the employer leave management system of the employer and update an entry corresponding to the employee to deduct the amount of PTO donated to the employer PTO pool. Further, the PTO conversion service may update an entry in the employer leave management system to indicate the amount of available PTO in the employer PTO pool. These updates may ensure synchronization between the PTO conversion service and the employer's systems.

In an embodiment, the employee making the PTO donation to either a particular co-worker or to the employer PTO pool may be awarded with rewards points. The amount of rewards points may be proportional to the amount of PTO donated and may be used to make purchases, investments, pay off credit cards, shop from a catalog of points-based products, and the like. The PTO conversion service may allocate these rewards points to the employee via the employee database, whereby the PTO conversion service may update an entry corresponding to the employee to indicate a new rewards point balance for the employee. When the employee accesses the PTO conversion service to repurpose its PTO for any purpose, the PTO conversion service may present the employee with its rewards point balance. This allows the employee to utilize its PTO, rewards point, or other payment method for purchases and investments made available via the PTO conversion service. It should be noted that while rewards points are used throughout the present disclosure for the purpose of illustration, other non-fiat currencies may be awarded to the employee making the making the PTO donation to either a particular co-worker or to the employer PTO pool. For instance, rather than being awarded with rewards points, an employee may be awarded with an amount of cryptocurrency maintained by the PTO conversion service. This cryptocurrency may be used to make purchases, investments, pay off credit cards, shop from a catalog of points-based products, and the like.

Travel and Experience Related Purchases

Repurposing paid time off for travel-related purchases allows employees to instantly purchase vacation packages, cruises, flights, hotels, car rentals and other travel products with their paid time off without the need for tedious reimbursement. Further, paid time off can be repurposed to purchase experiences (e.g., access to nearby events that may not require significant travel or time, etc.). In one example, an employee may be taking 4 of her 14 paid time off days to attend her sister's wedding and would like to use 3 days to pay for the flight and 2 days to pay for the hotel. She does not have the money on hand so waiting for the next pay cycle for a reimbursement simply is not an option. In another example, an employee has scheduled a 5 day vacation to California and would like to purchase a wine tour by selling 1 day of her 9 remaining paid time off days. In another example, an employee may wish to convert 3 vacation days to purchase an opportunity to attend a baseball championship game in which the employee's favorite team is playing. Asking for reimbursements from a busy human resources department takes far too long so reimbursement is not a good option.

Figure 8:
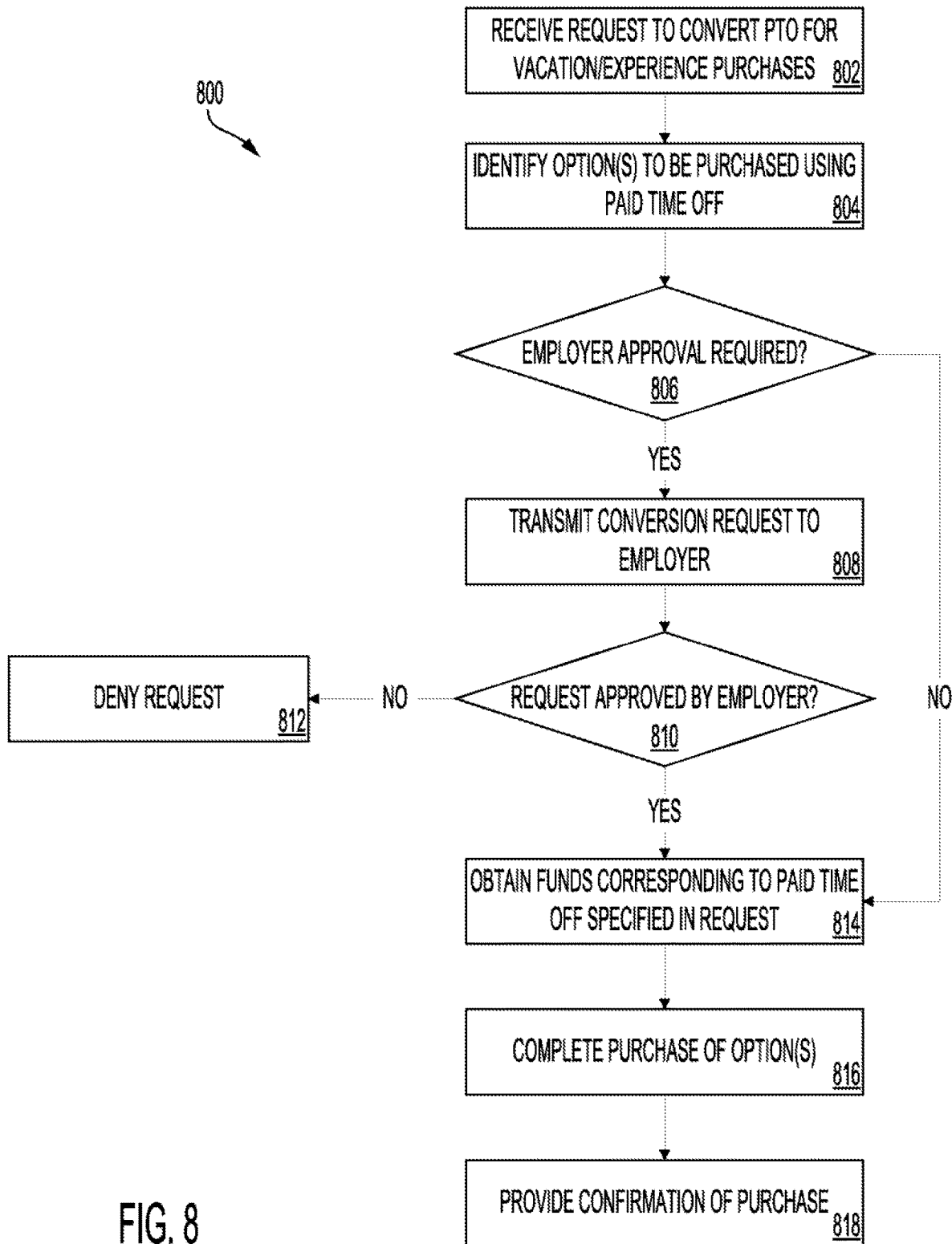
FIG. 8 shows an illustrative example of a flow diagram for a method of repurposing paid time off for travel related purchases according to some embodiments.

FIG. 8 shows an illustrative example of a flow diagram for a method 800 of repurposing paid time off for travel related purchases according to some embodiments. The method 800 may be performed by the PTO conversion service, which may process incoming requests to repurpose available PTO for use in making vacation or travel related purchases. Further, the PTO conversion service may be in communication with one or more employer systems to manage employee PTO balances, obtain employer approval (if required) for PTO conversion requests, and obtain funds required for the requested vacation or travel related purchases.

According to FIG. 8, an employee may want to purchase a vacation package, a cruise, a flight, hotel, an experience, rent a car or make other travel-related purchases with his paid time off without the need for tedious reimbursements. The employee may log into the PTO conversion service to browse travel and experience options such as these from travel partners. In an embodiment, the PTO conversion service maintains a catalog of available travel options available from one or more travel partners with which the PTO conversion service may have agreements with. For example, the PTO conversion service and a travel partner may agree upon prices for different travel options made available by the travel partner. In an embodiment, the PTO conversion service is provided access, by one or more travel partners, to a Global Distribution System (GDS), which may facilitate transactions between travel service providers and travel agents. The GDS may include a catalog of available travel options, including prices for each of these options. The PTO conversion service may access the GDS to obtain the available travel options and present these to the employee. In some instances, the available travel options provided to the employee may be obtained via a query of the GDS based on options selected by the employee (e.g., travel dates, travel origination and destination locations, required amenities, required proximity to particular tourist locations, etc.). In an embodiment, the PTO conversion service may access another system, provided by an experience partner, to identify experiences that may be available to the employee at or within proximity of the employee's location. These experience options may be presented to the employee via the PTO conversion service.

These travel and experience options, as well as corresponding prices, may be presented to employees accessing the PTO conversion service. In some instances, the PTO conversion service may provide, via a platform provided by the PTO conversion service, access to one or more travel partners, whereby an employee may browse different travel related options provided by these one or more travel partners and select any of these travel related options for purchase. Financial transactions (e.g., payments, etc.) with the one or more travel partners may be processed by the PTO conversion service, whereby the PTO conversion service may provide the funds required for these financial transactions on behalf of the employee.

At step 802, the PTO conversion service may receive a request from an employee to convert PTO for vacation, experience, or travel related purchases. For instance, if the PTO conversion service provides one or more travel related options made available through one or more travel partners, the employee may select a travel related option directly from the PTO conversion service platform and submit a request to purchase this option. Alternatively, if the employee accesses a travel partner via the PTO conversion service platform, and the employee selects an option made available by the travel partner for purchase, the travel partner may initiate a transaction with the PTO conversion service to complete the purchase of the selected option. This transaction may serve as an employee request to convert its PTO for purchase of the selected option.

In an embodiment, the PTO conversion service provides the employee with various options for submitting a query to a GDS to identify possible vacation or travel related options for purchase. For instance, via the PTO conversion service platform, the employee may submit an origination location, a destination location, a departure date, a return date, the one or more types of travel purchases that may be of interest to the employee (e.g., flights, hotels, rental vehicles, etc.), and the like. Based on the options provided by the employee, the PTO conversion service may query the GDS to obtain any travel options that correspond to the employee's provided options. The PTO conversion service may present these travel options, as well as any pricing information associated with these travel options, to the employee via the PTO conversion service platform. From these travel options, the employee may select a particular travel option that the employee wishes to purchase.

In an embodiment, the PTO conversion service provide the employee with various experience options that can be purchased in addition to any previously selected travel option or as an alternative to purchasing a travel option. For example, an employee can select an experience option for purchase corresponding to an experience that can be partaken at or within proximity of the employee's location. Similarly, an employee can select an experience option for purchase corresponding to an experience that can be partaken at or within proximity of the travel destination associated with a previously selected travel option. Through the PTO conversion service platform, the employee may define a preferred distance from its location (e.g., residence or travel destination) for presentation of available experience options. For example, an employee may wish to view experience options that are available within 50 miles of its residence. As another example, an employee may wish to view experience options that can be experienced at a travel destination. Based on the location and proximity specified by the employee, the PTO conversion service may engage one or more experience partners to identify available experience options that satisfy the requirements defined by the employee via the PTO conversion service platform. Any available experience options, along with corresponding pricing information, may be provided to the employee by the PTO conversion service.

At step 804, the PTO conversion service may identify the one or more travel and/or experience related options that are to be purchased using the employee's PTO. For instance, the PTO conversion service may determine the cost of the one or more travel and/or experience related options selected by the employee. As an illustrative example, if an employee selects a travel related option from a travel partner website accessed via the PTO conversion service platform, the PTO conversion service may receive a transaction notification from the travel partner indicating the travel related option selected and the associated monetary cost for the option. The PTO conversion service may determine, from the employee database, the employee's pay rate (e.g., hourly wage, daily wage, etc.) and convert the monetary cost of the selected option to equivalent PTO time (e.g., hours, days, etc.) that the employee may allocate for the selected option.

As another illustrative example, if an employee selects a travel related option directly from the PTO conversion service platform (e.g., made available by the PTO conversion service from the GDS and/or in agreement with a travel partner), the PTO conversion service may identify the PTO cost of the selected travel related option. For instance, when an employee accesses the PTO conversion service platform to select a travel and/or experience related option for purchase, the PTO conversion service may automatically convert the monetary cost of the various travel and experience related options offered by the PTO conversion service to equivalent PTO time (e.g., hours, days, etc.) that the employee may allocate for these options.

In an embodiment, the PTO conversion service allows an employee to split the cost of a selected travel or experience related option between available PTO and cash payments. For instance, if an employee does not have sufficient PTO to cover the cost of a particular travel or experience related option, the PTO conversion service may allow the employee to indicate how much of its PTO it wishes to allocate for purchase of the option. Based on the amount of PTO selected by the employee, the PTO conversion service may determine the remaining cash amount required for purchase of the selected travel or experience related option. The employee may proceed to provide another method of payment to cover the remaining cost of the selected travel or experience related option. In some instances, if the PTO conversion service determines that the employee does not have sufficient PTO to pay for the selected travel or experience related option, the PTO conversion service may automatically allocate the maximum amount of PTO available for the employee and present the employee with the amount remaining for the selected travel or experience related option. The employee may then adjust its purchase request accordingly. In some instances, if the PTO conversion service determines that the employee does not have sufficient PTO to pay for the selected travel or experience option, the employee request may be automatically declined.

At step 806, the PTO conversion service may determine whether the PTO conversion request requires approval from the employee's employer. For instance, the PTO conversion service may access an entry corresponding to the employee that submitted the request in an employee database to identify any policies or rules implemented by the employer for the particular employee. These policies or rules may define limitations on the requests that can be submitted by the employee. For example, a policy or rule may indicate that requests to convert PTO for travel or experience related purchases require employer approval while other types of requests may be automatically approved by the PTO conversion service and processed accordingly. Thus, if an employee entry within the employee database includes one or more policies or rules applicable to PTO conversion requests from the employee, the PTO conversion service may evaluate these one or more policies or rules to determine whether employer approval is required for fulfillment of the PTO conversion request.

If the PTO conversion request for purchasing a travel or experience related option requires approval, the PTO conversion service may transmit the request to the employer to obtain employer approval at step 808. The transmission to the employer may include the PTO conversion request, as submitted by the employee to the PTO conversion service, as well as any additional information that may be useful to the employer in determining whether to approve the request or not. For instance, the PTO conversion service may provide, in the transmission, the employee's current PTO balance, the amount of PTO previously taken by the employee or previously converted for another purpose over a period of time, any explanation or rationale submitted by the employee for its PTO conversion request, information related to the travel or experience related option selected by the employee, and the like.

In an embodiment, the PTO conversion service can provide workforce related information associated with the employee. This can include PTO usage by employees within the employee's immediate work group, within the employee's location, within the employee's organization, and the like for the dates selected by the employee for its vacation or experience. This information may be used by the employer to determine whether the employer requires the employee's attendance during the selected dates. For example, if the selected dates correspond to a critical work period for the employer, the employer may determine that the employee's attendance is required during the selected dates. As another example, if a critical number of employees within with employee's organization have already been approved for PTO during the selected dates, the employer may determine that the employee's attendance is required during the selected dates. Thus, the workforce related information may be used by the employer to determine whether the employee's travel or experience related paid time off can be approved.

The PTO conversion service may monitor the communication channel with one or more employer systems utilized by the employer to obtain responses from the employer regarding the submitted PTO conversion request. If a response from the employer is received, the PTO conversion service may determine, at step 810, whether the PTO conversion request for purchasing a travel or experience related option is approved by the employer. In an embodiment, if a response to the PTO conversion request is not received within a predetermined period of time (e.g., prior to an expiration time, etc.), the PTO conversion service may determine that the request is not approved by the employer and, at step 812, deny the PTO conversion request. Similarly, if the request is not approved, the PTO conversion service, at step 812, may deny the PTO conversion request and the process ends without further action.

If the request is approved, or the request does not require approval, the PTO conversion service may, at step 814, obtain funds corresponding to the PTO being converted for the specified travel related purchase. For instance, the employer may transmit, to a banking partner of the PTO conversion service, the funds corresponding to the PTO being converted for use in purchasing the travel related option. In another example, the employer may provide these funds directly to the employee (e.g., deposit into an employee's bank account, etc.) and transmit a notification to the PTO conversion service to indicate that the funds corresponding to the PTO specified in the request has been provided to the employee. This may cause the PTO conversion service to prompt the employee to provide payment for the selected travel or experience related option.

At step 816, the PTO conversion service may purchase the travel or experience related option selected by the employee. For instance, the funds may be sent by the PTO conversion service to the appropriate vendor(s) to complete the transaction with the appropriate vendor(s). In some instances, a vendor may provide confirmation of the transaction to the PTO conversion service and provide any additional information related to the transaction that may be provided to the employee. For instance, if the employee selects an option to purchase an airline ticket, the vendor may provide to the PTO conversion service a confirmation number for the airline ticket, a seat assignment for the employee, any information that may be of use to the employee in using the airline ticket, and the like. At step 818, the PTO conversion service may provide confirmation of the purchase, which the employee may receive via a notification from the PTO conversion service and/or the travel partners.

In an embodiment, if the employer approves the PTO conversion request or if employer approval is not required for the PTO conversion request, the PTO conversion service places the PTO conversion request into a holding queue before completing the PTO conversion and purchase of the selected travel or experience options. For example, a PTO conversion request may be placed in the holding queue for a predefined period of time after submission of the request to provide the employee with an opportunity to cancel the request if so desired. Prior to the expiration of the predefined period of time, the PTO conversion service may transmit a notification to the employee to indicate that the employee has a certain amount of time remaining to cancel the PTO conversion request for purchasing the selected travel or experience options. If the employee does not cancel the PTO conversion request, or the employee indicates that the PTO conversion request is to be processed, the PTO conversion service may complete the PTO conversion and purchase of the selected travel or experience options.

Similar to the methods described above, once the purchase has been completed, the PTO conversion service may update one or more employer systems to reflect the new PTO balance for the employee. For instance, the PTO conversion service may access the employer leave management system of the employer and update an entry corresponding to the employee to deduct the amount of PTO used for purchase of the travel related option. This update may ensure synchronization between the PTO conversion service and the employer's systems.

PTO Buy Back

Buy back may give employees the ability to purchase back paid time off that they have cashed out over a period of time. For example, an employee may have converted 5 out of her 10 paid time off days to cash via a fast cash option to cover some unexpected emergency expenses. This same employee may like to buy back those 5 days at a later time so she can attend her sister's wedding in Europe. In another example, an employee may have converted 10 of her 10 paid time off days to cash in order to pay down her credit card debit. This same employee may like to buy 3 of those days back at a later time so she can take her son to Disney World for his birthday.

Figure 9:
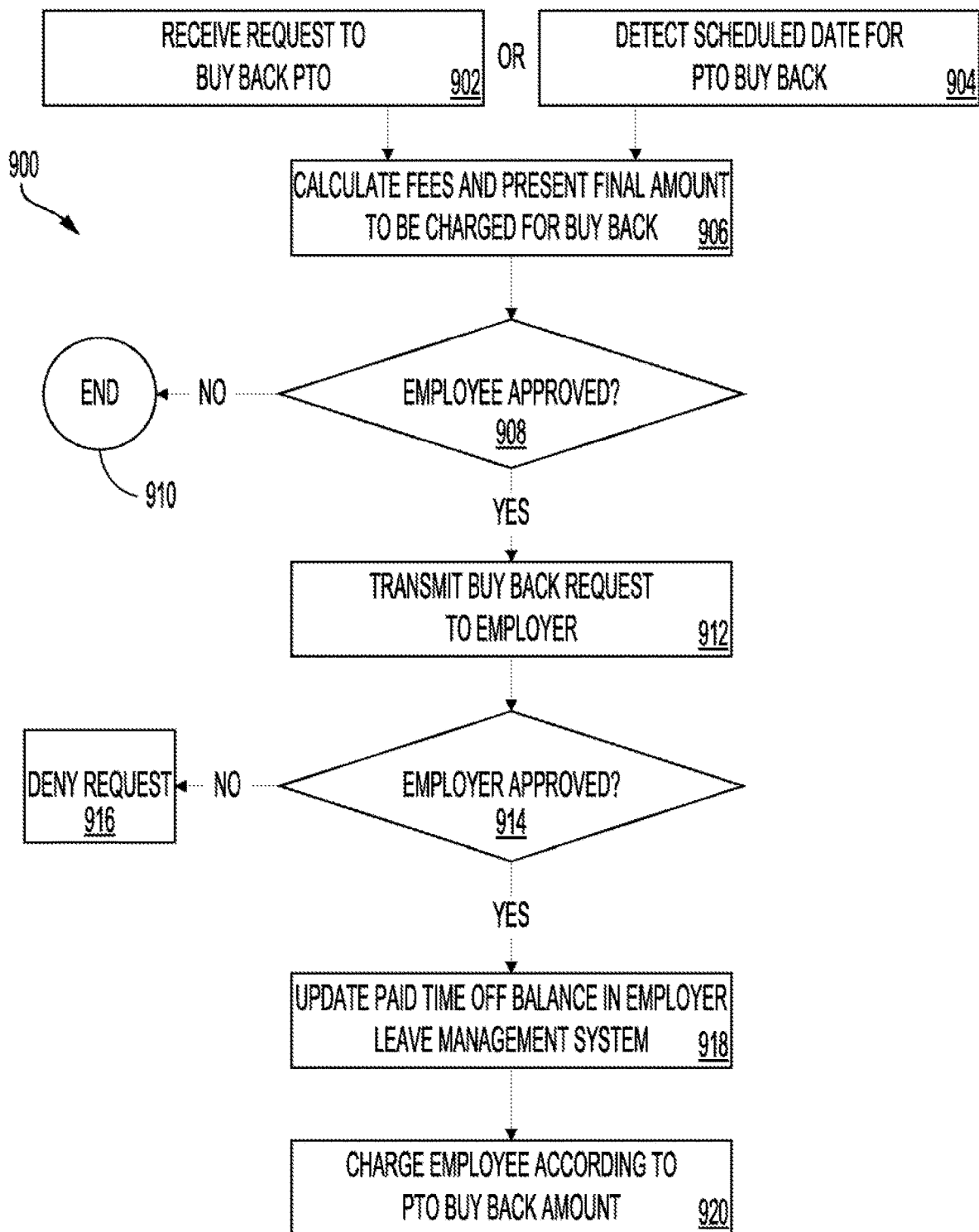
FIG. 9 shows an illustrative example of a flow diagram for a method for buying back paid time off according to some embodiments.

FIG. 9 shows an illustrative example of a flow diagram for a method 900 for buying back paid time off according to some embodiments. The method 900 may be performed by the PTO conversion service, which may process incoming requests to buy back PTO from an employer. Further, the PTO conversion service may function in conjunction with one or more employer systems to obtain approval from an employer for the purchase of PTO. As noted above, an employee can either choose to schedule buy back of converted PTO when submitting a request to convert PTO according to any of the methods described above or submit a request to the PTO conversion service to buy back PTO.

In an embodiment, the PTO conversion service allows employees to submit requests to buy back any PTO previously converted to cash or for other purposes over a period of time. For instance, an employer may allow employees to buy back PTO previously converted within the previous year or during a period defined by the employer (e.g., between benefit enrollment cycles, etc.). Thus, an employee, at any time, may submit a request to buy back PTO previously converted over a prior period of time, which the PTO conversion service may receive at step 902.

In an embodiment, the PTO conversion service can also allow employees to schedule buy back of PTO during processing of a request to convert PTO to cash or for another purpose. For instance, when an employee submits a request to convert PTO in order to purchase one or more travel options, the PTO conversion service may provide the employee with an option to schedule buy back of the PTO that is to be converted for a later date. If the employee submits a request to schedule buy back of PTO at a later date, the PTO conversion service may update the employee database to indicate that the employee is to be offered the option to buy back the converted PTO on or after the later date. Thus, at step 904, the PTO conversion service may detect that this scheduled date has arrived for buy back of previously converted PTO for the employee. The PTO conversion service may transmit a notification to the employee to offer the employee an option to buy back any PTO previously converted over a particular period of time, as defined by the employer or by default. Alternatively, when the employee accesses the PTO conversion service, the PTO conversion service may determine whether such access is occurring on or after the scheduled buy back date. If so, the PTO conversion service may notify the employee of the availability of the option to buy back the previously converted PTO.

If the PTO conversion service receives a request from the employee to buy back PTO, or the PTO conversion service detects that the scheduled date for buying back PTO has arrived, the PTO conversion service, at step 906, may calculate the fees for buying back the PTO and present the final amount to be charged to the employee for buy back of the PTO. The fees may be predetermined by the PTO conversion service subject to an agreement or other arrangement with the employer. The PTO conversion service may access the employee database to determine the employee's pay rate (e.g., hourly wage, daily wage, etc.) and use this pay rate to calculate the purchase price of the PTO being bought back.

In some instances, an employee's pay rate may change between the time of the original PTO conversion and the PTO buy back date. In an embodiment, when a PTO conversion is completed, the PTO conversion service associates the employee's pay rate at the time of the PTO conversion with the actual PTO conversion transaction within the employee database. For instance, an employee entry in the employee database may be updated to specify the PTO conversion transaction (e.g., via a unique transaction identifier, etc.) and the corresponding employee pay rate at the time of the transaction. The entry may also specify the date of the PTO conversion transaction. Thus, when the employee submits a request to buy back PTO that was previously converted, the PTO conversion service may determine the employee's pay rate at the time of the conversion transaction and calculate the buy back cost according to this pay rate. It should be noted that, in some instances, an employer may define the pay rate basis for buy back of PTO by an employee. For example, an employer may indicate that buy back is to be conducted using an employee's current pay rate, regardless of whether the employee's pay rate has changes from the date of the PTO conversion to the date of the buy back request. In another example, the employer may define a fixed buy back cost for each unit (e.g., hour, day, etc.) of PTO.

Once the PTO conversion service has calculated any fees associated with buying back PTO and has presented the final amount that is to be charged for the buy back of the PTO, the PTO conversion service may determine whether the employee has approved this final amount at step 908. For instance, an employee may determine that the final amount presented by the PTO conversion service is not acceptable to the employee. This may cause the employee to reject the final amount and terminate its buy back request. If the PTO conversion service determines that the employee has rejected the final amount, the method 900 terminates at step 910. In an embodiment, the PTO conversion service allows the employee to adjust the amount of PTO that is to be bought back if the employee finds the final amount presented to be unacceptable. If the employee submits a new amount of PTO that is to be bought back, the PTO conversion service may revert back to step 906 and calculate new fees and a new final amount to be charged for this new amount of PTO.

Alternatively, if the employee determines that the final amount presented is acceptable, the employee may indicate to the PTO conversion service that it accepts the final amount and that the PTO conversion service should proceed. Thus, if the PTO conversion service determines that the employee has approved the final amount presented for the PTO buy back, the PTO conversion service, at step 912, may transmit the buy back request to the employer for approval. In an embodiment, the PTO conversion service accesses an entry corresponding to the employee that submitted the PTO buy back request in an employee database to identify any policies or rules implemented by the employer for the particular employee. These policies or rules may define limitations on the requests that can be submitted by the employee. For example, a policy or rule may indicate that requests to buy back PTO over a certain amount require employer approval while requests to buy back PTO below the certain amount may be automatically approved by the PTO conversion service and processed accordingly. Thus, if an employee entry within the employee database includes one or more policies or rules applicable to PTO buy back requests from the employee, the PTO conversion service may evaluate these one or more policies or rules to determine whether employer approval is required for fulfillment of the PTO buy back request.

The PTO conversion service may monitor the communication channel with one or more employer systems utilized by the employer to obtain responses from the employer regarding the submitted PTO buy back request. If a response from the employer is received, the PTO conversion service may determine, at step 914, whether the PTO buy back request is approved by the employer. In an embodiment, if a response to the PTO buy back request is not received within a predetermined period of time (e.g., prior to an expiration time, etc.), the PTO conversion service may determine that the request is not approved by the employer and, at step 916, deny the PTO buy back request. Similarly, if the request is not approved, the PTO conversion service, at step 916, may deny the PTO buy back request and the process ends without further action.

If the employer approves the PTO buy back request, the PTO conversion service, at step 918, may update the employee's PTO balance in the employer leave management system, as well as within the employee entry in the employee database maintained by the PTO conversion service. This enables synchronization of employer and PTO conversion service systems for managing PTO balances for employees of the employer. Additionally, at step 920, the PTO conversion service may charge the employee according to the agreed upon PTO buy back amount calculated by the PTO conversion service. For instance, the PTO conversion service may coordinate with an employer leave management system to reduce the employee's paycheck by the buy back amount during the next or other requested pay cycle. As another example, the PTO conversion service may charge the employee's credit card the PTO buy back amount. In some instances, the employee may transfer funds from its banking account or other financial account to the PTO conversion service to pay the PTO buy back amount.

Interfaces

Figure 10:
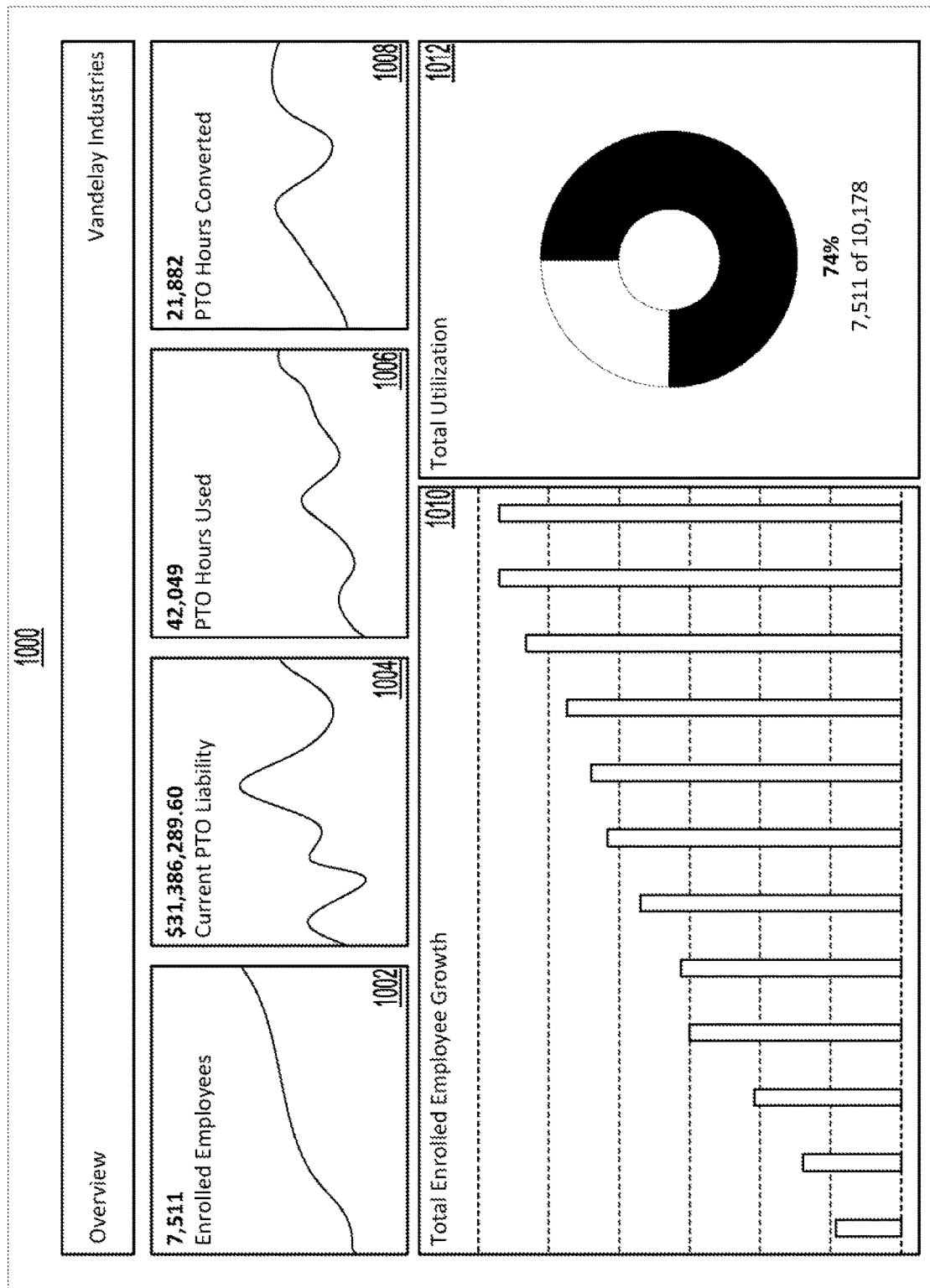
FIG. 10 shows an illustrative example of an interface through which an employer can review utilization of paid time off by employees and identify avenues for improving use of paid time off by these employees according to some embodiments.

FIG. 10 shows an illustrative example of an interface 1000 through which an employer can review utilization of paid time off by employees and identify avenues for improving use of paid time off by these employees according to some embodiments. In an embodiment, the PTO conversion service provides employers with various metrics corresponding to PTO usage by employees within their organizations. For instance, the PTO conversion service may track employee enrollment with the PTO conversion service over time, the amount of current PTO liability for the employer over time, the number of PTO hours utilized by employees for actual paid time off, the number of PTO hours converted by employees via the PTO conversion service, and the like.

In an embodiment, the PTO conversion service obtains a detailed roster of the employer's workforce during an employer onboarding process. For instance, when an employer initiates engagement with the PTO conversion service to assist in managing PTO for its employees, the employer may provide the PTO conversion service with access the employer's workforce information via an HR systems provider, an HR system maintained by the employer, or through any other system used to maintain employee records. For each employee in the employer's workforce, the PTO conversion service may establish a set of initial credentials that may be used to access and enroll in the PTO conversion service. In some instances, the PTO conversion service may enable employee access to the PTO conversion service using credentials (e.g., authentication token, etc.) that are utilized to access one or more employer systems, such as through SSO authentication, federation, and the like.

In an embodiment, the PTO conversion service obtains, from an employer's HR system, HR systems provider, or other repository used to maintain employee information, PTO balances for an employer's workforce in real time. For instance, the PTO conversion service may use one or more application programming interface (API) calls to the employer's HR system or HR systems provider to establish a communications channel through which PTO balances may be streamed to the PTO conversion service in real time. This may allow the PTO conversion service to provide real time metrics associated with employee use of PTO to the employer via the interface 1000. Thus, the PTO conversion service may dynamically update the interface 1000 to provide up-to-date statistics with regard to PTO usage within an employer's workforce.

In an embodiment, the PTO conversion service uses the real time employee PTO information to provide various metrics to the employer with regard to employee usage of PTO over time. For example, the PTO conversion service may provide, via the interface 1000, an enrolled employees panel 1002, through which the PTO conversion service may graphically demonstrate the change in the number of employees enrolled in the PTO conversion service over time. This information may be used by the employer to determine if employees are taking advantage of the benefits provided via the PTO conversion service for use or repurposing of their PTO balances. For instance, if the employer determines that employee enrollment in the PTO conversion service is low, the employer may take certain actions to improve enrollment, such as promoting the PTO conversion service within the workplace, presenting the benefits of the PTO conversion service via HR benefits documentation, and the like. Further, the employer may provide incentives to employees that enroll in the PTO conversion service, such as additional or bonus PTO, rewards points that may be used towards the purchase of merchandise, discounts, cash back or rebates, and the like.

In an embodiment, the PTO conversion service allows the employer to launch internal PTO campaigns to encourage specific groups of employees (e.g., particular work sites, particular organizations, particular work groups, etc.) to utilize their PTO during specific periods of time. For instance, via an interface provided by the PTO conversion service, the employer may create a campaign by selecting one or more groups of employees, particular periods of time for PTO usage, and corresponding incentives for taking PTO during these particular periods of time. The PTO conversion service may implement the campaign and notify employees of the designated groups of employees to indicate the incentives being provided by the employer to take advantage of their PTO during these particular periods of time. Notifications may be provided via one or more communications channels, such as e-mail, text messages, push notifications, and the like. Further, the PTO conversion service may track PTO usage from these designated groups of employees to determine whether an employee has earned the provided incentive. If so, the PTO conversion service may coordinate with the employer's HR system or HR systems provider to provide the incentive to the employee.

The PTO conversion service may further provide, via the interface 1000, a current PTO liability panel 1004, through which the PTO conversion service may graphically demonstrate the change in the employer's PTO liability over time. The employer's PTO liability may be calculated by the PTO conversion service based on the PTO balances for each employee of the employer's workforce and corresponding pay rates for these employees. An employer may use the current PTO liability panel 1004 to determine whether employees within its workforce are properly utilizing their available PTO and, if not, determine the one or more reasons that employees may not be using their available PTO.

In an embodiment, the PTO conversion service, via the interface 1000, can provide more detailed information with regard to the employer's current PTO liability, which may allow an employer to readily determine the root causes for its current PTO liability. For example, if the employer selects the PTO liability panel 1004, the PTO conversion service may update the interface 1000 to provide a granular breakdown of the employer's current PTO liability for different groupings. These groupings may include different organizations, different locations or sites, different employee groups or teams per manager, and the like. Thus, through the interface 1000, an employer may determine, with a certain degree of granularity, which groupings may be responsible for a significant portion of the employer's current PTO liability and approach these groupings to address this liability. For example, if the employer determines, via the interface 1000, that a marketing and sales team has a significant PTO liability, the employer may approach one or more managers of the marketing and sales team to encourage employees within the marketing and sales team to utilize their PTO balances to take paid time off or otherwise repurpose their PTO balances for any other purpose, as described above.

The PTO conversion service may further provide, via the interface 1000, a PTO hours used panel 1006, through which the PTO conversion service may graphically demonstrate PTO usage across the employer's workforce over time. The PTO conversion service may obtain, via one or more API calls to the employer's HR system or HR systems provider, employee usage of PTO in real time. Using this data, the PTO conversion service may update the PTO hours used panel 1006 to illustrate the number of PTO hours used by an employer's employees over time. Further, similar to the information provided with regard to the employer's current PTO liability, the PTO conversion service may provide, via the interface 1000, a granular breakdown of the use of PTO hours across different groupings. This may allow an employer to identify when certain organizations may experience a lull due to employees of these organizations using PTO over a given time period. Further, this granular breakdown of the use of PTO hours across different groupings may allow employers to determine how PTO is being used within different organizations. For instance, if an organization has a significant number of employees using sick leave PTO hours over a short period of time, the employer may determine the root cause (e.g., workplace related illness, employees coming to work sick resulting in others becoming ill, etc.) and address this root cause accordingly. As another example, if an organization has a significant number of employees using vacation PTO hours over a short period of time, the employer may determine whether such usage is resulting in a negative impact to the employer. Further, the employer may use this information to identify periods of time where certain organizations may be operating at a reduced capacity due to usage of PTO hours and, based on this information, prepare contingency plans for addressing this reduced capacity.

In an embodiment, the PTO conversion service utilizes the PTO hours usage information from the employer's HR systems or HR systems provider as input to a machine learning algorithm or artificial intelligence to provide additional insights into employee usage of PTO hours and provide recommendations to the employer. For example, the PTO conversion service may use the employer's PTO hours usage information in conjunction with other employee performance information (e.g., overtime hours worked, workers' compensation claims received, etc.) to determine the effect of employee usage of PTO hours. For example, the PTO conversion service may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on datasets comprising PTO hour usage for an organization over a period of time and employee performance information for employees of the organization over the period of time. In some implementations, a recurrent neural network (RNN) or a convolutional neural network (CNN) may be used to predict correlations between employee usage of PTO hours within an organization and employee performance within the organization. In some implementations, the PTO conversion service may use support vector machines (SVM), supervised, semi-supervised, ensemble techniques, or unsupervised machine-learning techniques to evaluate previous usage of PTO hours within an organization and employee performance within the organization to predict the effect of using PTO hours within the organization.

In an illustrative example, the PTO conversion service may evaluate the PTO hours usage within an organization, as well as employee performance within the organization (e.g., overtime hours usage, workers' compensation or injury claims filed, etc.) and compare the results of the evaluation to the one or more clusters of datasets corresponding to combinations of PTO hours usage and employee performance. These clusters may correspond to an identified impact of PTO hours use on employee performance. For example, a particular cluster may denote a negative impact to employee performance due to excessive use of PTO hours over a period of time. As another example, a particular cluster may denote a negative impact to employee performance as a result of a lack of PTO usage within an organization. As yet another example, a particular cluster may denote a positive impact to employee performance as a result of employees being able to use PTO hours for sick leave and vacation.

Once a cluster is identified, the PTO conversion service may identify the most relevant impact (e.g., positive, negative, or neutral) of PTO hours usage for the organization based on a confidence threshold. As a non-limiting example, a confidence algorithm can be executed to generate a confidence score. A confidence score may be a percentage value where the lower the percentage, the less likely the identified impact of PTO hours usage is a good correlation for the organization, and the higher the percentage, the more likely the identified impact is a good correlation for the organization. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms.

The PTO conversion service may update the interface 1000 to provide an employer with any insights obtained via evaluation of the PTO hours used by employees within the employer's workforce and employee performance within its workforce, as determined above. For instance, the PTO conversion service may indicate, via the interface 1000, that a particular organization is incurring significant overtime and is experiencing a rise in workers' compensation claims because employees are unable to use their available PTO. As another example, the PTO conversion service may indicate, via the interface 1000, that a particular organization is experiencing reduced performance as a result of employees taking significant PTO over a short period of time. As yet another example, the PTO conversion service may indicate, via the interface 1000, that a particular organization is experiencing increased efficiency because its employees have been able to take needed PTO over a period of time. These insights may guide the employer in determining what steps are required to balance employee usage of PTO hours and workplace efficiency.

The PTO conversion service may further provide, via the interface 1000, a PTO hours converted panel 1008, through which the PTO conversion service may graphically demonstrate PTO conversion by employees via the PTO conversion service across the employer's workforce over time. If the employer selects the PTO hours converted panel 1008, the PTO conversion service may update the interface 1000 to provide a granular breakdown of the PTO conversions made by employees among different organizations or teams. For example, the PTO conversion service may provide, via the interface 1000, a breakdown of employee PTO conversions for retirement savings, college plan savings, student loan payments, obtaining emergency or fast cash, and the like over a period of time. This information may be used by an employer to determine how employees within different organizations are repurposing their PTO via the PTO conversion service.

An employer can use the information garnered via the interface 1000 with regard to PTO conversions to determine particular issues that may be affecting its employees and identify ways to address these issues. For instance, if a significant number of employees are converting their PTO to pay their student loans, the employer may use this information to develop a benefits package for its employees to assist with student loan payments. As another example, if a significant number of employees are converting their PTO to obtain emergency or fast cash, the employer may determine that a significant portion of its employees do not have sufficient savings to cover expenses between pay cycles. The employer may use this information to develop, enhance, or otherwise modify a benefits package for these employees to enable these employees to save more money between pay cycles and thus reduce the amount of PTO being used for this purpose.

In an embodiment, the PTO conversion service utilizes the PTO conversion information as input to a machine learning algorithm or artificial intelligence to provide additional insights into employee conversion of PTO hours and provide recommendations to the employer. For example, the PTO conversion service may use the employer's PTO hours conversion information to determine what policies or benefits may be provided, enhanced, or otherwise modified to improve employee quality of life. Similar to the processing of PTO hours usage information, the PTO conversion service may execute one or more clustering algorithms, neural networks, SVMs, and the like on datasets comprising PTO hour conversions for an organization over a period of time and other employee information (e.g., salary information, benefits information, etc.) for employees of the organization. The resulting output may include possible recommendations that may be implemented to improve employee quality of life. For example, if the PTO conversion service determines that employees within an organization are converting their PTO hours into fast cash or student loan payments, the PTO conversion service may determine that employees are unable to save enough money between pay cycles. Further, based on this determination, the PTO conversion service may identify one or more applicable recommendations for policies or benefits that may be extended to employees to allow employees to save money between pay cycles or to reduce their student loan burden through an education benefit plan. These determinations may correspond to clusters that correspond to different root causes (e.g., inability to save money, inability to cover student loan payments, etc.) and to different recommendations. The PTO conversion service may update the interface 1000 to provide the employer with any insights and corresponding recommendations, as determined above.

The interface 1000 may further include a detailed totals breakdown panel 1010, through which the PTO conversion service may provide a more detailed breakdown of data represented in any of the panels 1002-1008 described above. For example, if an employer selects the enrolled employees panel 1002, the PTO conversion service may update the detailed totals breakdown panel 1010 to provide a graphical representation of total enrolled employee growth over time. Each element (e.g., a bar, a slice, etc.) may be further broken down into sub-elements. For example, an element within the detailed totals breakdown panel 1010 may represent the total number of employees within the employer's workforce that enrolled with the PTO conversion service for the given time period (e.g., within a particular month, etc.). This element may be further broken down into sub-elements, wherein each sub-element represents employees within a particular organization that enrolled with the PTO conversion service. As another illustrative example, if the employer selects the PTO hours used panel 1006, the PTO conversion service may update the detailed totals breakdown panel 1010 to provide a graphical representation of the total use of PTO by employees within the employer's workforce over time. Each element may be broken down into sub-elements, wherein each sub-element represents the type of PTO utilized by employees (e.g., vacation, sick leave, bereavement, military leave, etc.) within the employer's workforce. Thus, through the detailed totals breakdown panel 1010, an employer may evaluate employee and PTO usage data at a more granular level.

The interface 1000 may further include a current total breakdown panel 1012, through which the PTO conversion service may provide a contemporaneous breakdown of data represented in any of the panels 1002-1008 described above. For instance, if an employer selects the enrolled employees panel 1002, the PTO conversion service may update the current total breakdown panel 1012 to provide a more detailed breakdown of the total number of employees currently enrolled with the PTO conversion service. The more detailed breakdown may provide additional information, such as a percentage of the employer's workforce that is currently enrolled with the PTO conversion service. In some instances, the current total breakdown panel 1012 can further provide a breakdown of employees enrolled with the PTO conversion service by organization, by team, or by any other sub-element of the employer's workforce. Thus, an employer may readily determine how employees are currently engaged with the PTO conversion service, using their PTO hours, converting their PTO hours, and the like.

It should be noted that the interface 1000 may include additional and/or alternative elements than those described above and illustrated in FIG. 10. For example, through the interface 1000, the PTO conversion service may further provide details regarding received requests to use or convert PTO hours by employees within the employer's workforce and the status of such requests. Further, as noted above, through the interface 1000, the PTO conversion service may provide an employer with recommendations to address any particular issues identified by the PTO conversion service resulting from use or lack of use of PTO hours. Through the interface 1000, the PTO conversion service may further provide an employer with various metrics with regard to the impact of PTO usage to key performance indicators, such as retention, workers' compensation claims, use of overtime, use of sick leave, and the like.

Figure 11C:

FIGS. 11A-11G show an illustrative example of an interface through which an employer can configure various settings related to employee use of paid time off according to some embodiments. As illustrated in FIG. 11A, an employer may define one or more general settings for its account. As noted above, the PTO conversion service may obtain a detailed roster of the employer's workforce during an employer onboarding process. The PTO conversion service, via an administrative section management section 1102 of the interface 1100, may allow an employer to select any employee from the employer's workforce roster that may be designated as an administrator or other entity authorized to access the administrative section of the PTO conversion service. The administrative section of the PTO conversion service may be represented by the interfaces described herein in connection with FIGS. 10 and 11A.

Through the administrative section management section 1102 of the interface 1100, an employer may access its workforce roster and select an employee from this roster to add to a list of employees authorized to access the administrative section of the PTO conversion service. Additionally, an employer may assign a role to the selected employee. Each role may correspond to a set of policies or rules that define the level of access to the administrative section of the PTO conversion service. For instance, an employee assigned with the "Admin" role may be allowed to read the aggregated data obtained by the PTO conversion service, such as the data presented via the interface 1000 described above in connection with FIG. 10. Further, an employee assigned with the "Admin" role may be authorized to implement rules or policies for specific employees within the employer's workforce, approve or deny PTO requests, and the like. As another example, an employee may be assigned with an alternative role, whereby the employee may only be authorized to view the data presented via the interface 1000, such as employee usage of PTO, employee conversion of PTO, and the like. However, this employee may not be authorized to perform any of the operations that an employee assigned with the "Admin" role may perform. Thus, through the administrative section management section 1102, an employer may manage access to the administrative section of the PTO conversion service and define specific roles to employees granted access to this section.

The interface 1100, as illustrated in FIG. 11A, may further include a contact preferences section 1104, through which an employer or other authorized user (e.g., administrator, HR professional, etc.) may define contact preferences for contacting employees with regard to usage and/or conversion of PTO. Through the contact preferences section 1104, an employer or other authorized user may authorize the PTO conversion service to contact employees directly via one or more contact methods (e.g., e-mail, SMS message, etc.). Further, the employer or other authorized user may define the conditions for contacting employees with regard to their usage and/or conversion of PTO. For example, as illustrated in FIG. 11A, an employer or other authorized user may select one or more options to allow the PTO conversion service to contact employees when PTO has not been taken for more than a predefined period of time, when PTO balances reach a certain number of hours, when PTO liability for an employee exceeds a particular amount, when there are opportunities for an employee to take PTO without impact its organization or work, when vacation options or wish list locations go on sale, and the like.

As illustrated in FIG. 11B, through the interface 1100, an employer or other authorized user may review the employer's billing settings (e.g., corporate accounts through which PTO conversion payments may be processed, etc.). For instance, through the billing settings section of the interface 1100, an employer or other authorized user may review the employer's payment history, such as through a payment history section 1106. The PTO conversion service, through the payment history section 1106, may provide an employer or other authorized user with a history of payments previously made to the PTO conversion service, as well as any outstanding balances and scheduled payments. Through the payment history section 1106, an employer or other authorized user may readily identify the amount that was due for a given time period, the status of the stated balance, the payment method utilized, any notes (e.g., discounts provided to the employer, etc.), and the corresponding invoice for services provided by the PTO conversion service.

The PTO conversion service may also provide an employer or other authorized user with a payment method section 1108, through which an employer or other authorized may select a payment method for any balances due to the PTO conversion service and manage any number of payment methods that may be used for payment of any balances due. For instance, as illustrated in FIG. 11B, an employer or other authorized user may define a primary payment method that is to be used, by default, for payment of any pending balances. Further, through the payment method section 1108, an employer or other authorized user may add a new payment method and review any other payment methods previously defined through the interface 1100. An employer or other authorized user may select an alternative payment method for payment of a pending balance and define this alternative payment method as a new primary, or default, payment method for future balances.

In an embodiment, the PTO conversion service also allows an employer or other authorized user to define its report delivery preferences via the interface 1100, For instance, as illustrated in FIG. 11C, via a report delivery preferences section 1110, the PTO conversion service may allow the employer or other authorized user to define its delivery preferences for different reports that may be prepared and made available by the PTO conversion service. For example, as illustrated in FIG. 11C, the PTO conversion service may allow the employer or other authorized user to determine whether it wishes to receive a PTO digest (e.g., summary of enrollment, PTO liability, time used, and time converted for its workforce), an enrollment report, a PTO liability report, an hours used report, and/or an hours converted report. Further, for each of these available reports, the PTO conversion service may allow the employer or other authorized user to define the frequency in which these reports are provided to the employer or other authorized user. For example, as illustrated in FIG. 11C, the employer or other authorized user has indicated that it wishes to receive a PTO digest on a weekly basis for its workforce. It should be noted that the report delivery preferences section 1110, in some examples, may include additional and/or alternative preference settings. For example, through the report delivery preferences section 1110, an employer or other authorized user may specify, for which organizations, locations or sites, different groups or teams per manager, and the like, reports are to be generated and provided to the employer or other authorized user. For instance, an employer may define, via the report delivery preferences section 1110, that the employer wishes to obtain a weekly PTO digest for a particular organization within its workforce.

Further, through the interface 1100 (as illustrated in FIG. 11D), an employer or other authorized user may manage alerts and notifications from the PTO conversion service. For instance, through the interface 1100, an employer may indicate that it is to be alerted when total PTO liability surpasses a predefined threshold. Further, an employer may indicate that it is to be notified when a new request for PTO conversion is received by the PTO conversion service that requires employer approval. As illustrated in FIG. 11D, the interface 1100 may include an alert and notification preferences section 1112, through which an employer or other authorized user may manage how the PTO conversion service alerts the employer or other authorized user of key or important activities. For instance, as illustrated in FIG. 11D, an employer or other authorized user may specify the one or more communications channels (e.g., e-mail, text messages, push notifications, etc.) that are to be used to notify the employer and/or other authorized users with regard to key or important activities and events. Further, via the alert and notification preferences section 1112, an employer or other authorized user may define the activities or events for which the employer or other authorized user is to be notified by the PTO conversion service. For example, as illustrated in FIG. 11D, an employer or other authorized user has indicated that it wishes to be notified when the employer's PTO liability reaches $10,000,000 and when the employer's liability drops below $1,000,000. If the PTO conversion service detects either event, the PTO conversion service may automatically transmit a notification to the employer or other authorized user over the communications channel(s) designated by the employer or other authorized user.

The PTO conversion service, via the interface 1100, may also allow an employer or other authorized user to define rules and/or policies for conversion of PTO. For instance, as illustrated in FIG. 11E, an employer may create policies or rules to define limitations on the requests that can be submitted by an employee. For example, via an eligible policies section 1114 of the interface 1100, an employer or other authorized user may manage what policies can be used for PTO conversions. As illustrated in FIG. 11E, an employer or other authorized user has selected the employer's vacation and sick leave policies for use in PTO conversions. This may restrict employees to use of their available PTO according to the employer's vacation and sick leave policies for PTO conversions. Through the eligible policies section 1114, the employer or other authorized user may further modify the set of PTO policies that may be eligible for PTO conversion at any time. For example, an employer or other authorized user may add, remove, or select alternative PTO policies for PTO conversions.

In an embodiment, in addition to allowing an employer or other authorized user to define the eligible PTO policies that may be used for PTO conversions, the PTO conversion service allows the employer or other authorized user to further manage how employees may convert their available PTO from these PTO policies. For example, via the PTO conversion limits section 1116 of the interface 1100, an employer or other authorized user may define general employee limits for use of PTO under any of the policies selected in the eligible policies section 1114. As illustrated in FIG. 11E, an employer or other authorized user may determine that employees can convert a certain amount of their available PTO over a certain time period, the types and frequency of conversions that may be performed, the monetary amount of PTO that can be converted, and the like. Further, through the PTO conversion limits section 1116, the employer or other authorized user may set custom employee limits for each of their selected PTO policies. For example, an employer or other authorized user may define PTO conversion limits for groups of employees (e.g., executives, as illustrated in FIG. 11E) that may differ from those generally applied to the workforce in general. Thus, an employer or other authorized user may define and customize PTO conversion limits and rules as so desired and at any granular level (e.g., different organizations, different locations or sites, different employee groups or teams per manager, etc.).

In an embodiment, via the PTO conversion limits section 1116 of the interface 1100, an employer or other authorized user can further define limits on the usage of accrued and future PTO balances for paid time off or for other purposes (e.g., conversions). For example, via the PTO conversion limits section 1116, an employer or other authorized user may define the amount of PTO that can be utilized by the employee from future balances (e.g., PTO that has not been earned but is scheduled to be earned on a future date). For instance, an employer or other authorized user may indicate that an employee may be allowed to have a negative PTO balance up to a certain amount. Thus, while an employee may not have sufficient accrued PTO for conversion, the employer or other authorized user may authorized an employee to convert a certain amount of future PTO beyond the accrued PTO for particular purposes.

In an embodiment, the PTO conversion service further allows an employer or other authorized user to define workforce limits for PTO conversions over a period of time. For instance, as illustrated in FIG. 11F, the PTO conversion service may provide, via the interface 1100, a workforce limits section 1118, through which an employer or other authorized user may define workforce limits on the conversion of PTO from the aforementioned PTO policies. For example, as illustrated in FIG. 11F, an employer or other authorized user has defined a maximum company-wide amount of PTO conversions that may be made per year. An employer or other authorized user may define this maximum amount and the time period for these conversions via the workforce limits section 1118. Further, via the workforce limits section 1118, the employer or other authorized user may define one or more blackout periods during which PTO conversions are not permitted.

In addition to defining workforce limitations on PTO conversions and usage, an employer or other authorized user, via the interface 1100, may manage how employees can use their PTO (e.g., which types of conversions may be performed). For example, a policy or rule may indicate that requests to convert PTO for particular purposes require employer approval while other types of requests may be automatically approved by the PTO conversion service and processed accordingly. As another example, an employer may define, via a destinations section 1120 of the interface 1100, a limit on the types of conversions that may be performed using available PTO. For instance, via the destinations section 1120, an employer or other authorized user may determine that which types of PTO conversions may be performed by employees. In an embodiment, the PTO conversion service can implement one or more default rules or policies for employees of the employer's workforce. For instance, if the employer has not defined an explicit rule or policy for particular PTO conversion requests, the PTO conversion service, by default, may submit such requests from employees to the employer for approval automatically. Alternatively, if the employer has not defined an explicit rule or policy for particular PTO conversion requests, the PTO conversion service, by default, may approve these requests.

Figure 11G:
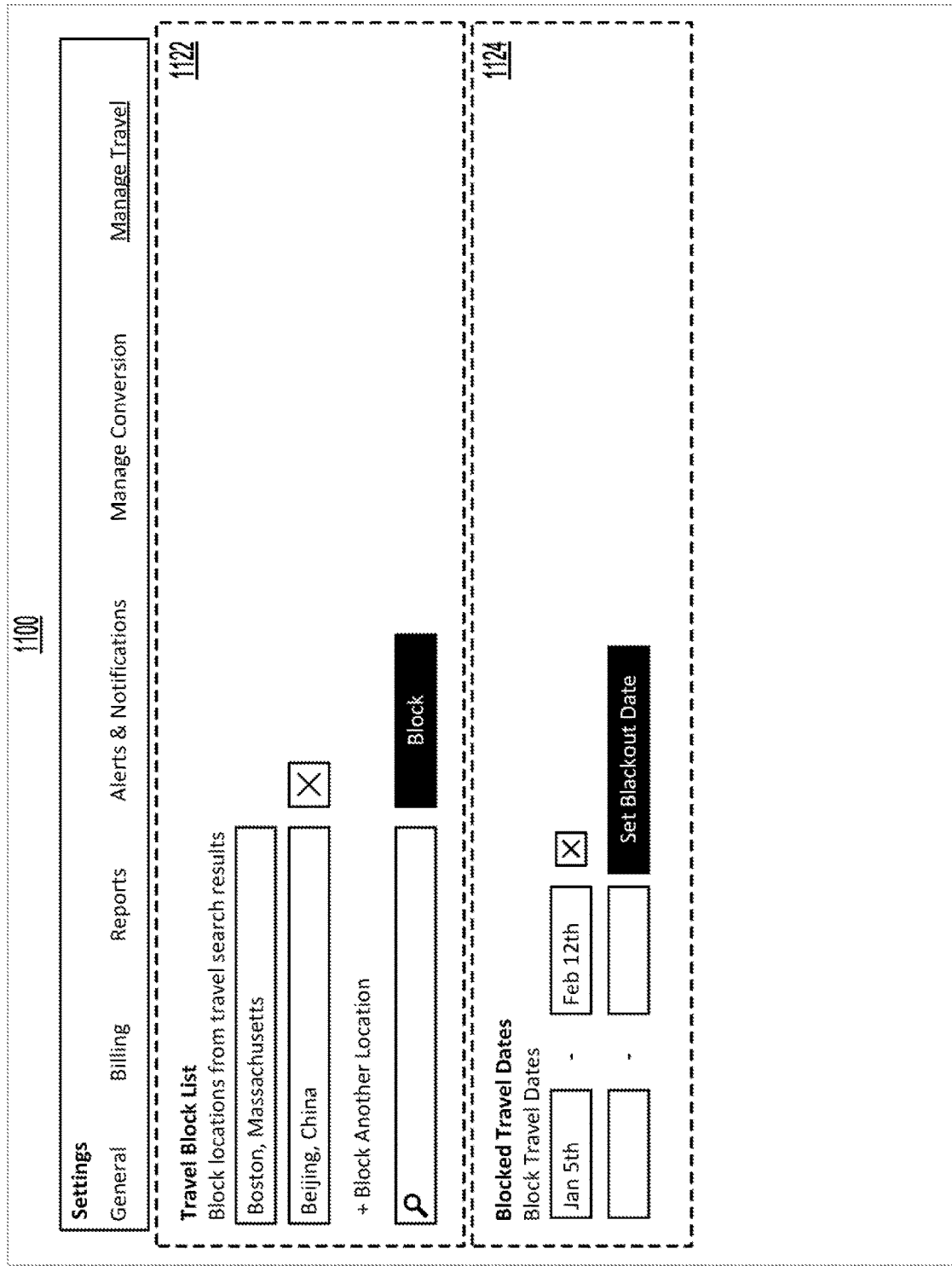

As illustrated in FIG. 11G, through the interface 1100, an employer or other authorized user may define one or more policies or rules to limit travel destinations that may be offered to employees for PTO conversion. For example, if an employer wishes to prohibit its employees from using PTO to purchase travel options for a particular destination, the employer, via a travel block list section 1122 of the interface 1100, may define one or more policies or rules to indicate that PTO conversion requests to purchase a travel option for particular destinations are to be automatically denied. Similarly, the employer or other authorized user may designate certain destinations as being prohibited. Thus, when an employee submits a travel option query to identify travel options, the PTO conversion service may discard any results corresponding to the prohibited destinations and present those that may be purchased by the employee. Further, via a blocked travel dates section 1124 of the interface 1100, an employer or other authorized user may define a date or range of dates during which employees are not authorized to use PTO for travel and/or experiences. This may include prohibiting conversions of PTO for purchase of travel and/or experiences during the prohibited dates and prohibiting taking PTO to partake in travel and/or experiences during the prohibited dates.

Figure 12:
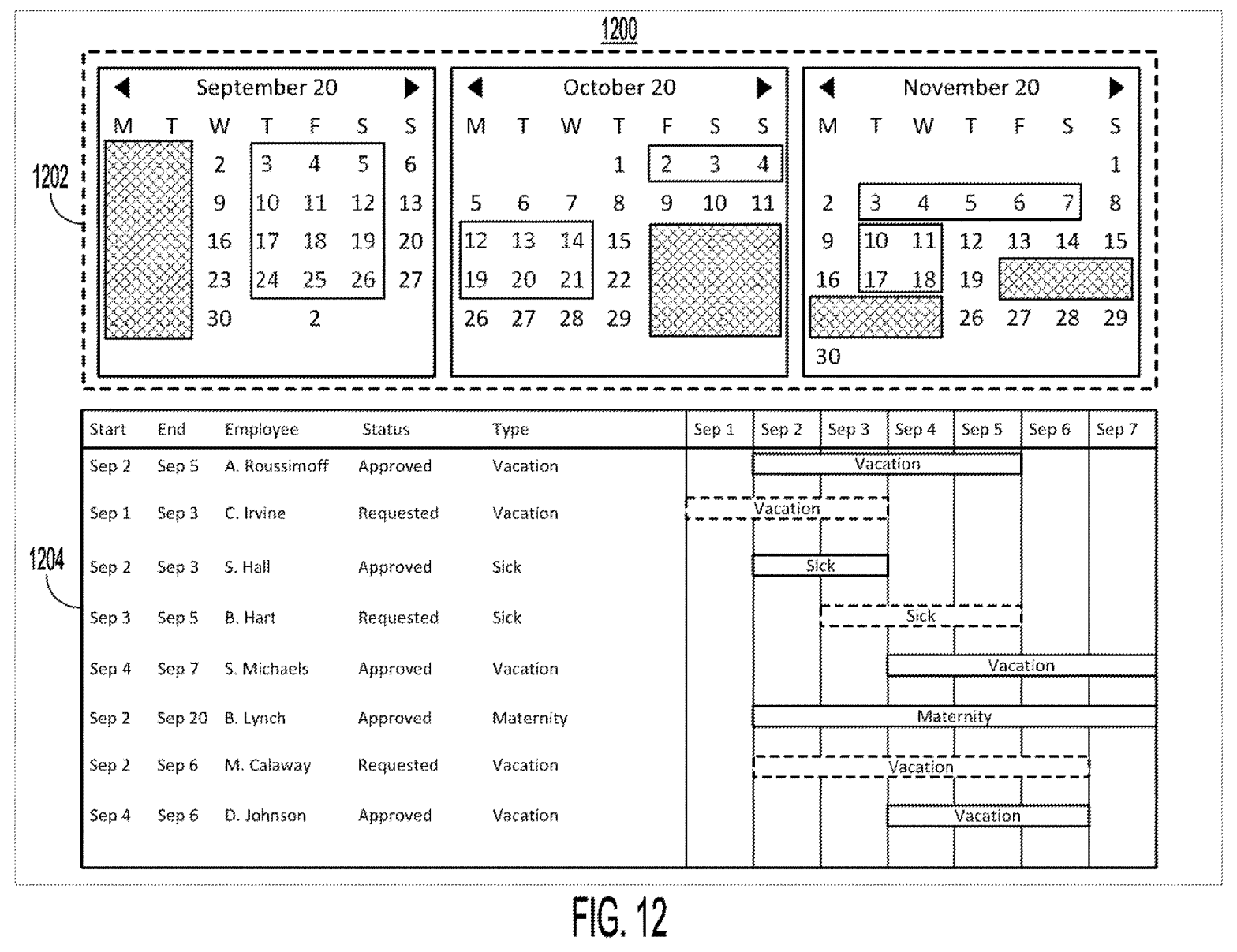

FIG. 12 shows an illustrative example of an interface 1200 through which an employer can review previously received requests to utilize paid time off and workforce demand over various periods of time according to some embodiments. In an embodiment, the PTO conversion service, via the interface 1200, can present to an employer a calendar 1202, through which workforce demand and PTO usage can be illustrated. The calendar 1202 may be generated by the PTO conversion service using historical data obtained from the employer's HR system or HR systems provider. This historical data may include historical PTO information corresponding to PTO that has been used, approved, or denied. Additionally, the PTO conversion service may obtain PTO request information corresponding to requests to utilize PTO in the future and the status of these requests (e.g., approved, denied, etc.).

In an embodiment, the PTO conversion service uses the historical data obtained from the employer's HR system or HR systems provider as input to one or more machine learning algorithms or artificial intelligence to identify workforce PTO trends that may be used to identify periods of time during which employees are more likely to use PTO, resulting in reduced workforce availability. Further, the PTO conversion service may utilize other performance data associated with an employer as input to these one or more machine learning algorithms or artificial intelligence to identify periods of time during which the employer may have increased workforce demand. For instance, the PTO conversion service may obtain, from an employer, noted employer observations of workforce behavior (e.g., requesting PTO during certain time periods, spikes in sick leave as a result of increased overtime usage, etc.) that can be used to identify workforce PTO trends within the employer's workforce. These observations may be used as input to the one or more machine learning algorithms or artificial intelligence. These identified periods of time may be evaluated to identify periods of time that may be favorable for employees to utilize their PTO for vacations, sick leave, or otherwise be away from the workplace.

In an embodiment, the PTO conversion service uses one or more time series models to predict future PTO usage within an employer's workforce and within organizations associated with the workforce based on obtained historical PTO usage data and historical workforce demand data. For instance, the PTO conversion service may convert the historical data obtained from the employer's HR systems or HR systems provider into one or more time series that may be used as input to a time series model to generate a prediction or forecast of future PTO usage and workforce demands. For example, the PTO conversion service may execute one or more time series models, such as moving average models, exponential smoothing models, autoregressive integrated moving average (ARIMA) models, and other suitable machine-learning models, on these time series.

In an embodiment, the PTO conversion service can also use other inputs to the machine learning algorithms or artificial intelligence to identify possible areas of concern with regard to PTO usage within an employer's workforce at a granular level (e.g., at an organizational level, at a location or work site level, at a manager level, etc.). For example, the PTO conversion service may obtain, from the employer's HR systems or HR systems provider, employee workforce information (e.g., organization charts, managerial assignments, employee roles/job titles, employee responsibilities, etc.), employee demographic information (e.g., age, gender, ethnicity, disabilities (if any), religion (if known), etc.), and the like. Further, the PTO conversion service may obtain information regarding previously processed PTO requests. This may include the time period during which requests have been processed and their status (e.g., approved or denied). Further, for each request that was approved or denied, the PTO conversion service may obtain the length of PTO requested. This information may also include the origin of each PTO request (e.g., employee that made the request, manager that approved or denied the request, the organization from which the request originated, etc.).

The output of the one or more machine learning algorithms or artificial intelligence may specify one or more areas of concern for the employer. For instance, based on the provided inputs described above, the one or more machine learning algorithms or artificial intelligence may identify biases amongst particular managers within the employer's workforce (e.g., a particular manager is refusing PTO requests from a particular employee based on a demographic feature, etc.), organizations that do not allow employees to utilize their PTO during uneventful periods of time, and the like. Further, the one or more machine learning algorithms or artificial intelligence may further highlight possible rationales for PTO request denials, such as employee criticality (e.g., the employee is in a critical role where their presence is required at certain times, other employees that can perform similar role are unavailable, etc.) or critical periods of time for the workforce (e.g., deliverable deadlines, etc.). This information may be provided to the employer via a report or through the interfaces described above in connection with FIGS. 10 and 11A-11G.

The PTO conversion service may use the resulting predictions and forecasts generated using the one or more time series models to identify periods of time during which employees are likely to utilize their PTO and during which workforce demand may be high. These periods of time may be illustrated for an employer via the calendar 1202, whereby dates corresponding to predicted periods of high PTO usage and/or high workforce demand are highlighted (e.g., using shaded blocks, using colored blocks, etc.). In an embodiment, the resulting predictions and forecasts can be augmented based on approved PTO requests for dates specified in the calendar 1202. For instance, if a resulting prediction or forecast indicates that a particular date is subject to a moderate amount of PTO usage, but the employer has approved several requests for PTO to be taken on the particular date, the PTO conversion service may update the calendar 1202 to indicate a higher level of PTO usage on the date than originally predicted using the time series models.

In an embodiment, in addition to identifying periods of time during which employees are likely to utilize their PTO and during which workforce demand may be high, the PTO conversion service can further calculate the probability that a particular PTO request would be approved. As noted above, the PTO conversion service may use one or more machine learning algorithms or artificial intelligence to determine possible rationales for PTO request denials, such as employee criticality (e.g., the employee is in a critical role where their presence is required at certain times, other employees that can perform similar role are unavailable, etc.) or critical periods of time for the workforce (e.g., deliverable deadlines, etc.). Further, the PTO conversion service may utilize PTO request trends at a managerial level to determine any manager tendencies and/or biases for approval or denial of PTO requests. In some instances, the PTO conversion service may evaluate the employee's PTO request to determine a sentiment or intent behind the request. For instance, the PTO conversion service may require the employee to provide a rationale for requesting PTO (e.g., personal or family illness, exhaustion, reaching maximum PTO limits, etc.). Using this information, the one or more machine learning algorithms or artificial intelligence may calculate a probability of a PTO request being approved by the employee's organization. These probabilities may be reflected using the calendar 1202, such that an employee may be able to readily determine the likelihood of a PTO request being approved.

In addition to the calendar 1202, the PTO conversion service may provide, via the interface 1200, a PTO request panel 1204, through which the employer may be presented with PTO requests that have been approved, denied, or currently pending approval from the employer. Through the PTO request panel 1204, the PTO conversion service, for each particular PTO request, may present to the employer the start and end date for the PTO requested, the name of the employee that submitted the request, the status of the PTO request, the type of PTO that is to be taken (e.g., vacation, sick leave, maternity/paternity leave, military leave, jury duty, etc.), and the like. Further, via the PTO request panel 1204, the PTO conversion service may present, for each request, a graphical representation of the PTO that is to be taken by the employee within a time scale. For example, as illustrated in FIG. 12, the PTO conversion service may present, via the PTO request panel 1204, any requests for PTO with a start date and/or end date between September 1 and September 7, while providing a graphical representation of the PTO requested within a calendar extending from September 1 through September 7. This may allow the employer to readily identify any overlap in PTO for employees within the employer's workforce or within a particular organization.

In an embodiment, an employer or other authorized user can review any pending requests presented via the PTO request panel 1204 and either approve or deny the request. For instance, an employer or other authorized user may use the calendar 1202 to determine whether a particular PTO request coincides with a period of time during which there is a higher workplace demand and/or a significant number of employees are likely to use PTO. If so, the employer or other authorized user may determine that approval of the request would result in a greater strain on the employee's organization. This may cause the employer or other authorized user to deny the PTO request. As another example, if the employer or other authorized user determines that a PTO request coincides with a period of time during which there is a lower workplace demand and/or PTO is not being utilized by many employees, the employer or other authorized user may determine that the PTO request can be approved.

Figure 13:
FIG. 13 shows an illustrative example of an interface through which an employee can submit a request to repurpose paid time off for travel related purchases according to some embodiments.

FIG. 13 shows an illustrative example of an interface 1300 through which an employee can submit a request to repurpose paid time off for travel related purchases according to some embodiments. As noted above, the PTO conversion service may be provided access, by one or more travel partners, to a GDS, which may facilitate transactions between travel service providers and travel agents. The GDS may include a catalog of available travel options, including prices for each of these options.

In an embodiment, the PTO conversion service provides, via the interface 1300, various query options that may be used by an employee to submit a query for available travel options that may be purchased using their available PTO. For example, as illustrated in FIG. 13, an employee using the interface 1300 may be presented with one or more options to search for flights, cruises, hotels, and rental cars. Further, an employee may be presented with options to indicate its departure location, destination location, departure date, return date, and the like. For particular options, the employee may also be presented with additional options that may be used in a query. For instance, as illustrated in FIG. 13, if an employee has selected a "flights" option, the PTO conversion service may present the employee with options to determine whether the flight is to be a round-trip flight, how many passengers, whether the employee would like to travel in economy or first-class, how many bags the employee would like to bring on the flight, and the like. This information may be used by the PTO conversion service to generate a query for the GDS to identify available travel options for the employee.

Once the employee has submitted its travel options request via the interface 1300, the PTO conversion service may access the GDS to obtain the available travel options and present these to the employee via the interface 1300. The available travel options provided to the employee may be obtained via a query of the GDS based on the options selected by the employee (e.g., travel dates, travel origination and destination locations, required amenities, etc.). The available travel options may be presented to the employee via the interface 1300, through which the PTO conversion service may also provide pricing information for each of the available travel options. In an embodiment, the PTO conversion service evaluates any applicable rules or policies to identify any travel options that may be automatically denied. As noted above, an employer may define a policy or rule designating one or more prohibited destinations for one or more of its employees. The PTO conversion service may remove any travel options or otherwise reject a request to identify travel options that include any prohibited destinations, as indicated by the employer. As another example, if an applicable policy or rule specifies that the employee is not authorized to use PTO during the designated dates, the PTO conversion service may automatically reject the query from the employee.

In an embodiment, the PTO conversion service provides, via the interface 1300, different travel options that may correspond to an employee's preferences or wish list. For example, during an employee onboarding process, the PTO conversion service may solicit, from the employee, information regarding destinations that the employee may be interested in visiting in the future. The PTO conversion service may use this information to continuously monitor the GDS for travel options corresponding to the destinations specified by the employee. Further, the PTO conversion service may monitor the pricing of these travel options to identify periods of time during which the cost of these travel options is at or near a low point. In an embodiment, the PTO conversion service can also evaluate PTO usage and workforce demands within the employee's organization to identify periods of time during which the employee may feasibly take advantage of its PTO and take advantage of a travel option. The confluence of travel option pricing, workforce demands, and PTO usage within an employee's organization may be used to identify travel opportunities for an employee, for which the employee may take advantage of reduced pricing while minimally impacting its organization over the duration of travel. As illustrated in FIG. 13, the PTO conversion service, via the interface 1300, may present these travel opportunities to the employee, indicating the reduction in price for these travel opportunities. The employee may select any of these travel opportunities and submit a request for conversion of its PTO for purchase of the travel opportunity.

In an embodiment, the PTO conversion service further provides, via the interface 1300, a calendar highlighting workforce demand and PTO usage over a particular time period. The calendar may be similar to the calendar 1202 described above in connection with FIG. 12. An employee may review the calendar provided via the interface 1300 to readily determine whether selection of a travel option may result in additional disruption or impact to the employee's organization. For instance, for a set of dates selected by the employee, the employee may review the calendar to determine whether this set of dates correspond to one or more periods of significant workforce demand and/or significant PTO usage by other employees within the employee's organization. In some instances, the calendar may also be used to indicate any blackout dates, as designated by the employer, during which PTO may not be taken for travel purposes. This may guide the employee in identifying an optimal period of time for using its PTO for travel purposes.

Once the employee has selected a travel option for purchase using its PTO, the PTO conversion service may process the employee request in accordance with the process 800 described above in connection with FIG. 8. In some embodiments, the PTO conversion service allows an employee to use any combination of PTO and other payment methods for payment of a selected travel option. For instance, when an employee selects a particular travel option for purchase, the PTO conversion service may provide the employee, via the interface 1300, with an option to designate an amount of PTO that is to be converted for purchase of the travel option. Based on the amount of PTO selected, the PTO conversion service may calculate the remaining amount required for the purchase and present this remaining amount to the employee. The employee may select one or more payment methods (e.g., credit card, debit card, etc.) for this remaining amount. In some instances, the PTO conversion service may allow the employee to use payment methods other than PTO for purchase of the selected travel option.

In an embodiment, the PTO conversion service provides, via the interface 1300, a bookings tab, through which an employee can review their previous and current travel bookings. For instance, through the bookings tab, an employee may review travel reservation information (e.g., departure times, arrival times, reservation numbers, etc.) associated with a purchased travel option. In some instances, and as described in greater detail herein, the employee may use the bookings tab to revise or cancel an existing travel purchase, provided that a period of time for cancellation or revision of a particular itinerary has not elapsed. Further, via the bookings tab, the employee may provide additional information, including frequent flyer membership information, known traveler numbers, emergency contact information, and the like. In some instances, an employee may provide this additional information via a travel profile section of an interface provided by the PTO conversion service. The PTO conversion service may obtain this additional information from the travel profile section and present the additional information to the employee via the bookings tab.

Figure 14:
FIG. 14 shows an illustrative example of an interface through which an employee can submit a request to repurpose paid time off for an experience or other short-term event according to some embodiments.

FIG. 14 shows an illustrative example of an interface 1400 through which an employee can submit a request to repurpose paid time off for an experience or other short-term event according to some embodiments. The interface 1400 may include similar elements to those included in the interface 1300 described above in connection with FIG. 13. For instance, the interface 1400 may include a calendar highlighting workforce demand and PTO usage over a particular time period. An employee may review the calendar provided via the interface 1400 to readily determine whether selection of an experience option may result in additional disruption or impact to the employee's organization. In some instances, the calendar may also be used to indicate any blackout dates, as designated by the employer, during which PTO may not be taken for experience purposes. This may guide the employee in identifying an optimal period of time for using its PTO for experience purposes.

The PTO conversion service, through the interface 1400, may also provide an employee with various experience options within a particular distance from the employee. For instance, the PTO conversion service may provide, via the interface 1400, a distance slider through which an employee may define the maximum distance from the employee or from a travel destination for which the PTO conversion service is to identify experiences that may be available to the employee. Based on the employee's definition of a maximum allowable distance from its location for experiences, the PTO conversion service may query a database or system associated with an experience provider or partner to identify any available experience options that may be purchased by the employee. The PTO conversion service may update the interface 1400 to present these available experience options to the employee.

In an embodiment, the PTO conversion service evaluates any applicable rules or policies to identify any experience options that may be automatically denied. As noted above, an employer may define a policy or rule designating one or more prohibited destinations for one or more of its employees. Similarly, an employer may define a policy or rule designating certain activities as being prohibited for one or more of its employees. The PTO conversion service may remove any experience options or otherwise reject a request to identify experience options that include any prohibited activities or are within prohibited locations, as indicated by the employer. As another example, if an applicable policy or rule specifies that the employee is not authorized to use PTO during the designated dates, the PTO conversion service may automatically reject the query from the employee.

Once the employee has selected an experience option for purchase using its PTO and/or other payment method, the PTO conversion service may process the employee request in accordance with the process 800 described above in connection with FIG. 8. In some embodiments, the PTO conversion service allows an employee to use any combination of PTO and other payment methods for payment of a selected experience option. For instance, when an employee selects a particular experience option for purchase, the PTO conversion service may provide the employee, via the interface 1400, with an option to designate an amount of PTO that is to be converted for purchase of the experience option. Based on the amount of PTO selected, the PTO conversion service may calculate the remaining amount required for the purchase and present this remaining amount to the employee. The employee may select one or more payment methods (e.g., credit card, debit card, etc.) for this remaining amount. In some instances, the PTO conversion service may allow the employee to use payment methods other than PTO for purchase of the selected experience option.

In an embodiment, the PTO conversion service provides, via the interface 1400, a bookings tab, through which an employee can review their previous and current experience bookings. For instance, through the bookings tab, an employee may review experience reservation information (e.g., departure times, arrival times, reservation numbers, etc.) associated with a purchased experience option. In some instances, and as described in greater detail herein, the employee may use the bookings tab to revise or cancel an existing experience purchase, provided that a period of time for cancellation or revision of a particular itinerary has not elapsed. Further, via the bookings tab, the employee may provide additional information, including emergency contact information, dietary restrictions, allergy information, and the like. In some instances, an employee may provide this additional information via an experience profile section of an interface provided by the PTO conversion service. The PTO conversion service may obtain this additional information from the experience profile section and present the additional information to the employee via the bookings tab.

Figure 15:
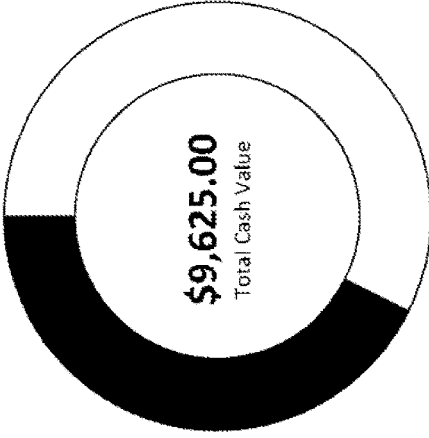
FIG. 15 shows an illustrative example of an interface through which an employee can submit a request to convert paid time off into a fast cash payment according to some embodiments.

FIG. 15 shows an illustrative example of an interface 1500 through which an employee can submit a request to convert paid time off into a fast cash payment according to some embodiments. The PTO conversion service, via the interface 1500, may provide an employee with various options for requesting an emergency or fast cash conversion of its PTO for deposit into an employee's banking or credit union account (e.g., checking, savings, etc.). For example, as illustrated in FIG. 15, the PTO conversion service may provide a transfer selection panel 1502, through which an employee may determine how much PTO to convert to obtain a cash payment and specify a delivery destination for this cash payment.

The transfer selection panel 1502 may include a PTO balance selection box 1508, through which an employee may determine the type of PTO that is to be converted. For instance, as illustrated in FIG. 15, the employee may select an option to use its vacation policy PTO balance for conversion to a cash payment. However, through the PTO balance selection box 1508, the employee may select any other available types of PTO, such as sick leave PTO and the like. The PTO conversion service may indicate, via the PTO balance selection box 1508, the current balance for the selected PTO type. For example, as illustrated in FIG. 15, if the employee selects its vacation policy PTO for conversion, the PTO conversion service may update the PTO balance selection box 1508 to indicate the amount of PTO hours that the employee has according to the vacation policy. Further, the PTO conversion service may indicate, via the PTO balance selection box 1508, the equivalent cash value of the current balance for the selected PTO type. As noted above, the PTO conversion service may identify, from an employee database, the employee's pay rate or other conversion rate for PTO as defined by the employer. Using this pay rate or other conversion rate, the PTO conversion service may determine the cash value of the employee's available PTO and present this cash value to the employee via the PTO balance selection box 1508.

The transfer selection panel 1502 may further include a destination account selection box 1510, through which an employee may determine a destination account for deposit of the cash payment resulting from conversion of the employee's PTO. Through the PTO conversion service, such as during an onboarding process, an employee may provide banking and/or credit union account information corresponding to the employee's checking, savings, and/or other financial accounts. Further, through the PTO conversion service, the employee may alternatively provide debit card information associated with the employee's checking, savings, and/or other financial accounts. The PTO conversion service may store this information in the employee database. When the employee accesses the PTO conversion service to request conversion of its PTO to cash, the PTO conversion service may update the destination account selection box 1510 to indicate the one or more accounts that the employee may designate as the destination for the cash payment. In an embodiment, the PTO conversion service also provides, via the transfer selection panel 1502, an option to add a new account that can serve as the destination for the cash payment. If the employee selected this option, the PTO conversion service may update the interface 1500 to prompt the employee to provide account details for this new account (e.g., bank or credit union name, bank or credit union routing number, bank or credit union account number, band or credit union debit card number, etc.). Once the employee has supplied these account details, the PTO conversion service may update the destination account selection box to provide the new account as a selectable destination for the cash payment.

The PTO conversion service may also provide, via the transfer selection panel 1502, a PTO balance selection slider 1512, through which an employee may select the amount of PTO from the selected policy that is to be converted. For example, as illustrated in FIG. 15, the employee has moved the slider 1512 to indicate that ten hours from its vacation policy PTO is to be converted to cash. The PTO conversion service may indicate the selected amount and the corresponding cash value of the selected amount of PTO. As the employee moves the slider 1512, the PTO conversion service may update the interface 1500 in real time to present the amount of PTO that is to be converted and the equivalent cash value of the amount of PTO that is to be converted.

The interface 1500 may include a current PTO balance panel 1504, through which the PTO conversion service may present, to the employee, the employee's current PTO balances among different PTO policies (e.g., vacation, sick leave, etc.). For example, as illustrated in FIG. 15, the PTO conversion service may present the employee with a pie chart illustrating the amount of vacation policy PTO and the amount of comp time (e.g., sick leave) PTO available to the employee. Additionally, the PTO conversion service may present, to the employee, the corresponding cash value of the employee's total available PTO. For each type of PTO available to the employee, the PTO conversion service may provide a breakdown of the amount of PTO hours available per type and the corresponding cash value of these PTO hours. In an embodiment, via the current PTO balance panel 1504, the PTO conversion service can also provide an employee's PTO transaction history corresponding to prior conversions of PTO for cash. The PTO transaction history may include any previously completed transfer requests and any currently pending requests. Further, for any requests, the PTO conversion service may specify the date of the request, the status of the request, the amount of PTO hours being converted, the equivalent cash value of the PTO hours being converted, and the like.

As the employee selects the amount of PTO that is to be converted to cash via the transfer selection panel 1502, the PTO conversion service may dynamically update a transaction panel 1506 to provide the employee with the final cash amount that is to be transferred to the designated account, as selected by the employee. The transaction panel 1506 may specify the subtotal cash amount of the PTO that is to be converted before taxes and other fees are assessed. Further, the transaction panel 1506 may specify the estimated arrival time for the transfer (e.g., the amount of time for a deposit to be made to the designated account). Additionally, the transaction panel 1506 may specify any taxes and fees to be incurred for the transaction. Based on the subtotal and taxes/fees assessed, the PTO conversion service may present, via the transaction panel 1506, the final cash amount that is to be transferred to the designated account. The employee may review the transfer summary specified in the transaction panel 1506 and select a transfer now button 1514 to cause the PTO conversion service to initiate conversion of the selected PTO amount to cash and transfer this cash to the designated account.

In an embodiment, for a fast cash transfer to the employee's designated account, the PTO conversion service utilizes an original credit transaction (OCT) process, whereby the fast cash is transferred from a PTO conversion service account or employer account to the designated employee account. For instance, the PTO conversion service may initiate an electronic funds transfer from its account to the bank or credit union where the designated account is located. The electronic funds transfer may be received by the bank or credit union, which may deposit the cash amount into the employee's designated account, thus making the cash amount available quickly. In an embodiment, the PTO conversion service utilizes real time payments (RTP), such as through an RTP network, to transfer the fast cash to the employee's designated account.

In an embodiment, prior to initiating the fast cash transfer to the employee's designated account, the PTO conversion service determines whether the conversion of PTO for the requested fast cash transfer requires employer approval and/or whether an applicable rule or policy needs to be evaluated. The process of obtaining employer approval and evaluating any applicable policies associated with the employee and/or fast cash transfers is described in greater detail above in connection with FIGS. 5A-5B. If employer approval is not required, or the employer has indicated that the PTO conversion is approved, the PTO conversion service may convert the amount of PTO as specified by the employee to cash and deposit this cash to the employee's designated account, as described above.

Figure 16:
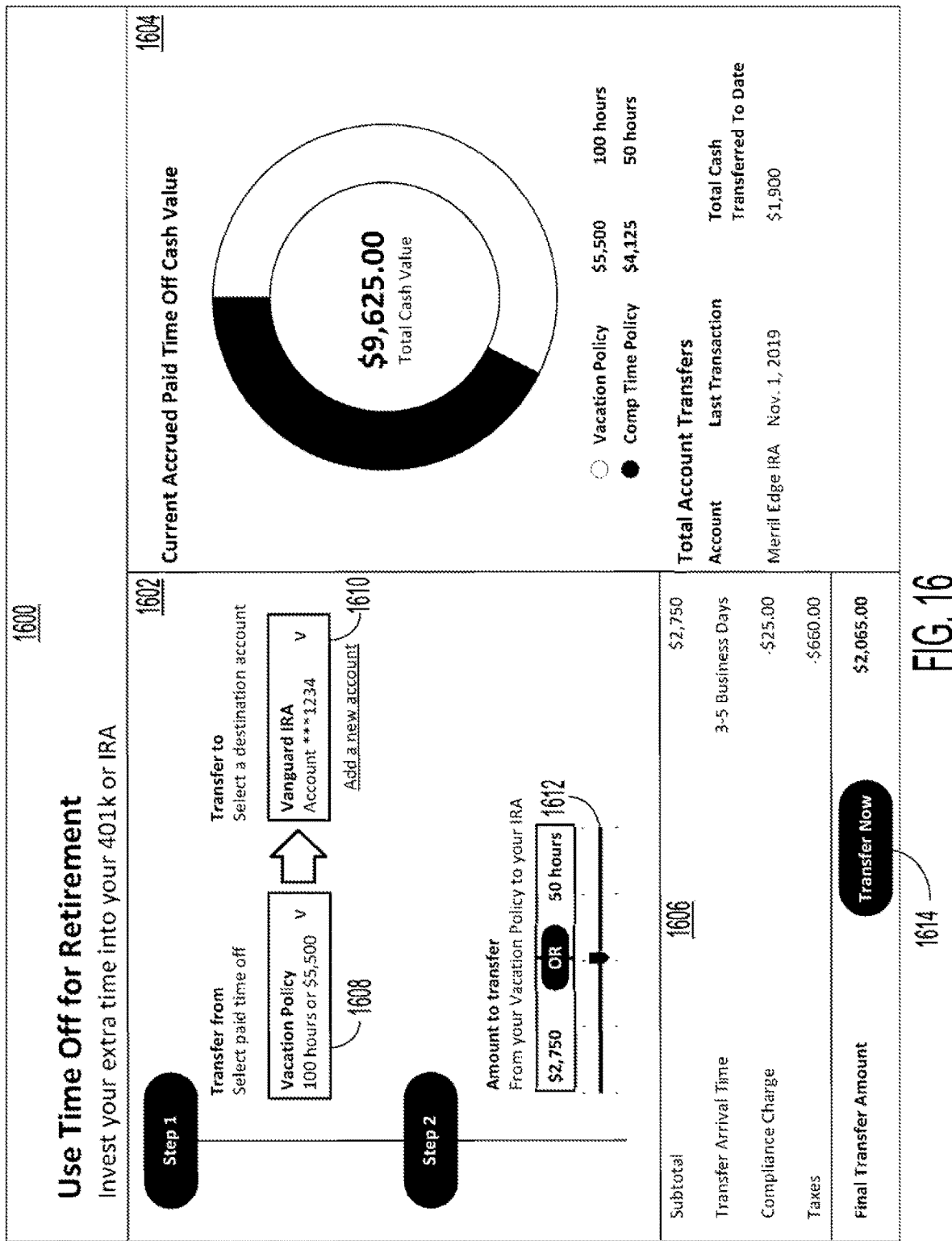
FIG. 16 shows an illustrative example of an interface through which an employee can submit a request to repurpose paid time off for investment of an equivalent cash value into one or more retirement accounts according to some embodiments.

FIG. 16 shows an illustrative example of an interface 1600 through which an employee can submit a request to repurpose paid time off for investment of an equivalent cash value into one or more retirement accounts according to some embodiments. The interface 1600 may include similar elements to those described and illustrated in connection with the interface 1500 of FIG. 15. For instance, the interface 1600 may include a transfer selection panel 1602. The transfer selection panel 1602 may include a PTO balance selection box 1608, through which an employee may determine the type of PTO that is to be converted, and a PTO balance selection slider 1612, through which an employee may select the amount of PTO from the selected policy that is to be converted.

The transfer selection panel 1602 may include a destination account selection box 1610 through which an employee may determine a destination account for disbursement of retirement funds resulting from conversion of the employee's PTO. Through the PTO conversion service, such as during an onboarding process, an employee may provide retirement account information corresponding to the employee's 401k, IRA, Roth IRA, or other retirement accounts. In an embodiment, the PTO conversion service can further provide the employee with an option to establish a new retirement account or other investment account (e.g., a 529 plan or other college savings account, mutual fund account, savings account, etc.) associated with the PTO conversion service. For instance, the PTO conversion service may provide (either through direct implementation or third-party affiliates) options for establishing retirement accounts or other types of investment accounts via the PTO conversion service. The employee may thus interact with the PTO conversion service to establish a new retirement account or other type of investment account and disburse funds resulting from conversion of the employee's PTO to this new account. The PTO conversion service may store this information in the employee database. When the employee accesses the PTO conversion service to request conversion of its PTO for investment into a retirement account, the PTO conversion service may update the destination account selection box 1610 to indicate the one or more accounts that the employee may designate as the destination for the investment. In an embodiment, the PTO conversion service also provides, via the transfer selection panel 1602, an option to add a new account that can serve as the destination for the retirement investment. If the employee selects this option, the PTO conversion service may update the interface 1600 to prompt the employee to provide account details for this new account (e.g., retirement investment management company name, retirement account number, etc.). Once the employee has supplied these account details, the PTO conversion service may update the destination account selection box 1610 to provide the new account as a selectable destination for the retirement investment.

Similar to the current PTO balance panel 1504 described above in connection with FIG. 15, the interface 1600 may include a current PTO balance panel 1604, through which the PTO conversion service may present, to the employee, the employee's current PTO balances among different PTO policies (e.g., vacation, sick leave, etc.). Further, via the current PTO balance panel 1604, the PTO conversion service may also provide an employee's PTO transaction history corresponding to prior conversions of PTO for retirement investments.

The interface 1600 may further include a transaction panel 1606 to provide the employee with the final amount that is to be invested in the designated retirement account. The transaction panel 1606 may specify the subtotal cash amount of the PTO that is to be converted before taxes and other fees are assessed. Further, the transaction panel 1606 may specify the estimated arrival time for the transfer (e.g., the amount of time for a deposit to be made to the designated retirement account). Additionally, the transaction panel 1606 may specify any taxes and fees to be incurred for the transaction. Based on the subtotal and taxes/fees assessed, the PTO conversion service may present, via the transaction panel 1606, the final investment amount that is to be transferred to the designated retirement account. The employee may review the transfer summary specified in the transaction panel 1606 and select a transfer now button 1614 to cause the PTO conversion service to initiate conversion of the selected PTO amount to cash and transfer this cash as a retirement investment to the designated retirement account.

In an embodiment, prior to performing the retirement investment to the employee's designated retirement account, the PTO conversion service determines whether the conversion of PTO for the retirement investment requires employer approval and/or whether an applicable rule or policy needs to be evaluated. The process of obtaining employer approval and evaluating any applicable policies associated with the employee and/or retirement investments using PTO conversions is described in greater detail above in connection with FIG. 4. If employer approval is not required, or the employer has indicated that the PTO conversion is approved, the PTO conversion service may convert the amount of PTO as specified by the employee and deposit this cash as a retirement investment to the employee's designated retirement account, as described above.

Figure 17:
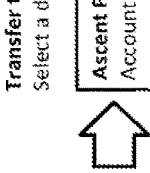
FIG. 17 shows an illustrative example of an interface through which an employee can submit a request to repurpose paid time off for payment of one or more student loans according to some embodiments.

FIG. 17 shows an illustrative example of an interface 1700 through which an employee can submit a request to repurpose paid time off for payment of one or more student loans according to some embodiments. The interface 1700 may include similar elements to those described and illustrated in connection with the interfaces 1500 and 1600 of FIGS. 15 and 16, respectively. For instance, the interface 1700 may include a transfer selection panel 1702. The transfer selection panel 1702 may include a PTO balance selection box 1708, through which an employee may determine the type of PTO that is to be converted, and a PTO balance selection slider 1712, through which an employee may select the amount of PTO from the selected policy that is to be converted.

The transfer selection panel 1702 may also include a destination account selection box 1710 through which an employee may determine a destination account for disbursement of student loan funds resulting from conversion of the employee's PTO. Through the PTO conversion service, such as during an onboarding process, an employee may provide student loan account information corresponding to the employee's student loan accounts. When the employee accesses the PTO conversion service to request conversion of its PTO for repayment of a student loan, the PTO conversion service may update the destination account selection box 1710 to indicate the one or more student loan accounts that the employee may designate as the destination for the repayment.

In an embodiment, the PTO conversion service also provides, via the transfer selection panel 1702, an option to add a new student loan account that can serve as the destination for the student loan repayment. If the employee selects this option, the PTO conversion service may update the interface 1700 to prompt the employee to provide account details for this new student loan account (e.g., student loan management company or bank name, student loan account number, etc.). Once the employee has supplied these account details, the PTO conversion service may update the destination account selection box 1710 to provide the new student loan account as a selectable destination for the student loan repayment.

Similar to the current PTO balance panel 1504 and 1604 described above in connection with FIGS. 15 and 16, respectively, the interface 1700 may include a current PTO balance panel 1704, through which the PTO conversion service may present, to the employee, the employee's current PTO balances among different PTO policies (e.g., vacation, sick leave, etc.). Further, via the current PTO balance panel 1704, the PTO conversion service may also provide an employee's PTO transaction history corresponding to prior conversions of PTO for student loan repayment.

The interface 1700 may further include a transaction panel 1706 to provide the employee with the final amount that is to be used for repayment of a student loan. The transaction panel 1706 may specify the subtotal cash amount of the PTO that is to be converted before taxes and other fees are assessed. Further, the transaction panel 1706 may specify the estimated arrival time for the transfer (e.g., the amount of time for a payment to be made to the designated student loan account). Additionally, the transaction panel 1706 may specify any taxes and fees to be incurred for the transaction. Based on the subtotal and taxes/fees assessed, the PTO conversion service may present, via the transaction panel 1706, the final payment amount that is to be transferred to the designated student loan account. The employee may review the transfer summary specified in the transaction panel 1706 and select a transfer now button 1714 to cause the PTO conversion service to initiate conversion of the selected PTO amount to cash and transfer this cash as a payment to the designated student loan account.

In an embodiment, prior to submitting the payment amount to the employee's designated student loan account, the PTO conversion service determines whether the conversion of PTO for the payment of a student loan requires employer approval and/or whether an applicable rule or policy needs to be evaluated. The process of obtaining employer approval and evaluating any applicable policies associated with the employee and/or student loan payments using PTO conversions is described in greater detail above in connection with FIG. 4. If employer approval is not required, or the employer has indicated that the PTO conversion is approved, the PTO conversion service may convert the amount of PTO as specified by the employee to cash and deposit this cash as a payment to the employee's designated student loan account, as described above.

Figure 18:
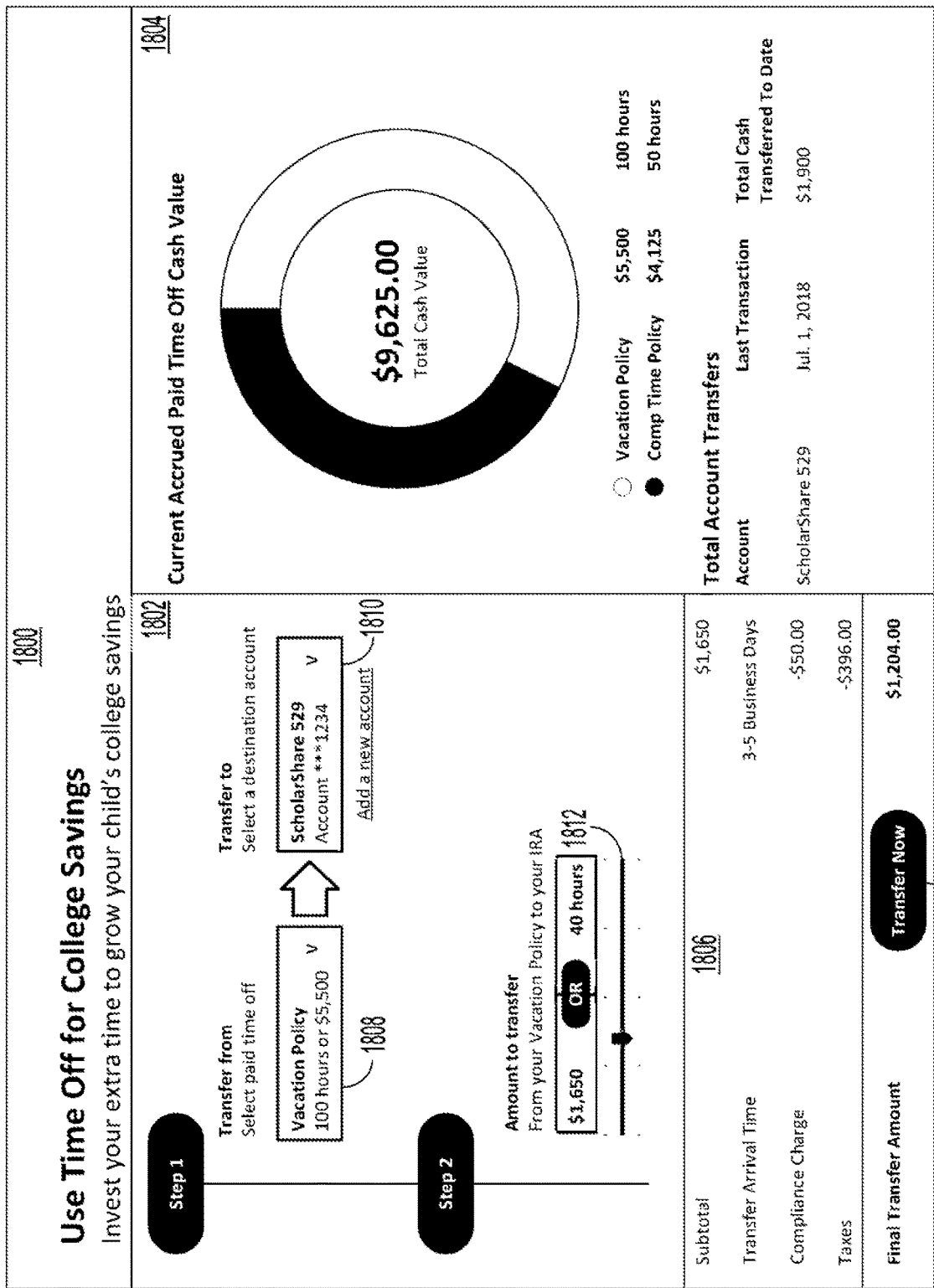
FIG. 18 shows an illustrative example of an interface through which an employee can submit a request to repurpose paid time off for investment of an equivalent cash value into one or more college savings accounts according to some embodiments.

FIG. 18 shows an illustrative example of an interface 1800 through which an employee can submit a request to repurpose paid time off for investment of an equivalent cash value into one or more college savings accounts according to some embodiments. The interface 1800 may include similar elements to those described and illustrated in connection with the interfaces corresponding to FIGS. 15-17. For instance, the interface 1800 may include a transfer selection panel 1802. The transfer selection panel 1802 may include a PTO balance selection box 1808, through which an employee may determine the type of PTO that is to be converted, and a PTO balance selection slider 1812, through which an employee may select the amount of PTO from the selected policy that is to be converted.

The transfer selection panel 1802 may also include a destination account selection box 1810 through which an employee may select a college savings plan or other educational savings account. Through the PTO conversion service, such as during an onboarding process, an employee may provide account information corresponding to the employee's college savings plan or other educational savings accounts. When the employee accesses the PTO conversion service to request conversion of its PTO for investment into a particular college savings plan account or other educational savings account, the PTO conversion service may update the destination account selection box 1810 to indicate the one or more college savings plan or other educational savings accounts that the employee may designate as the destination for the cash resulting from PTO conversion.

Similar to the current PTO balance panels described above in connection with FIGS. 15-17, the interface 1800 may include a current PTO balance panel 1804, through which the PTO conversion service may present, to the employee, the employee's current PTO balances among different PTO policies (e.g., vacation, sick leave, etc.). Further, via the current PTO balance panel 1804, the PTO conversion service may also provide an employee's PTO transaction history corresponding to prior conversions of PTO for investment into one or more college savings plan or other educational savings accounts.

The interface 1800 may further include a transaction panel 1806 to provide the employee with the final amount that is to be invested in the designated college savings plan or other educational savings account. The transaction panel 1806 may specify the subtotal cash amount of the PTO that is to be converted before taxes and other fees are assessed. Further, the transaction panel 1806 may specify the estimated arrival time for the transfer (e.g., the amount of time for a deposit to be made to the designated college savings plan or other educational savings account). Additionally, the transaction panel 1806 may specify any taxes and fees to be incurred for the transaction. Based on the subtotal and taxes/fees assessed, the PTO conversion service may present, via the transaction panel 1806, the final payment amount that is to be transferred to the designated college savings plan or other educational savings account. The employee may review the transfer summary specified in the transaction panel 1806 and select a transfer now button 1814 to cause the PTO conversion service to initiate conversion of the selected PTO amount to cash and transfer this cash as a deposit to the designated college savings plan or other educational savings account.

In an embodiment, prior to submitting the payment amount to the employee's designated college savings plan or other educational savings account, the PTO conversion service determines whether the conversion of PTO for investment into a college savings plan or other educational savings account requires employer approval and/or whether an applicable rule or policy needs to be evaluated. The process of obtaining employer approval and evaluating any applicable policies associated with the employee and/or college savings plan or other educational savings investments using PTO conversions is described in greater detail above in connection with FIG. 4. If employer approval is not required, or the employer has indicated that the PTO conversion is approved, the PTO conversion service may convert the amount of PTO as specified by the employee to cash and deposit this cash into the employee's designated college savings plan or other educational savings account, as described above.

Figure 19:
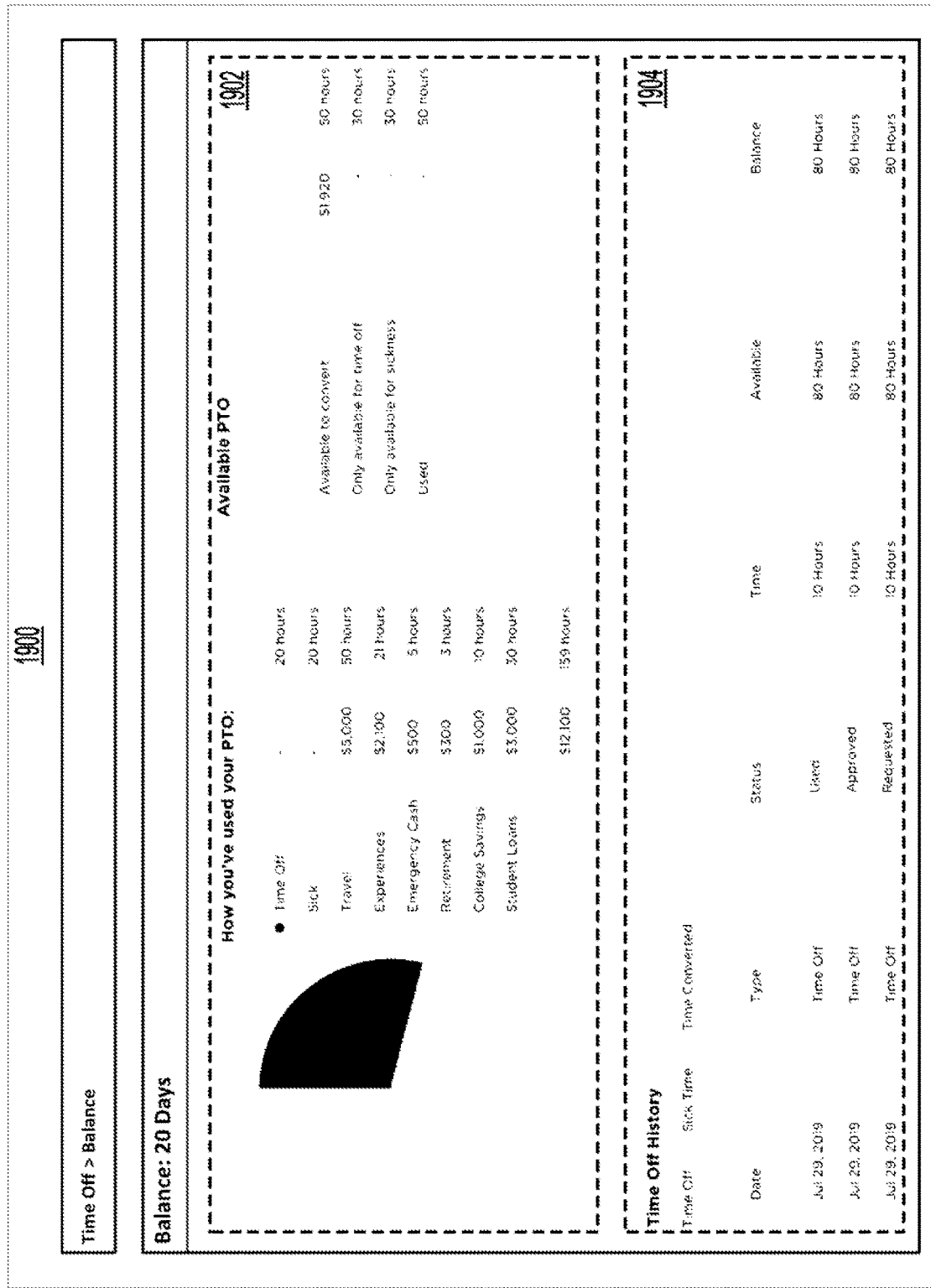
FIG. 19 shows an illustrative example of an interface through which an employee can review their PTO balances and usage history according to some embodiments.

FIG. 19 shows an illustrative example of an interface 1900 through which an employee can review their PTO balances and usage history according to some embodiments. The PTO conversion service, via the interface 1900, may provide an employee with their available PTO balance. For example, the PTO conversion service may provide an employee with an accounting of their accrued PTO and any other PTO that may be available to the employee for use (e.g., PTO that can be used by the employee under other PTO policies, such as unlimited PTO policies). As an illustrative example, if an employer implements a traditional PTO policy, whereby PTO is accrued or made available within different PTO categories, the PTO conversion service may provide, via the interface 1900, an employee's PTO balance for each of these PTO categories. For instance, if an employer maintains a traditional PTO policy, the PTO conversion service may indicate the amount of PTO available to the employee for sick leave, for vacation, for military leave, for family leave, for personal leave, and the like. As another illustrative example, if an employer maintains a bank PTO policy whereby PTO is made available within a single category (e.g., a PTO bank) that may be used by the employee as needed, the PTO conversion service may present, via the interface 1900, the employee's overall PTO balance.

In an embodiment, the PTO conversion service, via a PTO usage section 1902 of the interface 1900, provides an employee with a breakdown of PTO usage over a period of time. PTO usage may include conversions of PTO for another purpose and actual PTO usage subject to the employer's PTO policy. For example, via the PTO usage section 1902, an employee may readily determine how it has utilized its available PTO for various purposes, as well as the monetary value of the PTO used in total and for each purpose. As an illustrative example, the employee may be presented with the amount of PTO used for time off, for sick leave, as well as the amount of PTO repurposed for other purposes, such as travel, experiences, fast cash, retirement, college savings plans, student loans, and the like.

Through the PTO usage section 1902, the employee may also be provided with a breakdown of the employee's available PTO balances. For instance, an employee may be provided with an amount of PTO available that can be converted for another purpose. Further, the PTO conversion service may indicate how much PTO is available for taking time off, for sick leave, and the like. In some instances, the PTO conversion service may also indicate how much PTO has been used over a period of time. It should be noted that the breakdown of available PTO may be configured based on the PTO policy implemented by the employer and the conversion rules defined by the employer, as described above. For instance, if the employer maintains a traditional PTO policy, the PTO conversion service may provide a breakdown of available PTO for each PTO category, whereas if the employer maintains a bank PTO policy, the PTO conversion service may provide a basic breakdown of available PTO and the amount of this available PTO that can be used for conversions. In some instances, if an employer maintains an unlimited PTO policy, whereby an employee can use as much PTO as desired (subject to employer approval), the PTO conversion service may forego providing the employee with their available PTO balance and instead provide the employee with a breakdown of PTO that may be available for conversion, as defined by the employer via custom rules and policies.

The PTO conversion service, via a historical usage section 1904 of the interface 1900, may also provide an employee with their PTO usage history over a particular period of time. Through the historical usage section 1904, an employee may evaluate previously submitted requests for PTO usage (e.g., for actual time off, sick leave, conversions, etc.). For each previously submitted request, an employee may determine the status of the request, the amount of PTO requested for use or conversion, the amount of PTO available at the time of the request, and the employee's PTO balance at the time of the request. This may allow the employee to readily identify its PTO usage for different purposes, as well as how requests to utilize their PTO have been processed by the PTO conversion service and/or its employer.

Detailed Processes

Figure 20A:
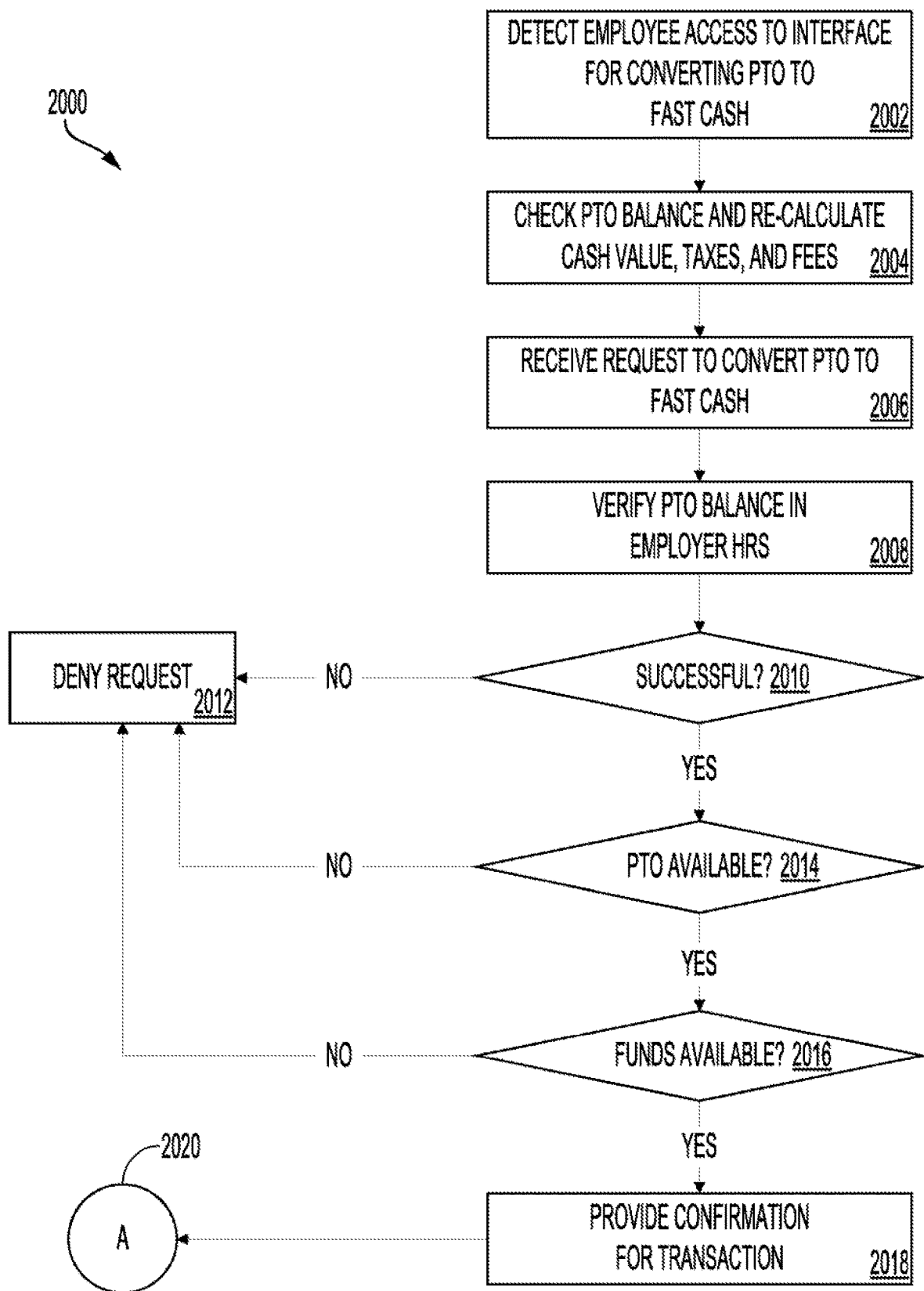
FIGS. 20A-20B show an illustrative example of a flow diagram for a method for processing a request to convert PTO into fast cash according to some embodiments.
Figure 20B:
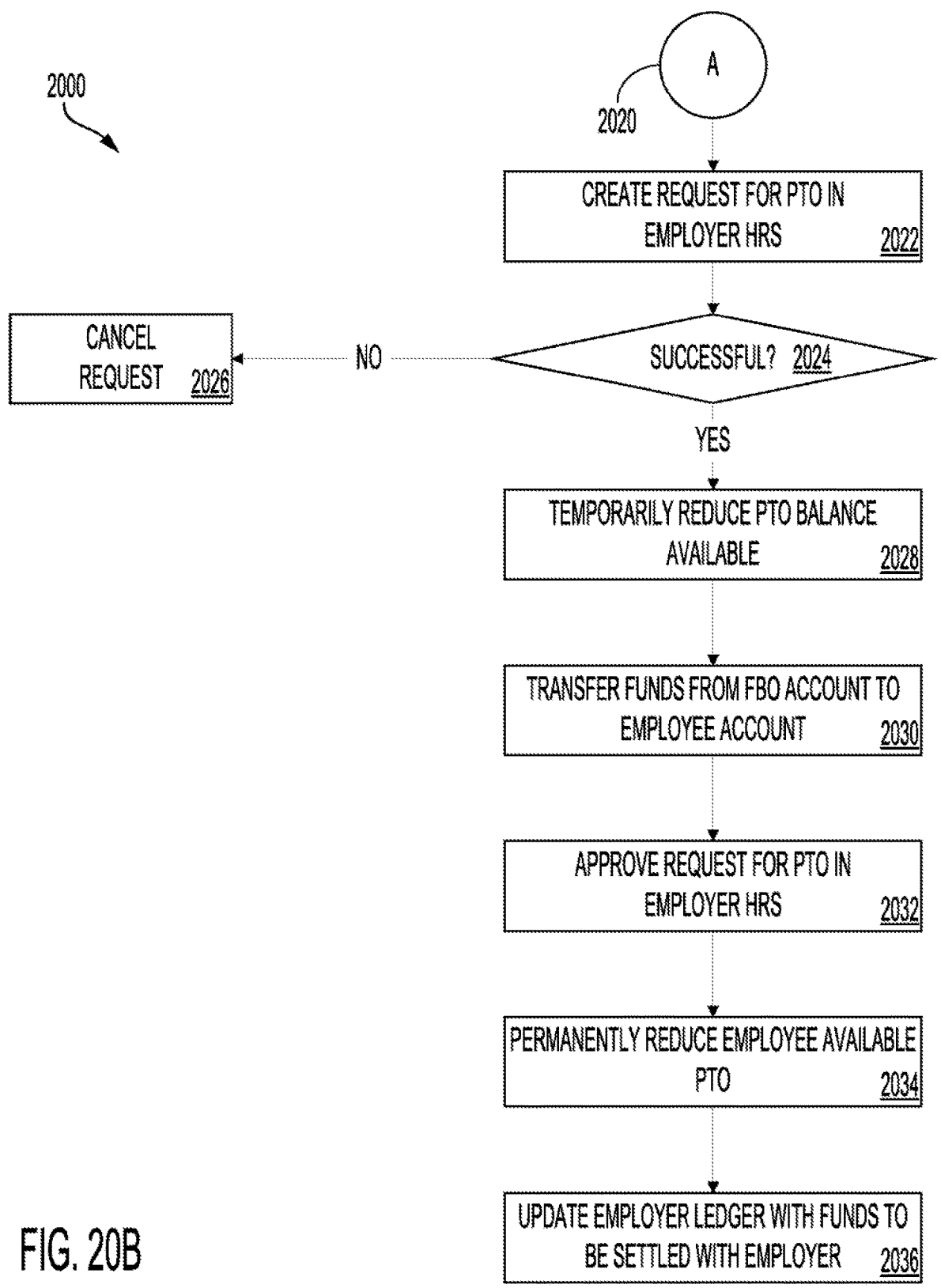

FIGS. 20A-20B show an illustrative example of a flow diagram for a method 2000 for processing a request to convert PTO into fast cash according to some embodiments. The process 2000 may be performed by the PTO conversion service in conjunction with a human resources system (HRS) (e.g., human resources information system (HRIS), human resource management systems (HRMS), human capital management system (HCMS), etc.) or an FIRS provider utilized by an employer. As discussed previously, any suitable connected software and/or device may be used by the employee to request conversion of paid time off, and conversion is not limited to a website or mobile application implemented by the PTO conversion service. In addition, a combination of several software and/or device components may be used to facilitate a single conversion request or multiple conversion requests. Further, the PTO conversion service may perform the process 2000 in conjunction with a router and processor to coordinate transfer of funds from an employer's for-the-benefit-of (FBO) account, through an employee's passthrough account, to an employee's designated payment account (e.g., bank account, etc.).

In an embodiment, the PTO conversion service can implement, for different employers and organizations, different funding models for PTO conversions. For example, the PTO conversion service may implement a self-funded model, whereby an employer or organization may be required to fund an FBO account that the PTO conversion service is granted access to in order to support PTO conversions. Through the self-funded model, an employer or organization may be required to deposit money into a designated FBO account. Funds from this FBO account may be transferred to an employee passthrough account for use in funding PTO conversions. For example, if an employee submits a request to convert available PTO into a monetary amount that is to be deposited into the employee's bank account in the form of fast cash, the PTO conversion service may access the employer's FBO account to ensure that the requested monetary amount is available for processing of the employee's request. Through the self-funded model, the employer may be required to maintain at least a minimum amount within the designated FBO account. If the amount in the designated FBO account falls below a threshold amount (e.g., a minimum amount), the PTO conversion service may request the employer to deposit an additional amount to the designated FBO account. Alternatively, the PTO conversion service may obtain funds from the employer's operating account and automatically deposit the requisite funds into the designated FBO account.

As another example, the PTO conversion service may implement a service-funded model, whereby the PTO conversion service itself, or a funding partner associated with the PTO conversion service, funds transactions on behalf of an employer or organization and submits an invoice to the employer of organization for reimbursement of these funds. In this particular model, the PTO conversion service or associated funding partner may fund the employer's FBO account directly and draw from this FBO account to support PTO conversions, as described herein. The PTO conversion service may track each withdrawal of funds from the FBO account in a transaction log that is provided to the employer or organization, for example, in the form of an invoice. The employer or organization may be required to provide reimbursement for each of these transactions, as indicated, for example, in the invoice. This may allow an employer or organization to perform transactions outside of traditional pay periods and allows the employer or organization to streamline the payment process for PTO conversions.

At step 2002, the PTO conversion service detects employee access to an interface for converting available PTO to fast cash. For instance, as noted above, the PTO conversion service, via an interface (e.g., interface 1500 described above in connection with FIG. 15), may provide an employee with various options for requesting an emergency or fast cash conversion of its PTO for deposit into an employee's banking or credit union account (e.g., checking, savings, etc.). For example, as illustrated in FIG. 15, the PTO conversion service may provide one or more panels, through which an employee may determine how much PTO to convert to obtain a cash payment and to specify a delivery destination for this cash payment.

At step 2004, the PTO conversion service may check the employee's available PTO balance and re-calculate the cash value of the employee's available PTO balance. Further, as the employee interacts with the interface to determine the amount of PTO that is to be converted, the PTO conversion service may calculate any applicable taxes and fees for the conversion. In an embodiment, the PTO conversion service locally maintains employee data from an employer HRS or from an HRS provider utilized by the employer. The employee data may specify the amount of PTO available to the employee, employee salary information, any applicable conversion policies (e.g., conversion limits, etc.), and the like. This employee data may be obtained from the employer HRS of from an HRS provider utilized by the employer at different intervals (e.g., each day, each week, etc.). Further, to calculate any applicable taxes and fees for PTO conversions, the PTO conversion service may obtain tax and fee data from an employer's FIRS or payroll system. Thus, as the employee utilizes the interface to determine how much PTO to convert into fast cash, the PTO conversion service may utilize employee data, as well as tax and fee data, to dynamically calculate the total amount of fast cash that can be obtained based on the amount of PTO selected by the employee.

At step 2006, the PTO conversion service receives a request from the employee to convert a particular amount of PTO into fast cash. The request may specify the amount of PTO that is to be converted to fast cash, as well as information corresponding to an account or other method of delivery for the fast cash. In response to the request, the PTO conversion service may attempt to verify, at step 2008, the employee's available PTO balance in the employer's FIRS or from an HRS provider utilized by the employer. For instance, the PTO conversion service may transmit an application programming interface (API) call to the employer's FIRS or to the employer's HRS provider to determine the amount of PTO available to the employee. At step 2010, the PTO conversion service may determine whether the attempt to verify the employee's PTO balance was successful. If the attempt to verify the amount of available PTO for the employee is unsuccessful, the PTO conversion service may deny the employee's PTO conversion request at step 2012. It should be noted that, in some instances, the PTO conversion service may perform repeated attempts to verify the employee's PTO balance if an initial attempt is unsuccessful. For example, the PTO conversion service may define a maximum number of retry attempts for verifying the employee's available PTO balance. However, if the maximum number of retry attempts is reached without success, the PTO conversion service may deny the PTO conversion request.

At step 2014, if the PTO conversion service is able to verify the employee's PTO balance from the employer's HRS or from the employer's HRS provider, the PTO conversion service determines whether the employee has sufficient PTO available for fulfillment of the PTO conversion. For instance, if the amount of PTO selected by the employee is greater than the amount of PTO available to the employee for conversion to fast cash, the PTO conversion service may deny the employee's PTO conversion request at step 2012.

At step 2016, if the PTO conversion service determines that the employee has sufficient PTO available for the PTO conversion request, the PTO conversion service determines whether there are sufficient funds available for fulfillment of the PTO conversion request. For instance, in an embodiment, the PTO conversion service connects to a super router API to determine the employer's available FBO account balance. In response to this request, the super router may connect to a payment processor associated with the FBO account to determine the available balance within the employer's FBO account. The super router may provide this available balance to the PTO conversion service, which may determine whether the FBO account has sufficient funds to support the PTO conversion. In some instances, the super router may perform this evaluation on behalf of the PTO conversion service.

In an embodiment, if the PTO conversion service or super router determine that the FBO account does not have the available funds for the PTO conversion request, the PTO conversion service or super router determines whether there is another funding partner that can provide the required funds for the PTO conversion request. As noted above, if the PTO conversion service implements a service-funded model, the PTO conversion service may provide its own funding for PTO conversions on behalf of the employer. Thus, even if the employer's FBO account does not have the requisite funds for the PTO conversion request, under the service-funded model, the PTO conversion service (or other funding partner associated with the PTO conversion service) may provide the requisite funds and deposit these into the employer's FBO account.

If the PTO conversion service or super router determines that the requisite funds cannot be obtained from the employer's FBO account or from another funding partner, the PTO conversion service may deny the PTO conversion request at step 2012. However, if the PTO conversion service determines that funds from the employer's FBO account or from another funding partner can be used for the PTO conversion request, the PTO conversion service may, at step 2018, provide the employee with a confirmation for the transaction (e.g., PTO conversion). The confirmation may include a unique identifier for the PTO conversion request, which the employee may use to track the PTO conversion and determine when it has been fulfilled. In some instances, the transaction is further tagged as being "in progress."

Once the employee has been provided with a confirmation for the transaction, the method 2000 may continue to step 2020 where (as illustrated in FIG. 20B), at step 2022, the PTO conversion service may create a request for the corresponding PTO in the employer's HRS or the employer's HRS provider. For instance, the PTO conversion service may connect to an HRS employer data API to submit a request for the PTO from the employee's available PTO balance. At step 2024, the PTO conversion service determines whether the request was successfully received by the employer's HRS or the employer's HRS provider. If the submission of the request is unsuccessful, the PTO conversion service may cancel the employee's PTO conversion request at step 2026. It should be noted that, in some instances, the PTO conversion service may perform repeated attempts to submit the request for the PTO from the employee's available PTO balance if an initial attempt is unsuccessful. For example, the PTO conversion service may define a maximum number of retry attempts for submitting the request. However, if the maximum number of retry attempts is reached without success, the PTO conversion service may cancel the PTO conversion request. If the request is successfully received by the employer's FIRS or the employer's FIRS provider, the employee's available PTO balance is temporarily reduced at step 2028. This temporary reduction may be reflected within the employer's HRS and by the PTO conversion service.

At step 2030, the PTO conversion service may transfer funds from the employer's FBO account to an employee account (e.g., bank account, etc.), as indicated by the employee in its PTO conversion request. For instance, in an embodiment, the PTO conversion service connects to the super router API to trigger an OCT process. This may cause the super router to connect to the payment processor to initiate the OCT process. The payment processor may transfer funds from the employer's FBO account to an employee passthrough account created specifically to support OCT, RTP, automated clearing house (ACH), or any other forms of transfers that may facilitate rapid transfer of payments from the employee passthrough account to a designated account. From this employee passthrough account, the funds corresponding to the converted PTO are transferred to the employee's designated account. If this transfer is completed successfully, the payment processor may trigger an OCT success web hook and provide transaction details to the PTO conversion service.

In response to the OCT success web hook, the PTO conversion service may approve the request for PTO in the employer's HRS or the employer's HRS provider at step 2032. In an embodiment, if approval of the request for PTO is unsuccessful, the PTO conversion service may initiate human intervention with the employer's FIRS team to ensure that the request for PTO is approved in the employer's HRS or the employer's HRS provider. Once the request for PTO has been approved, the employer's HRS and the PTO conversion service may each permanently reduce the employee's available PTO at step 2034.

Once the PTO conversion to fast cash has been completed, the PTO conversion service may, at step 2036, update the employer's ledger to indicate any funds that are to be settled with the employer. For instance, if the service-funded model is utilized, the PTO conversion service may indicate that the employer is responsible for the amount of funds transferred to the employee, along with any applicable fees and taxes. In some instances, if the employer relies on the self-funded model, the ledger may be updated to indicate the amount withdrawn from the employer's FBO account and that may need to be replenished by the employer for future transactions. In an embodiment, the PTO conversion service provides the employer with a flat file or other document that details the various PTO conversions performed by the PTO conversion service on behalf of the employer over a period of time. Further, the PTO conversion service may provide the employer with an invoice for any amounts owed to the PTO conversion service or other funding partner for funds allocated for PTO conversions during a period of time. Alternatively, the PTO conversion service may provide the employer with these details via the PTO conversion service platform, such as through any of the interfaces described above in connection with FIGS. 10 and 11A-11G. This allows the employer to track PTO conversions and provide payments, as needed, to continue support for PTO conversions.

Figure 21A:
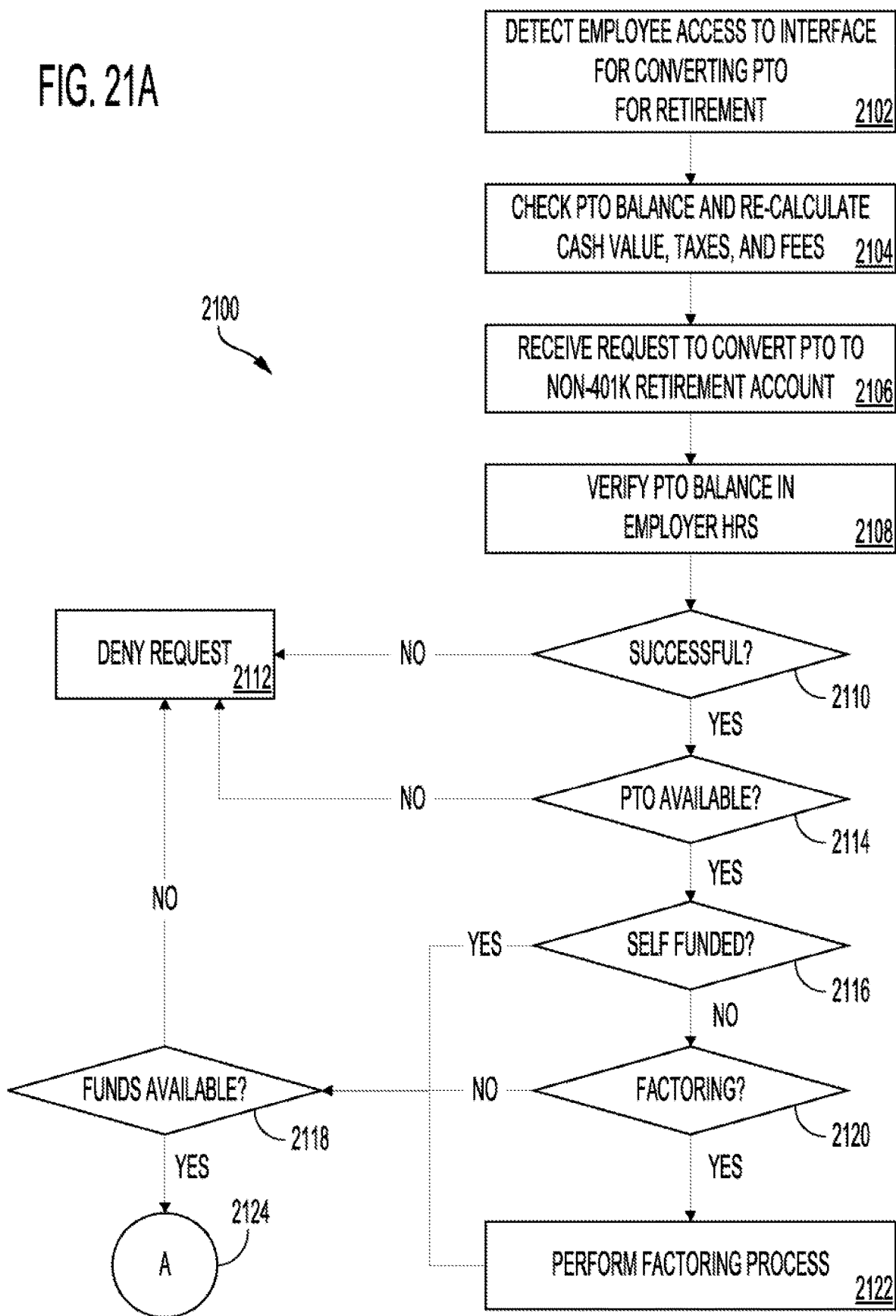
FIGS. 21A-21B show an illustrative example of a flow diagram for a method for processing a request to convert PTO for disbursement of an equivalent cash value into a non-401k retirement account according to some embodiments.
Figure 21B:
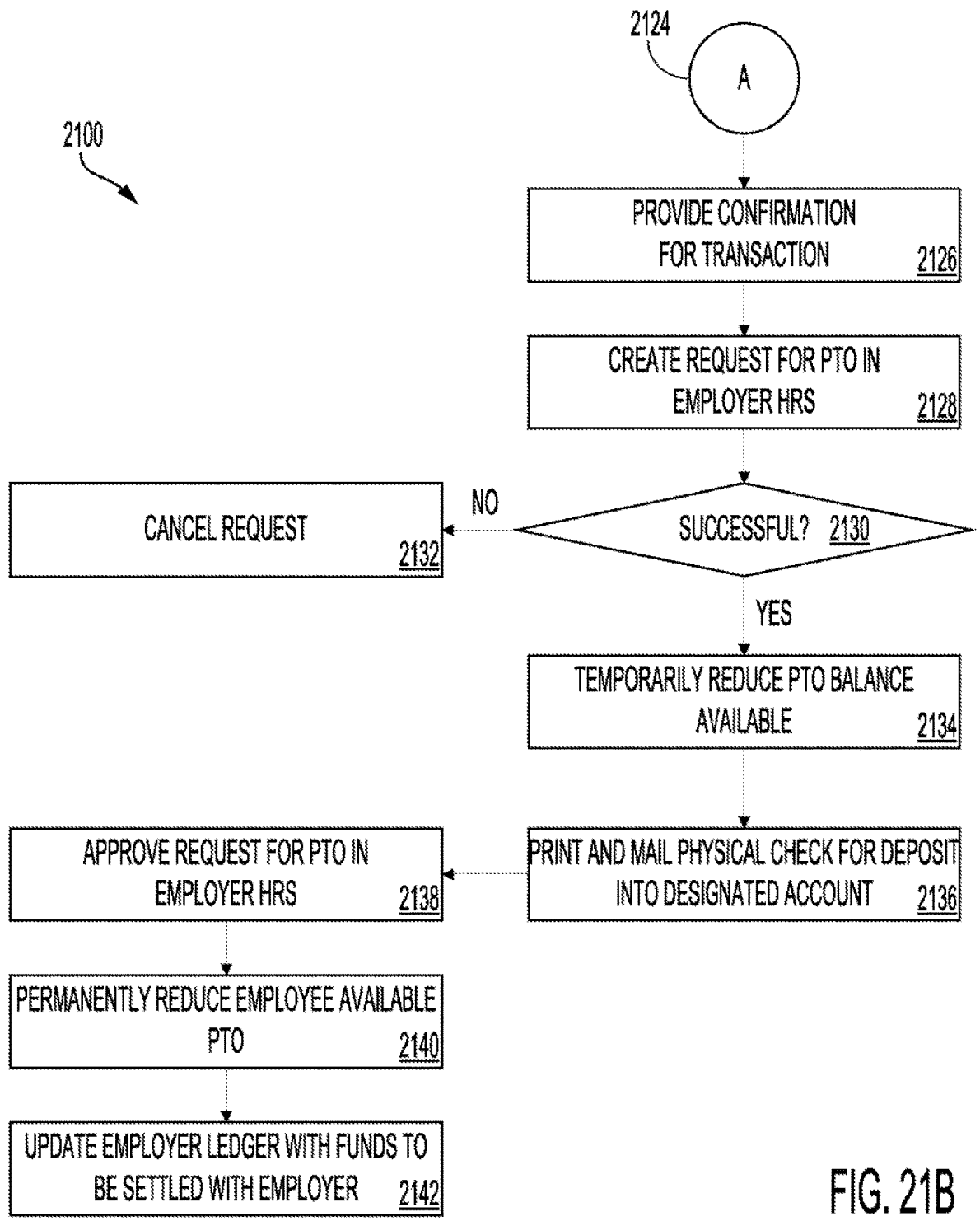

FIGS. 21A-21B show an illustrative example of a flow diagram for a method 2100 for processing a request to convert PTO for disbursement of an equivalent cash value into a non-401k retirement account according to some embodiments. The process 2100 may be performed by the PTO conversion service in conjunction with a human resources system (HRS) or an HRS provider utilized by an employer. As discussed previously, any suitable connected software and/or device may be used by the employee to request conversion of paid time off, and conversion is not limited to a website or mobile application implemented by the PTO conversion service. In addition, a combination of several software and/or device components may be used to facilitate a single conversion request or multiple conversion requests. Further, the PTO conversion service may perform the process 2100 in conjunction with a router and processor to coordinate use of funds from an employer's for-the-benefit-of (FBO) account for the creation of a physical instrument (e.g., physical check, etc.) that can be deposited into a non-401k retirement account.

The process 2100 may incorporate steps similar to those described above in connection with FIGS. 20A-20B. For instance, at step 2102, the PTO conversion service detects employee access to an interface for converting available PTO for investment into a retirement account. For instance, as noted above, the PTO conversion service, via an interface (e.g., interface 1600 described above in connection with FIG. 16), may provide an employee with various options for requesting conversion of its PTO for deposit into an employee's retirement account. For example, as illustrated in FIG. 16, the PTO conversion service may provide one or more panels, through which an employee may determine how much PTO to convert for deposit into a retirement account and specify a delivery retirement account for this deposit.

At step 2104, the PTO conversion service may check the employee's available PTO balance and re-calculate the cash value of the employee's available PTO balance. Further, as the employee interacts with the interface to determine the amount of PTO that is to be converted, the PTO conversion service may calculate any applicable taxes and fees for the conversion. As the employee utilizes the interface to determine how much PTO to convert for investment into a retirement account, the PTO conversion service may utilize employee data, as well as tax and fee data, to dynamically calculate the total amount of the deposit based on the amount of PTO selected by the employee.

At step 2106, the PTO conversion service receives a request from the employee to convert a particular amount of PTO for deposit of an equivalent monetary value into a non-401k retirement account. The request may specify the amount of PTO that is to be converted for deposit into a non-401k retirement account, as well as information corresponding to the non-401k retirement account. In response to the request, the PTO conversion service may attempt to verify, at step 2108, the employee's available PTO balance in the employer's FIRS or from an HRS provider utilized by the employer. At step 2110, the PTO conversion service may determine whether the attempt to verify the employee's PTO balance was successful. If the attempt to verify the amount of available PTO for the employee is unsuccessful, the PTO conversion service may deny the employee's PTO conversion request at step 2112. It should be noted that, in some instances, the PTO conversion service may perform repeated attempts to verify the employee's PTO balance if an initial attempt is unsuccessful. For example, the PTO conversion service may define a maximum number of retry attempts for verifying the employee's available PTO balance. However, if the maximum number of retry attempts is reached without success, the PTO conversion service may deny the PTO conversion request.

At step 2114, if the PTO conversion service is able to verify the employee's PTO balance from the employer's HRS or from the employer's HRS provider, the PTO conversion service determines whether the employee has sufficient PTO available for fulfillment of the PTO conversion. For instance, if the amount of PTO selected by the employee is greater than the amount of PTO available to the employee for conversion and use for retirement, the PTO conversion service may deny the employee's PTO conversion request at step 2112.

At step 2116, the PTO conversion service determines whether the employer utilizes a self-funded model for maintenance of its FBO account. As described above, under the self-funded model, an employer may be responsible for funding an FBO account from which funds may be used to support and fund employee PTO conversions. If the PTO conversion service determines that the employer is required to maintain its FBO account under the self-funded model, the PTO conversion service, at step 2118, whether there are sufficient funds in the employer's FBO account for the PTO conversion request. For instance, in an embodiment, the PTO conversion service connects to a super router API to determine the employer's available FBO account balance. In response to this request, the super router may connect to a payment processor associated with the FBO account to determine the available balance within the employer's FBO account. The super router may provide this available balance to the PTO conversion service, which may determine whether the FBO account has sufficient funds to support the PTO conversion. In some instances, the super router may perform this evaluation on behalf of the PTO conversion service. If the PTO conversion service or super router determine that the employer's FBO account does not have sufficient funds for fulfillment of the PTO conversion request, the PTO conversion service may deny the PTO conversion request at step 2112.

In an embodiment, if the PTO conversion service determines that the FBO account is not maintained using the self-funded model, the PTO conversion service, at step 2120, determines whether factoring is used for maintenance of the employer's FBO account. Factoring, as defined herein, is a financial transaction in which the employer provides its accounts receivable (e.g., invoices) to a third party, or factor, to obtain an advance on funds. If the PTO conversion service determines that factoring is not relied upon for maintenance of the employer's FBO account, the PTO conversion service may determine, at step 2118, whether there are funds available through other sources (e.g., service-funded model, etc.) for the FBO account. If such funding is unavailable, the PTO conversion service may deny the PTO conversion request at step 2112.

If the PTO conversion service determines that factoring is to be used for maintenance of the employer's FBO account, the PTO conversion service may perform a factoring process, at step 2122, to obtain funds that can be deposited into the employer's FBO account for the transaction. For instance, under the factoring process, the PTO conversion service may tag the transaction as being in progress and provide the employee with a transaction confirmation number. This confirmation number may be used to track the progress of the PTO conversion request submitted by the employee via the PTO conversion service. The PTO conversion service may submit an invoice to the factor or to an API associated with the factor that can be used to obtain the requisite funds from the factor. In some instances, the PTO conversion service may wait an amount of time prior to submitting this invoice to the factor or API. This may allow the PTO conversion service to aggregate multiple requests into a single invoice.

If the invoice submitted by the PTO conversion service to the factor or API associated with the factor is rejected by the factor, the PTO conversion service may deny the PTO conversion request at step 2112. However, if the invoice is approved, the factor may transmit the corresponding funds to the employer's FBO account. In an embodiment, the PTO conversion service waits a pre-defined period of time to ensure that the funds have been successfully deposited into the employer's FBO account. Once the funds have been successfully deposited into the employer's FBO account, the PTO conversion service determines, at step 2118, whether the employer's FBO account has the requisite funds to support the PTO conversion request, as described above.

If the PTO conversion service determines that the employer's FBO account has the requisite funds available to fund the PTO conversion request, the process 2100 may continue to step 2124 where (as illustrated in FIG. 21B), at step 2126, the PTO conversion service may provide the employee with a confirmation notification for the transaction. The confirmation may include a unique identifier for the PTO conversion request, which the employee may use to track the PTO conversion and determine when it has been fulfilled. In some instances, the transaction is further tagged as being "in progress."

At step 2128, the PTO conversion service may create a request for the corresponding PTO in the employer's HRS or the employer's HRS provider. At step 2130, the PTO conversion service determines whether the request was successfully received by the employer's FIRS or the employer's FIRS provider. If the submission of the request is unsuccessful, the PTO conversion service may cancel the employee's PTO conversion request at step 2132. It should be noted that, in some instances, the PTO conversion service may perform repeated attempts to submit the request for the PTO from the employee's available PTO balance if an initial attempt is unsuccessful. However, if a maximum number of retry attempts is reached without success, the PTO conversion service may cancel the PTO conversion request. If the request is successfully received by the employer's FIRS or the employer's FIRS provider, the employee's available PTO balance is temporarily reduced at step 2134.

At step 2136, the PTO conversion service connects to the super router API to trigger a check printing process, whereby a physical check is printed and mailed for deposit into the retirement account designed by the employee in its PTO conversion request. The super router, on behalf of the PTO conversion service, submits a request to a check printer to generate a new physical check in the amount corresponding to the amount of PTO converted for deposit into the employee's retirement account. If the check is successfully printed, the PTO conversion service may notify the employee to indicate that the check has been printed. For instance, if the employee uses its confirmation number to verify the status of its PTO conversion request, the PTO conversion service may indicate that the check has been successfully printed. Further, once the check has been printed, the check printer may mail the physical check to a financial institution or other entity associated with the employee's designated account. If the check is deposited into the employee's retirement account, the payment processor may transmit a notification, via web hook, to the PTO conversion service to indicate that the check has been deposited successfully. In some instances, if the check printer is unable to print or mail the check for deposit into the designated retirement account, the PTO conversion service may cancel the PTO conversion request.

Once the check has been deposited into the employee's non-401k retirement account, the PTO conversion service may, at step 2138, approve the request for PTO in the employer's FIRS or employer's HRS provider. If approval of the request for PTO is unsuccessful, the PTO conversion service may initiate human intervention with the employer's FIRS team to ensure that the request for PTO is approved in the employer's HRS or the employer's HRS provider. Once the request for PTO has been approved, the employer's HRS and the PTO conversion service may each permanently reduce the employee's available PTO at step 2140. Further, the PTO conversion service may, at step 2142, update the employer's ledger to indicate any funds that are to be settled with the employer. For instance, if the service-funded model is utilized, the PTO conversion service may indicate that the employer is responsible for the amount of funds transferred to the employee, along with any applicable fees. The PTO conversion service may provide the employer with a flat file or other document that details the various PTO conversions performed by the PTO conversion service on behalf of the employer over a period of time. Further, the PTO conversion service may provide the employer with an invoice for any amounts owed to the PTO conversion service or other funding partner for funds allocated for PTO conversions during a period of time.

Figure 22:
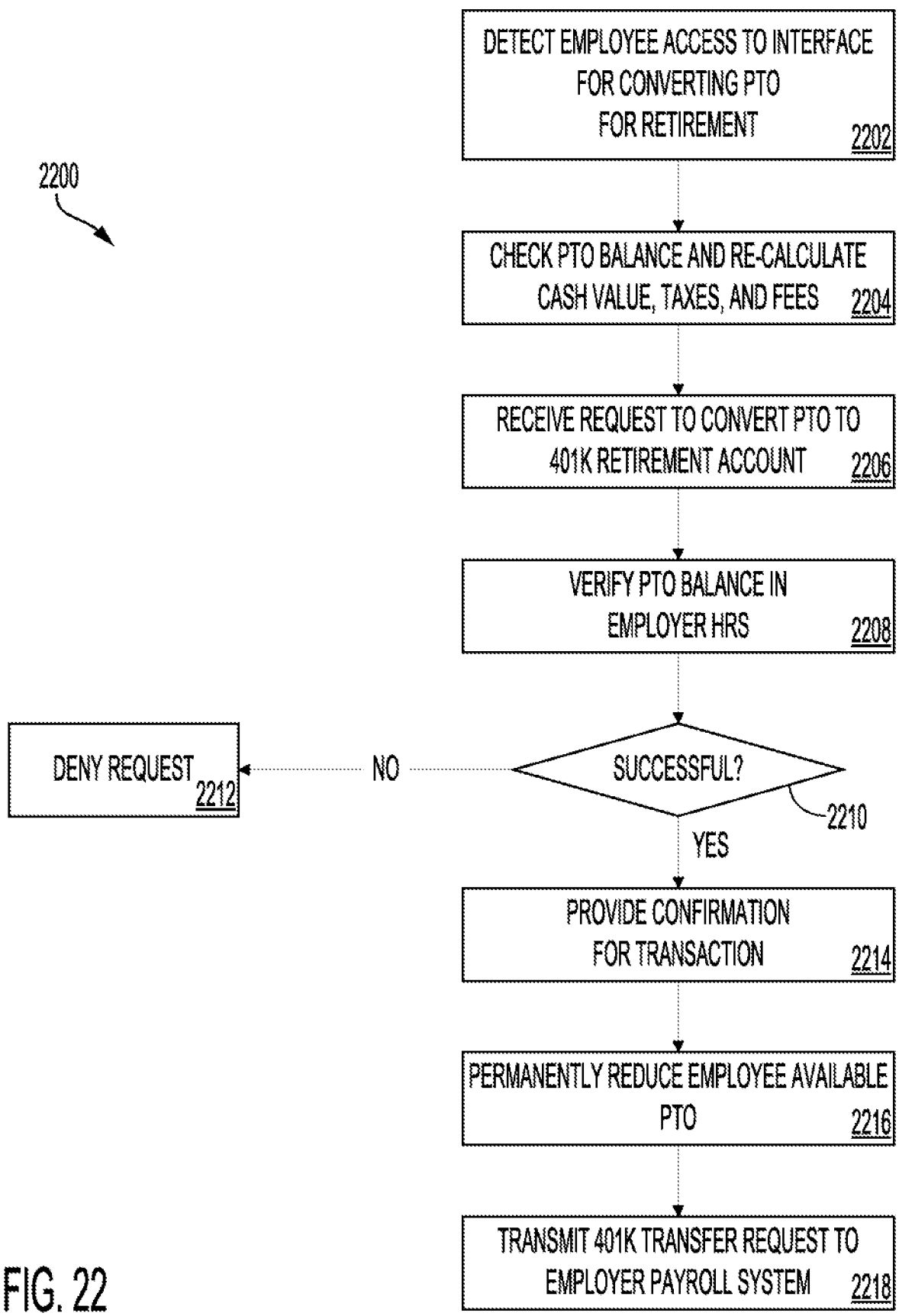
FIG. 22 shows an illustrative example of a flow diagram for a method for processing a request to convert PTO for disbursement of an equivalent cash value into a 401k retirement account according to some embodiments.

FIG. 22 shows an illustrative example of a flow diagram for a method 2200 for processing a request to convert PTO for disbursement of an equivalent cash value into a 401k retirement account according to some embodiments. The process 2200 may be performed by the PTO conversion service in conjunction with an employer's HRS or an HRS provider utilized by an employer. As discussed previously, any suitable connected software and/or device may be used by the employee to request conversion of paid time off, and conversion is not limited to a website or mobile application implemented by the PTO conversion service. In addition, a combination of several software and/or device components may be used to facilitate a single conversion request or multiple conversion requests.

The process 2200 may incorporate steps similar to those described above in connection with FIGS. 21A-21B. For instance, at step 2202, the PTO conversion service detects employee access to an interface for converting available PTO for investment into a retirement account. For instance, as noted above, the PTO conversion service, via an interface (e.g., interface 1600 described above in connection with FIG. 16), may provide an employee with various options for requesting conversion of its PTO for deposit into an employee's retirement account. For example, as illustrated in FIG. 16, the PTO conversion service may provide one or more panels, through which an employee may determine how much PTO to convert for deposit into a retirement account and specify a delivery retirement account for this deposit.

At step 2204, the PTO conversion service may check the employee's available PTO balance and re-calculate the cash value of the employee's available PTO balance. Further, as the employee interacts with the interface to determine the amount of PTO that is to be converted, the PTO conversion service may calculate any applicable taxes and fees for the conversion. As the employee utilizes the interface to determine how much PTO to convert for investment into a retirement account, the PTO conversion service may utilize employee data, as well as tax and fee data, to dynamically calculate the total amount of the deposit based on the amount of PTO selected by the employee.

At step 2206, the PTO conversion service receives a request from the employee to convert a particular amount of PTO for deposit of an equivalent monetary value into a 401k retirement account. The request may specify the amount of PTO that is to be converted for deposit into a 401k retirement account, as well as information corresponding to the 401k retirement account. In response to the request, the PTO conversion service may attempt to verify, at step 2208, the employee's available PTO balance in the employer's HRS or from an HRS provider utilized by the employer. At step 2210, the PTO conversion service may determine whether the attempt to verify the employee's PTO balance was successful. If the attempt to verify the amount of available PTO for the employee is unsuccessful, the PTO conversion service may deny the employee's PTO conversion request at step 2212.

If the PTO conversion service determines that the employee has sufficient PTO available for the conversion to the employee's 401k retirement account, the PTO conversion service may, at step 2214, provide the employee with a confirmation for the transaction (e.g., PTO conversion). The confirmation may include a unique identifier for the PTO conversion request, which the employee may use to track the PTO conversion and determine when it has been fulfilled. Further, the employer's HRS and the PTO conversion service may each permanently reduce the employee's available PTO step 2216.

At step 2218, the PTO conversion service may transmit a 401k transfer request to the employer's payroll system. For instance, the PTO conversion service may transmit a notification to the employer's payroll system that includes a flat file or other document with the various PTO conversion requests for deposit into employee 401k accounts. This flat file or other document may be provided before a payroll date in order to enable the payroll system to provide the requisite funding into each employee 401k account specified in the flat file or other document provided by the PTO conversion service on the payroll date. In an embodiment, this step is automated such that the PTO conversion service automatically reports the 401k transfer request to the employer's HRS or HRS provider.

Figure 23A:
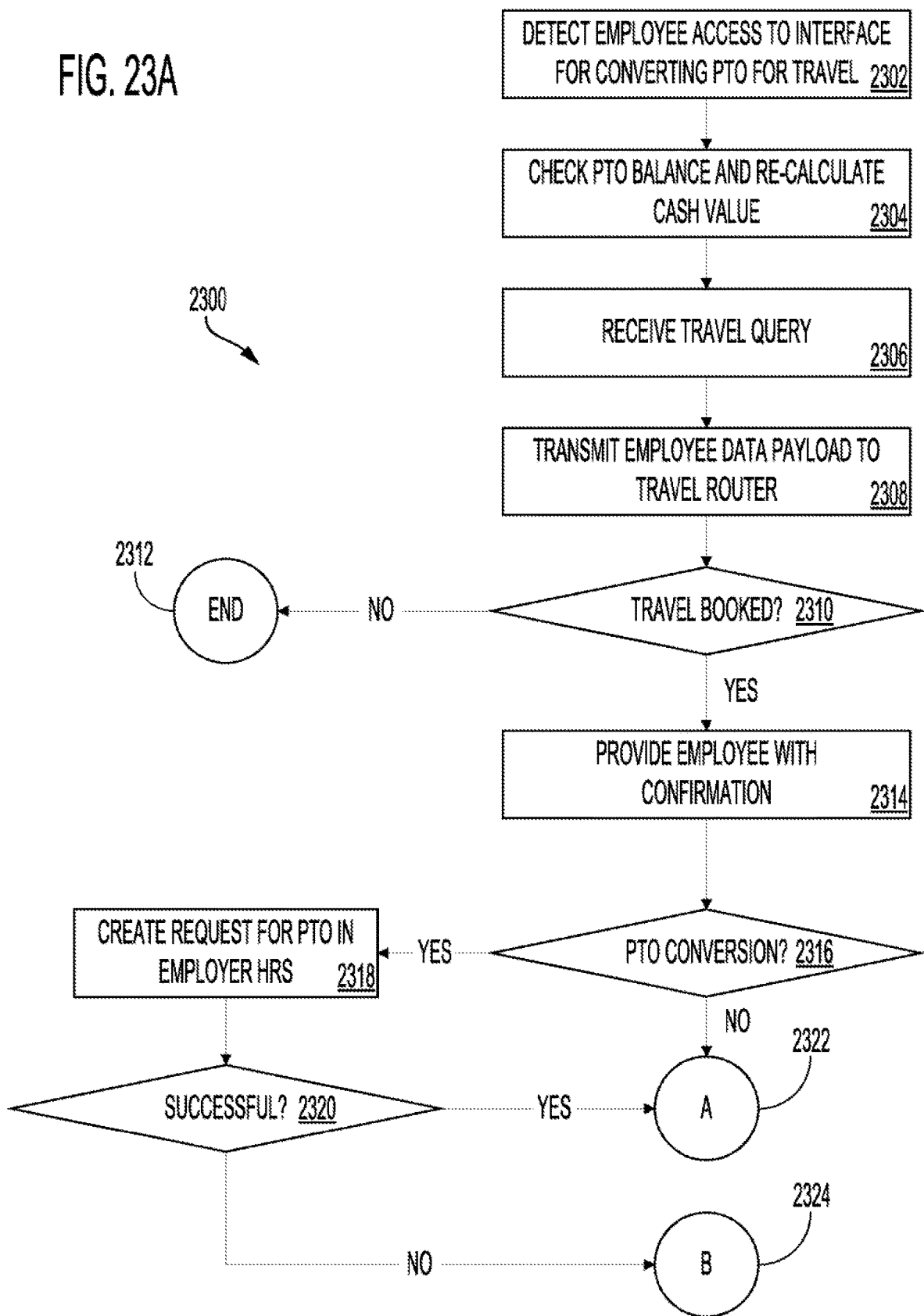
FIG. 23A-23B show an illustrative example of a flow diagram for a method for processing a request to book travel and/or experiences using PTO or other purchase method according to some embodiments.
Figure 23B:
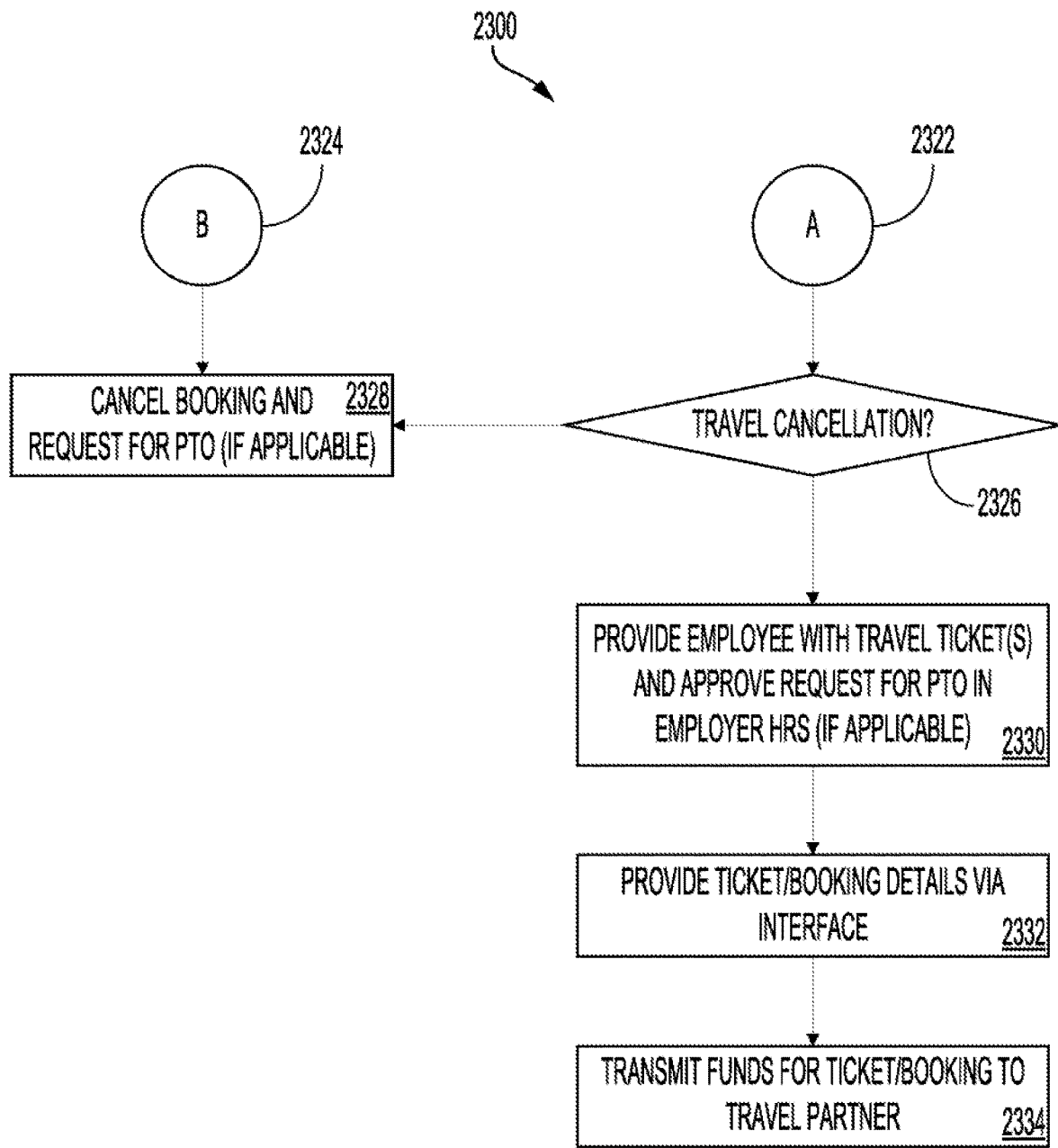

FIGS. 23A-23B show an illustrative example of a flow diagram for a method 2300 for processing a request to book travel and/or experiences using PTO or other purchase method according to some embodiments. The process 2300 may be performed by the PTO conversion service in conjunction with a human resources system (HRS) or an HRS provider utilized by an employer. As discussed previously, any suitable connected software and/or device may be used by the employee to request conversion of paid time off, and conversion is not limited to a website or mobile application implemented by the PTO conversion service. In addition, a combination of several software and/or device components may be used to facilitate a single conversion request or multiple conversion requests. Further, the PTO conversion service may perform the process 2300 in conjunction with a travel router and travel partner to provide various travel/experience options and to coordinate use of funds for travel and/or experience-related purchases.

The process 2300 may incorporate steps similar to those described above in connection with FIG. 22. For instance, at step 2302, the PTO conversion service detects employee access to an interface for converting available PTO for travel or experience-related purchases. For instance, as noted above, the PTO conversion service, via an interface (e.g., interfaces 1300 and 1400 described above in connection with FIGS. 13 and 14, respectively), may provide an employee with various options for requesting conversion of its PTO for travel or experience-related purposes. For example, as illustrated in FIG. 13, the PTO conversion service may provide an interface, through which an employee may select a particular travel option and submit a request to convert a particular amount of PTO for payment of the travel option. Similarly, as illustrated in FIG. 14, the PTO conversion service may provide an interface, through an employee may select a particular experience option and submit a request to convert a particular amount of PTO for payment of the experience option. In some embodiments, the PTO conversion service allows the employee to utilize or combine payment methods in addition to, or as an alternative to, PTO conversions to fund a particular travel option and/or experience option. In some instances, the PTO conversion service may further allow an employee to select a set of dates for which PTO is to be taken for the travel and/or experience option.

At step 2304, the PTO conversion service may check the employee's available PTO balance and re-calculate the cash value of the employee's available PTO balance. The PTO conversion service may update the interface utilized by the employee to indicate the cash value of the employee's available PTO balance that can be used for the purchase of travel and/or experience-related options.

At step 2306, the PTO conversion service may receive a travel or experience query from the employee via the interface. As noted above, the PTO conversion service provides, via an interface, various query options that may be used by an employee to submit a query for available travel and/or experience options that may be purchased using their available PTO and/or other payment methods. For example, via the interface, an employee may be presented with one or more options to search for flights, cruises, hotels, rental cars, experiences, and the like. Further, an employee may be presented with options to indicate its departure location, destination location, departure date, return date, and the like. For particular options, the employee may also be presented with additional options that may be used in a query. For instance, if an employee has selected a "flights" option, the PTO conversion service may present the employee with options to determine whether the flight is to be a round-trip flight, how many passengers, whether the employee would like to travel in economy or first-class, how many bags the employee would like to bring on the flight, and the like. This information may be used by the PTO conversion service to generate a query to identify available travel and/or experience options for the employee.

At step 2308, the PTO conversion service transmits an employee data payload to a travel router to identify and provide the employee, via the interface, with various travel and/or experience options that may be purchased using the employee's available PTO and/or other payment options. The employee data payload may include the aforementioned information obtained by the PTO conversion service for generating the query. Further, the employee data payload may include any applicable policies or rules defined by the employer that may be applicable to the employee. For instance, these applicable policies or rules may specify blackout dates, during which the employee may be restricted from engaging in travel and/or an experience. Additionally, or alternatively, the applicable policies or rules may specify locations that the employee is restricted from visiting as part of a travel and/or experience option. The travel router may utilize this information to identify available travel and/or experience options that may be presented to the employee. In an embodiment, rather than providing the applicable policies or rules to the travel router, the PTO conversion service can use the applicable policies or rules to restrict the query options that are presented to the employee via the interface.

In an embodiment, the travel router can operate within different distribution environments for travel and/or experience options. For example, the travel router may operate within an indirect distribution of travel environment, wherein the travel router may access a GDS to obtain available travel and/or experience options provided by different entities (e.g., airlines, cruise lines, hotel operators, rental car operators, venue operators, etc.). In an indirect distribution of travel environment, the GDS obtains the various travel and/or experience options provided by these different entities. The travel router may be required to query the GDS in order to obtain the various options available to the employee.

The travel router may further operate within a direct distribution of travel environment, whereby travel and/or experience options are provided directly to the travel router, travel agency, traveler, and/or GDS via a New Distribution Capability (NDC) standard. In this environment, the travel router may directly identify the various available travel and/or experience options from the different entities and provide these to the employee via the interface. In some instances, the travel router may operate within a prepaid travel environment, within which an entity purchases large quantities of travel and/or experience options directly from the different entities and provides these travel and/or experience options for purchase. The travel router may access a database provided by the entity to identify available travel and/or experience options for the employee. It should be noted that the travel router may operate in any combination of the aforementioned environments. For instance, the travel router may simultaneously query a GDS and a database maintained by an entity in the prepaid travel environment to identify different travel and/or experience options for the employee. In some embodiments, the PTO conversion service can serve as the travel router within these environments if granted access to the GDS, to the different entities or sources of travel and/or experience options, and/or to an entity in the prepaid travel environment.

At step 2310, the PTO conversion service determines whether the employee has booked a travel and/or experience-related option via the travel router. If the PTO conversion service determines that the employee has not booked a travel and/or experience-related option via the travel router, the PTO conversion service may end the process 2300 at step 2312. The employee may be returned to the PTO conversion service interface, through which the employee may submit a new travel and/or experience-related query.

At step 2314, if the employee has booked a travel and/or experience-related option via the travel router, the PTO conversion service may provide the employee with a confirmation for its booking. For instance, if the employee books a travel and/or experience-related option, the travel router may transmit reservation information to a travel partner, which is added to a "To Book" queue. This may provide an employee with a particular period of time to cancel their booking without incurring a deduction of available PTO and/or loss of funds from other payment methods selected by the employee. The travel partner may transmit a notification to the PTO conversion service to indicate that the reservation has been added to the queue. This may cause the PTO conversion service to tag the pending transaction as being "in progress." Further, the PTO conversion service may provide the employee with a confirmation that includes details regarding the pending transaction and a unique identifier that can be used to track the progress of the transaction. In an embodiment, the PTO conversion service further updates the interface (e.g., interface 1300 and/or interface 1400, described above) to provide details regarding the employee's booking. Through the interface, the employee may be able to review the booking, review its status, and/or request cancellation of the booking if desired.

At step 2316, the PTO conversion service determines whether the employee has requested conversion of available PTO for at least a portion of the balance for the travel and/or experience-related option. As noted above, an employee may opt to use any combination of its available PTO balance and other payment methods (e.g., credit card, debit card, vouchers, etc.) for the purchase of a travel and/or experience-related option. If the employee has opted to utilize some of its available PTO balance for the purchase of the travel and/or experience-related option, the PTO conversion service may, at step 2318, create a request for PTO in the employer's FIRS or in the employer's HRS provider. At step 2320, the PTO conversion service determines whether the request was successfully received by the employer's FIRS or the employer's FIRS provider. If the submission of the request is unsuccessful, the PTO conversion service may proceed to step 2324, where, at step 2328, the PTO conversion service may cancel the employee's booking and the request for PTO. For instance, the PTO conversion service may cancel the request for PTO in the employer's HRS or in the employer's HRS provider. Further, the PTO conversion service may utilize the travel router's API to notify the travel partner of the booking cancellation. The employee may be provided with a notification indicating cancellation of its booking.

If the PTO conversion service determines that the employee is not requesting use of its available PTO for purchase of the travel and/or experience-related option, or that the creation of the request for PTO in the employer's HRS or in the employer's HRS provider was successful, the PTO conversion service may proceed to step 2322, where, at step 2326, the PTO conversion service determines whether a cancellation indication has been received. For instance, in an embodiment, once a reservation has been added to a "to book" queue, the employee may be provided with a pre-defined period of time to request cancellation of the booking before its designated PTO amount and/or other payment methods are used to finalize the booking. In an embodiment, the PTO conversion service transmits a notification to the employee prior to the end of this pre-defined period to indicate that it has a limited amount of time left for cancellation of the booking. This notification may be provided to the employee via one or more communications channels, such as e-mail, text message, push notification, and the like. If the employee submits a request to cancel its booking, the PTO conversion service may cancel the booking and any applicable requests for PTO at step 2328, as described above.

If the employee does not cancel its travel and/or experience-related booking, the PTO conversion service may provide the employee with its tickets, passes, or any other instrument that may be used for the travel and/or experience-related booking and approve its request for PTO in the employer's HRS or in the employer's HRS provider, if applicable, at step 2330. For instance, if the pre-defined period of time for cancellation of the employee's booking has elapsed, the travel router may move the reservation from the "to book" queue to a "to ticket" queue of the travel partner. This may cause the travel partner to issue the one or more travel or experience-related instruments to the employee. Further, the PTO conversion service may approve the request for PTO in the employer's HRS or employer's HRS provider. If approval of the request for PTO is unsuccessful, the PTO conversion service may initiate human intervention with the employer's HRS team to ensure that the request for PTO is approved in the employer's HRS or the employer's HRS provider. Once the request for PTO has been approved, the employer's HRS and the PTO conversion service may each permanently reduce the employee's available PTO, if applicable.

At step 2332, the PTO conversion service may provide the employee with ticket/booking details via the interface provided by the PTO conversion service for booking travel and/or experience-related options. For instance, through the interface, an employee may review its ticket/booking details, update their ticket/booking details (e.g., provide a frequent flyer number, provide a known traveler number, provide emergency contact information, etc.), and the like. In an embodiment, the travel partner can transmit a notification to the employee to provide the employee with travel and/or experience-related tickets, vouchers, or other instrument that can be used to engage in the travel and/or experience-related option.

At step 2334, the PTO conversion service may transmit funds for the travel and/or experience-related ticket or booking to the travel partner. For instance, the PTO conversion service may update the employer's ledger to indicate any funds that are to be settled with the employer. For instance, if the service-funded model is utilized, the PTO conversion service may indicate that the employer is responsible for the amount of funds that are to be provided to the travel partner, along with any applicable fees. The PTO conversion service may provide the employer with a flat file or other document that details the various PTO conversions performed by the PTO conversion service on behalf of the employer over a period of time for travel and/or experience-related purchases. Further, the PTO conversion service may provide the employer with an invoice for any amounts owed to the travel partner for travel and/or experience-related options purchased using PTO conversions during a period of time. The PTO conversion service may provide funds obtained from the employer to the travel partner.

Figure 24:
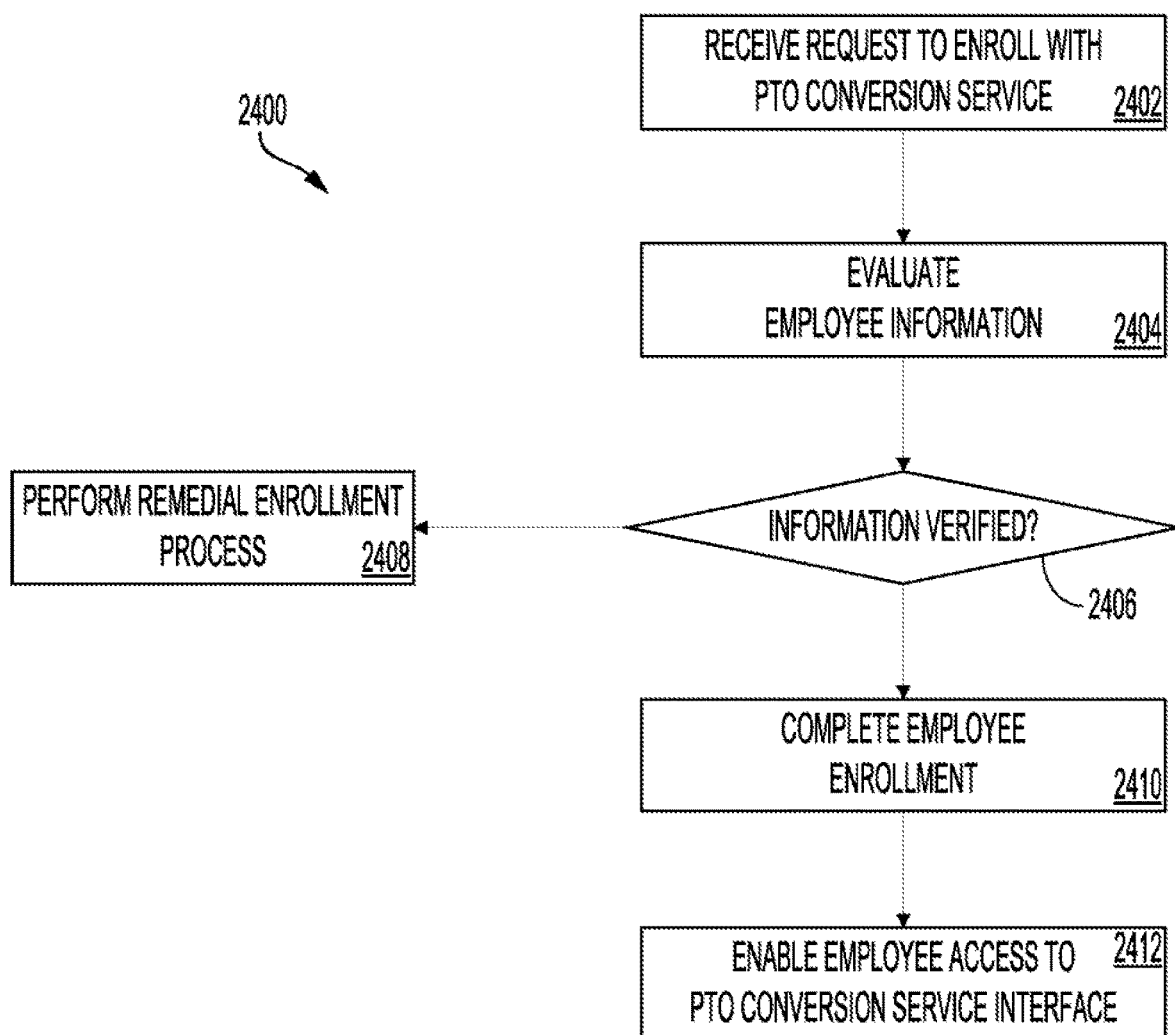
FIG. 24 shows an illustrative example of a flow diagram for a method for processing a request to enroll in the PTO conversion service according to some embodiments.

FIG. 24 shows an illustrative example of a flow diagram for a method 2400 for processing a request to enroll in the PTO conversion service according to some embodiments. The process 2400 may be performed by the PTO conversion service. Any suitable connected software and/or device may be used by the employee to request enrollment in the PTO conversion service. In addition, a combination of several software and/or device components may be used to facilitate enrollment in the PTO conversion service.

At step 2402, the PTO conversion service receives a request from an employee to enroll with the PTO conversion service. As noted above, the PTO conversion service obtains a detailed roster of the employer's workforce during an employer onboarding process. For instance, when an employer initiates engagement with the PTO conversion service to assist in managing PTO for its employees, the employer may provide the PTO conversion service with access the employer's workforce information via an HR systems provider, an HR system maintained by the employer, or through any other system used to maintain employee records. For each employee in the employer's workforce, the PTO conversion service may establish a set of initial credentials that may be used to access and enroll in the PTO conversion service. In some instances, the PTO conversion service may enable employee access to the PTO conversion using credentials (e.g., authentication token, etc.) that are utilized to access one or more employer systems, such as through SSO authentication, federation, and the like.

The request to enroll with the PTO conversion service may include the set of initial credentials provided to the employee by its employer. Alternatively, the request may include identifying information of the employee (e.g., employee's last four digits of its Social Security number, an employee's employer identification username or number, full employee name, etc.). This identifying information may correspond to the information provided by the employer with the detailed roster of the employer's workforce. Thus, in response to the request, the PTO conversion service may, at step 2404, evaluate the provided information to determine, at step 2406, whether the information corresponds to that provided by the employer for the particular employee.

If the PTO conversion service is unable to verify the information provided by the employee, the PTO conversion service, at step 2408, may perform a remedial enrollment process for the employee. For instance, the PTO conversion service may perform human verification of the employee, such as through a chat session or other communications channel (e.g., telephone call, etc.). As another example, if the information provided by the employee is valid but a phone number provided by the employee is not valid or was otherwise not provided by the employer, the PTO conversion service may prompt the employee to provide additional information that may be used to authenticate the employee. For instance, the PTO conversion service may prompt the employee to provide information regarding previous addresses, the employee's organization within the workforce (e.g., name of manager, name of organization, name of work group, etc.). If the PTO conversion service is unable to automatically verify this supplemental information, the PTO conversion service may perform human verification of the employee, as described above. However, if the supplemental information is verified, the PTO conversion service may capture the information originally provided by the employee (e.g., phone number, etc.). In some instances, the PTO conversion service may transmit a personal identification number (PIN) or other identifier to the employee's device (e.g., smartphone, personal computer, etc.) and prompt the employee to input the PIN provided by the PTO conversion service for verification.

If the PTO conversion service is able to verify the information provided by the employee, the PTO conversion service, at step 2410, may complete employee enrollment into the PTO conversion service. For instance, the PTO conversion service may instruct the employee to establish a new set of credentials that may be used to access the PTO conversion service. Additionally, the PTO conversion service may transmit a notification to the employer to indicate that the employee has enrolled with the PTO conversion service. Further, the PTO conversion service may link the employee's PTO conversion service account with the employee's profile maintained by the employer's HRS or in the employer's HRS provider. Thus, as the employee interacts with the PTO conversion service, the employee may automatically be provided with its current PTO balances, as indicated by the employer's FIRS or the employer's FIRS provider, as described herein.

Once the PTO conversion service has completed employee enrollment into the PTO conversion service, the PTO conversion service, at step 2412, may enable the employee to access the PTO conversion service interface. For instance, the PTO conversion service may enable employee access to the PTO conversion service using credentials (e.g., authentication token, etc.) that are utilized to access one or more employer systems, such as through SSO authentication, federation, and the like. For example, an employee may access the PTO conversion service via one or more employer systems, whereby the employee may be authenticated by these one or more employer systems. Alternatively, the employee, if accessing the PTO conversion service using its own computing device, may provide an authentication token that the conversion service may use, in conjunction with the employer systems, to authenticate the employee.

Implementation

Figure 25:
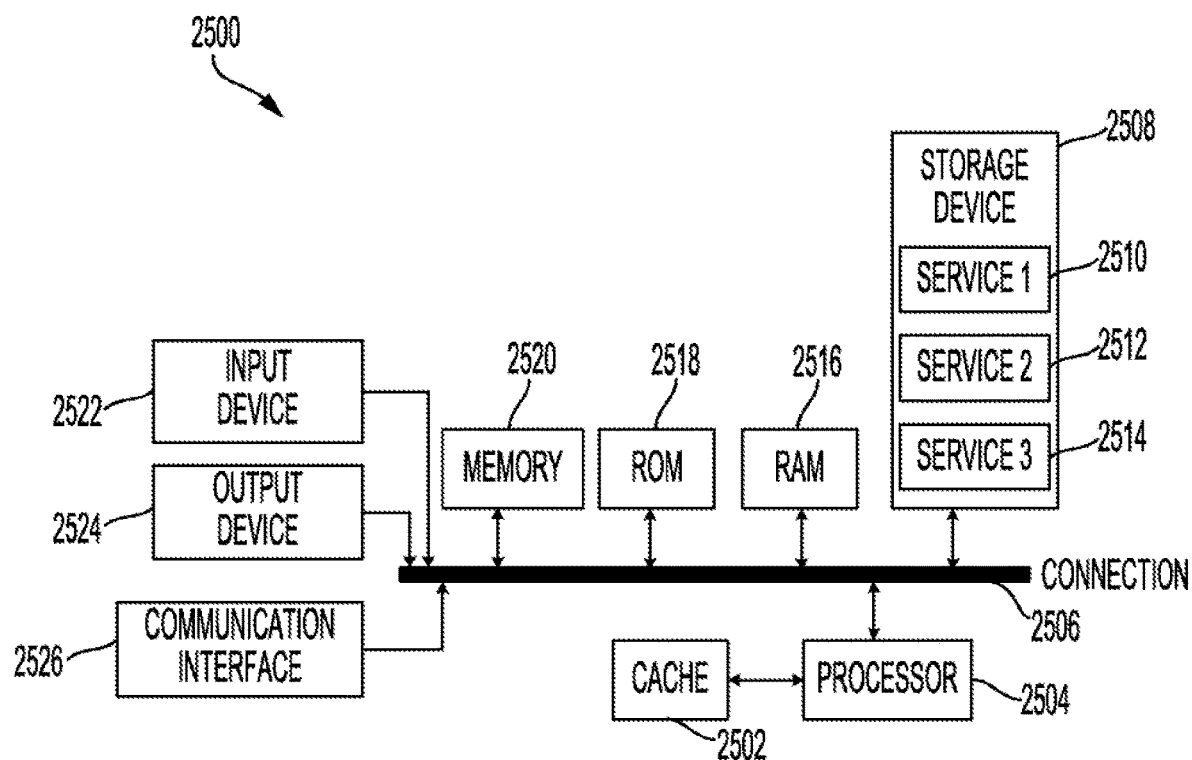
FIG. 25 shows a computing system architecture including various components in electrical communication with each other using a connection in accordance with various embodiments.

FIG. 25 illustrates a computing system architecture 2500 including various components in electrical communication with each other using a connection 2506, such as a bus, in accordance with some implementations. Example system architecture 2500 includes a processing unit (CPU or processor) 2504 and a system connection 2506 that couples various system components including the system memory 2520, such as ROM 2518 and RAM 2516, to the processor

2504. The system architecture 2500 can include a cache 2502 of high-speed memory connected directly with, in close proximity to, or integrated as part of the processor 2504. The system architecture 2500 can copy data from the memory 2520 and/or the storage device 2508 to the cache 2502 for quick access by the processor 2504. In this way, the cache can provide a performance boost that avoids processor 2504 delays while waiting for data. These and other modules can control or be configured to control the processor 2504 to perform various actions.

Other system memory 2520 may be available for use as well. The memory 2520 can include multiple different types of memory with different performance characteristics. The processor 2504 can include any general purpose processor and a hardware or software service, such as service 1 2510, service 2 2512, and service 3 2514 stored in storage device 2508, configured to control the processor 2504 as well as a special-purpose processor where software instructions are incorporated into the actual processor design. The processor 2504 may be a completely self-contained computing system, containing multiple cores or processors, a bus, memory controller, cache, etc. A multi-core processor may be symmetric or asymmetric.

To enable user interaction with the computing system architecture 2500, an input device 2522 can represent any number of input mechanisms, such as a microphone for speech, a touch-sensitive screen for gesture or graphical input, keyboard, mouse, motion input, speech and so forth. An output device 2524 can also be one or more of a number of output mechanisms known to those of skill in the art. In some instances, multimodal systems can enable a user to provide multiple types of input to communicate with the computing system architecture 2500. The communications interface 2526 can generally govern and manage the user input and system output. There is no restriction on operating on any particular hardware arrangement and therefore the basic features here may easily be substituted for improved hardware or firmware arrangements as they are developed.

Storage device 2508 is a non-volatile memory and can be a hard disk or other types of computer readable media which can store data that are accessible by a computer, such as magnetic cassettes, flash memory cards, solid state memory devices, digital versatile disks, cartridges, RAMs 2516, ROM 2518, and hybrids thereof.

The storage device 2508 can include services 2510, 2512, 2514 for controlling the processor 2504. Other hardware or software modules are contemplated. The storage device 2508 can be connected to the system connection 2506. In one aspect, a hardware module that performs a particular function can include the software component stored in a computer-readable medium in connection with the necessary hardware components, such as the processor 2504, connection 2506, output device 2524, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system. In some embodiments, the disclosed methods can be performed using virtualized environments.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor. In some embodiments, the data may be encrypted.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor. In some embodiments, the software may be encrypted.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually affect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
   obtaining a request to repurpose an amount of a paid time off benefit, wherein the request corresponds to a requesting employee associated with an employer workforce;
   presenting an option for donating the amount of the paid time off benefit to a paid time off pool, wherein the option is generated using information associated with the requesting employee as input to a machine learning algorithm, and wherein the machine learning algorithm is trained using historical selections from options generated using employer workforce information;
receiving a selection of the option for donating the amount of the paid time off benefit to the paid time off benefit pool;
updating an employer system to indicate a new amount of the paid time off benefit available to the requesting employee and to add the amount of the paid time off benefit to the paid time off benefit pool;
updating the machine learning algorithm, wherein the machine learning algorithm is updated using the donation request and the historical selections from the options to generate an updated machine learning algorithm; and
generating one or more recommendations for benefits extendable to the employer workforce for improving workforce quality of life, wherein the one or more recommendations are generated by the updated machine learning algorithm using the donation request and the historical selections.

2. The method of claim 1, wherein the request includes an identifier corresponding to a recipient employee to which the amount of the paid time off benefit is to be provided, and wherein the option is presented as a result of the recipient employee not being eligible for the amount of the paid time off benefit.

3. The method of claim 1, further comprising:
identifying a policy associated with the requesting employee, wherein the policy defines a set of parameters corresponding to a threshold amount of the paid time off benefit that can be donated; and
automatically approving the selection as a result of the amount of the paid time off benefit being less than the threshold amount.

4. The method of claim 1, wherein:
the selection is defined using a monetary value corresponding to the amount of the paid time off benefit; and
the method further comprises:
calculating a temporal value corresponding to the amount of the paid time off benefit, wherein the temporal value is calculated using the monetary value and a pay rate associated with the requesting employee; and
adding the temporal value to the paid time off benefit pool.

5. The method of claim 1, wherein:
the selection is defined using a temporal value corresponding to the amount of the paid time off benefit; and
the method further comprises:
calculating a monetary value corresponding to the amount of the paid time off benefit, wherein the monetary value is calculated using the temporal value and a pay rate associated with the requesting employee; and
adding the monetary value to the paid time off benefit pool.

6. The method of claim 1, further comprising:
obtaining a purchase request to perform a purchase from the paid time off benefit pool, wherein the purchase request corresponds to a purchasing employee associated with the employer workforce;
determining a pay rate associated with the purchasing employee; and
updating the employer system to indicate a new amount of the paid time off benefit available to the purchasing employee and to reduce the paid time off benefit pool according to the purchase request.

7. The method of claim 1, further comprising:
transmitting a request to determine whether the selection is approved, wherein when the request is received by the employer system, the employer system provides a response indicating that the selection is approved.

8. A system, including:
one or more processors; and
memory including instructions that, as a result of being executed by the one or more processors, cause the system to:
obtain a request to repurpose an amount of a paid time off benefit, wherein the request corresponds to requesting employee associated with an employer workforce;
present an option for donating the amount of the paid time off benefit to a paid time off pool, wherein the option is generated using information associated with the requesting employee as input to a machine learning algorithm, and wherein the machine learning algorithm is trained using historical selections from options generated using employer workforce information;
receive a selection of the option for donating the amount of the paid time off benefit to the paid time off benefit pool;
update an employer system to indicate a new amount of the paid time off benefit available to the requesting employee and to add the amount of the paid time off benefit to the paid time off benefit pool;
update the machine learning algorithm, wherein the machine learning algorithm is updated using the donation request and the historical selections from the options to generate an updated machine learning algorithm; and
generate one or more recommendations for benefits extendable to the employer workforce for improving workforce quality of life, wherein the one or more recommendations are generated by the updated machine learning algorithm using the donation request and the historical selections.

9. The system of claim 8, wherein the request includes an identifier corresponding to a recipient employee to which the amount of the paid time off benefit is to be provided, and wherein the option is presented as a result of the recipient employee not being eligible for the amount of the paid time off benefit.

10. The system of claim 8, wherein the instructions further cause the system to:
identify a policy associated with the requesting employee, wherein the policy defines a set of parameters corresponding to a threshold amount of the paid time off benefit that can be donated; and
automatically approve the selection as a result of the amount of the paid time off benefit being less than the threshold amount.

11. The system of claim 8, wherein:
the selection is defined using a monetary value corresponding to the amount of the paid time off benefit; and
the instructions further cause the system to:
calculate a temporal value corresponding to the amount of the paid time off benefit, wherein the temporal value is calculated using the monetary value and a pay rate associated with the requesting employee; and
add the temporal value to the paid time off benefit pool.

12. The system of claim 8, wherein:
the selection is defined using a temporal value corresponding to the amount of the paid time off benefit; and
the instructions further cause the system to:
calculate a monetary value corresponding to the amount of the paid time off benefit, wherein the monetary value is calculated using the temporal value and a pay rate associated with the requesting employee; and
add the monetary value to the paid time off benefit pool.

13. The system of claim 8, wherein the instructions further cause the system to:
obtain a purchase request to perform a purchase from the paid time off benefit pool, wherein the purchase request corresponds to a purchasing employee associated with the employer workforce;
determine a pay rate associated with the purchasing employee; and
update the employer system to indicate a new amount of the paid time off benefit available to the purchasing employee and to reduce the paid time off benefit pool according to the purchase request.

14. The system of claim 8, wherein the instructions further cause the system to:
transmit a request to determine whether the selection is approved, wherein when the request is received by the employer system, the employer system provides a response indicating that the selection is approved.

15. A non-transitory, computer-readable storage medium storing thereon executable instructions that, as a result of being executed by one or more processors of a computer system, cause the computer system to:
obtain a request to repurpose an amount of a paid time off benefit, wherein the request corresponds to requesting employee associated with an employer workforce;
present an option for donating the amount of the paid time off benefit to a paid time off pool, wherein the option is generated using information associated with the requesting employee as input to a machine learning algorithm, and wherein the machine learning algorithm is trained using historical selections from options generated using employer workforce information;
receive a selection of the option for donating the amount of the paid time off benefit to the paid time off benefit pool;
update an employer system to indicate a new amount of the paid time off benefit available to the requesting employee and to add the amount of the paid time off benefit to the paid time off benefit pool;
update the machine learning algorithm, wherein the machine learning algorithm is updated using the donation request and the historical selections from the options to generate an updated machine learning algorithm; and
generate one or more recommendations for benefits extendable to the employer workforce for improving workforce quality of life, wherein the one or more recommendations are generated by the updated machine learning algorithm using the donation request and the historical selections.

16. The non-transitory, computer-readable storage medium of claim 15, wherein the request includes an identifier corresponding to a recipient employee to which the amount of the paid time off benefit is to be provided, and wherein the option is presented as a result of the recipient employee not being eligible for the amount of the paid time off benefit.

17. The non-transitory, computer-readable storage medium of claim 15, wherein the executable instructions further cause the computer system to:
identify a policy associated with the requesting employee, wherein the policy defines a set of parameters corresponding to a threshold amount of the paid time off benefit that can be donated; and
automatically approve the selection as a result of the amount of the paid time off benefit being less than the threshold amount.

18. The non-transitory, computer-readable storage medium of claim 15, wherein:
the selection is defined using a monetary value corresponding to the amount of the paid time off benefit; and
the executable instructions further cause the computer system to:
calculate a temporal value corresponding to the amount of the paid time off benefit, wherein the temporal value is calculated using the monetary value and a pay rate associated with the requesting employee; and
add the temporal value to the paid time off benefit pool.

19. The non-transitory, computer-readable storage medium of claim 15, wherein:
the selection is defined using a temporal value corresponding to the amount of the paid time off benefit; and
the executable instructions further cause the computer system to:
calculate a monetary value corresponding to the amount of the paid time off benefit, wherein the monetary value is calculated using the temporal value and a pay rate associated with the requesting employee; and
add the monetary value to the paid time off benefit pool.

20. The non-transitory, computer-readable storage medium of claim 15, wherein the executable instructions further cause the computer system to:
obtain a purchase request to perform a purchase from the paid time off benefit pool, wherein the purchase request corresponds to a purchasing employee associated with the employer workforce;
determine a pay rate associated with the purchasing employee; and
update the employer system to indicate a new amount of the paid time off benefit available to the purchasing employee and to reduce the paid time off benefit pool according to the purchase request.

21. The non-transitory, computer-readable storage medium of claim 15, wherein the executable instructions further cause the computer system to:
transmit a request to determine whether the selection is approved, wherein when the request is received by the employer system, the employer system provides a response indicating that the selection is approved.

* * * * *